US012786698B2

(12) United States Patent
Sevin et al.

(10) Patent No.: US 12,786,698 B2
(45) Date of Patent: Nov. 3, 2026

(54) METHOD FOR CHANGING THE VALUE OF ONE OR MORE PRIVACY PARAMETERS OF STATIONS WITHIN A BASIC SERVICE SET

(71) Applicant: CANON KABUSHIKI KAISHA, Tokyo (JP)

(72) Inventors: Julien Sevin, Saint Aubin du Cormier (FR); Stéphane Baron, Le Rheu (FR); Patrice Nezou, Liffre (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 149 days.

(21) Appl. No.: 18/726,746

(22) PCT Filed: Jan. 6, 2023

(86) PCT No.: PCT/EP2023/050224
§ 371 (c)(1),
(2) Date: Jul. 3, 2024

(87) PCT Pub. No.: WO2023/131674
PCT Pub. Date: Jul. 13, 2023

(65) Prior Publication Data

US 2025/0071542 A1 Feb. 27, 2025

(30) Foreign Application Priority Data

Jan. 7, 2022 (GB) ...................................... 2200177
Feb. 18, 2022 (GB) ...................................... 2202237
Jun. 22, 2022 (GB) ...................................... 2209177

(51) Int. Cl.
*H04W 12/02* (2009.01)
*H04W 12/041* (2021.01)
(Continued)

(52) U.S. Cl.
CPC ......... *H04W 12/02* (2013.01); *H04W 12/041* (2021.01); *H04W 12/61* (2021.01); *H04W 92/10* (2013.01)

(58) Field of Classification Search
CPC ... H04W 12/02; H04W 12/041; H04W 12/61; H04W 92/10; H04W 12/71; H04W 12/73; H04W 12/069; H04W 84/12
See application file for complete search history.

(56) References Cited

U.S. PATENT DOCUMENTS

2022/0167256 A1* 5/2022 Kneckt ............... H04W 12/037
2023/0060887 A1* 3/2023 Dominguez .......... H04W 24/02

FOREIGN PATENT DOCUMENTS

EP 2782315 A1 9/2014

OTHER PUBLICATIONS

Baber Aslam et al: "Pseudo Randomized Sequence Number Based Solution to 802.11 Disassociation Denial of Service Attack", Mobile Computing and Wireless Communication International Conference 2006. MCWC 2007. Proceedings of the First, IEEE, PI, Sep. 2006, pp. 215-220, ISBN: 978-9957-486-00-66.
(Continued)

*Primary Examiner* — Izunna Okeke
(74) *Attorney, Agent, or Firm* — Canon U.S.A., Inc. IP Division

(57) ABSTRACT

The present invention relates to method for changing the value of one or more privacy parameters, such as a MAC address, of target stations within a BSS, at both an AP station and a non-AP station associated with the AP station. The two stations share a pseudo-random function to generate the new values of the privacy parameters from a shared key and a shared parameter whose value varies over time. The methods comprise for each station: obtaining the shared key and parameter value; communicating, with the other station, a
(Continued)

request for changing the values of the privacy parameters at a target time; calculating the new values by using the shared key and the current value of the shared parameter as inputs of the shared function; and replacing, in a registry, the current values of the privacy parameters of the target station by the calculated new values at the target time.

40 Claims, 14 Drawing Sheets

(51) Int. Cl.
*H04W 12/61* (2021.01)
*H04W 92/10* (2009.01)

(56) References Cited

OTHER PUBLICATIONS

Baron, "Enhanced Randomized and Changing MAC address", IEEE Draft: 11-22-0114-00-00BI-Enhanced-Randomized-And-Changing Mac-Address, IEEE-SA Mentor, Piscataway, NJ, vol. 802.11bi Jan. 2022.

* cited by examiner

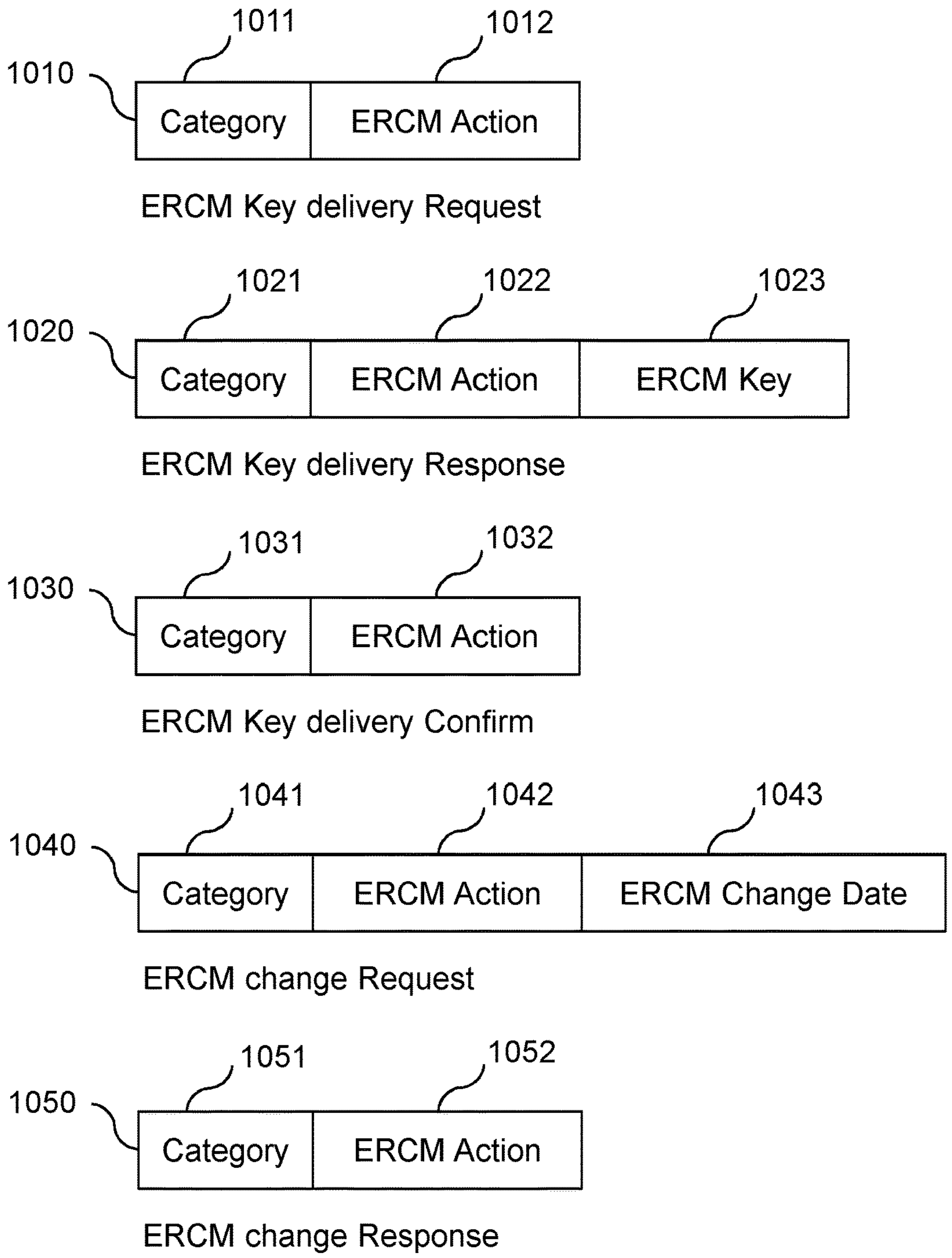
Figure 10
Figure 11
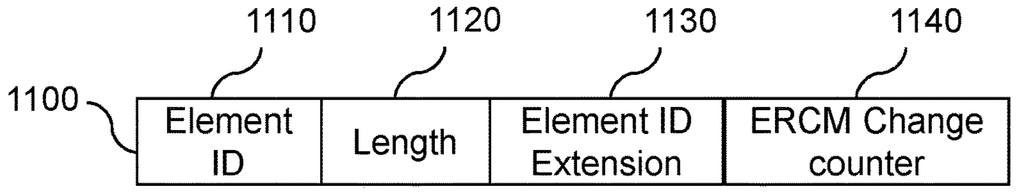

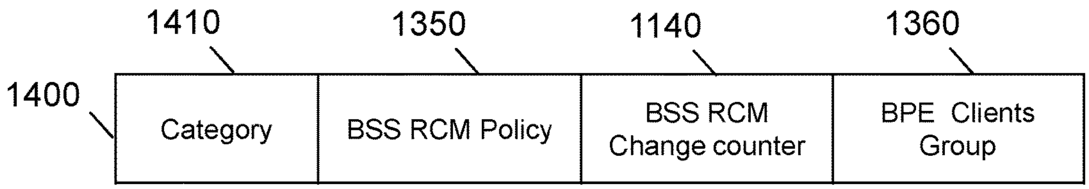
Figure 14
| CPE list | Order/rank | Length (bits) |
|---|---|---|
| OTA MAC address | 1 | 46 |
| Sequence Number | 2 | 12 |
| Packet Number | 3 | 48 |
| Association Identifier AID | 4 | 16 |
| Scrambler Seed | 5 | 7 |
Figure 15a
| BPE AP list | Order | Length (bits) |
|---|---|---|
| OTA MAC address | 1 | 46 |
| Scrambler Seed | 2 | 7 |
| Beacon Interval | 3 | 16 |
| BSS Color | 4 | 6 |
Figure 15b
| CPE parameter | Start position | End position |
|---|---|---|
| OTA MAC address | 1 | 46 |
| Sequence Number | 47 | 58 |
| Packet Number | 59 | 106 |
| Association Identifier AID | 107 | 122 |
| Scrambler Seed | 123 | 129 |
Figure 16a
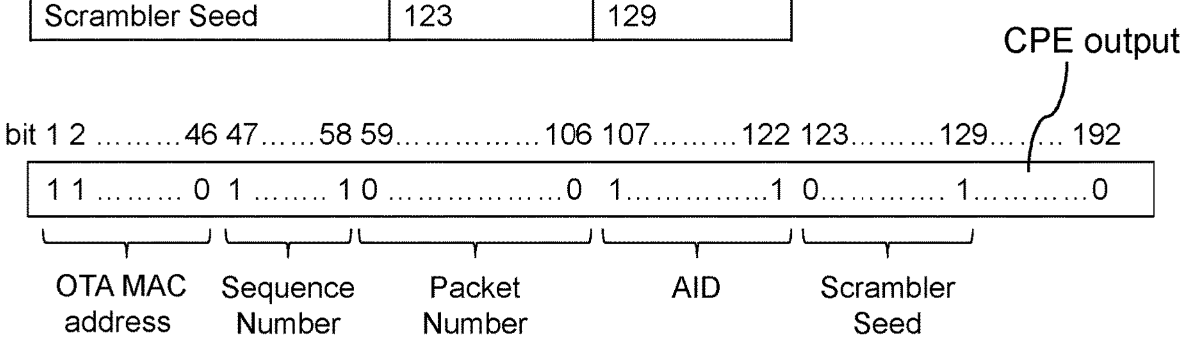

| BPE parameters | Start position | End position |
|---|---|---|
| OTA MAC address | 1 | 46 |
| Scrambler Seed | 47 | 53 |
| Beacon Interval | 54 | 69 |
| BSS Color | 70 | 75 |

METHOD FOR CHANGING THE VALUE OF ONE OR MORE PRIVACY PARAMETERS OF STATIONS WITHIN A BASIC SERVICE SET

CROSS REFERENCE TO RELATED APPLICATION

This is a National Phrase entry of International Application No. PCT/EP2023/050224 filed on Jan. 6, 2023, which claims the benefit under 35 U.S.C. § 119(a)-(d) of United Kingdom Patent Application No. 2200177.0 filed on Jan. 7, 2022 and entitled "Method for changing a value of an extended unique identifier of a non-AP station associated with an AP station", United Kingdom Patent Application No. 2202237.0 filed Feb. 18, 2022 and entitled "Method for changing a value of an extended unique identifier of a non-AP station associated with an AP station" and United Kingdom Patent Application No. 2209177.1 filed on Jun. 22, 2022 and entitled "Method for changing the value of one or more privacy parameters of stations within a basic service set", The above cited patent applications are incorporated herein by reference in their entireties.

FIELD OF THE INVENTION

The present invention relates to wireless communications and more specifically to user privacy during wireless communications.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. The 802.11 family of standards adopted by the Institute of Electrical and Electronics Engineers (IEEE) provides a great number of mechanisms for wireless communications between stations.

Today, the evolution of wireless systems has brought privacy concerns at the forefront, driven by user demand and requirements of the General Data Protection Regulation (GDPR). The global wireless industry is faced with the growing need to protect users' personally identifiable information from increasingly sophisticated user tracking and user profiling activities, while continuing to improve wireless services and the user experience.

The Personally Identifiable Information (PII) corresponds to any data that identifies an individual or from which identity or contact information of an individual can be derived. For instance, in the context of 802.11, PII may be the use of unique identifiers (such as MAC addresses or SSIDs) that can be directly connected to a single device or small group of devices (and therefore owner(s) of such a device(s)). Below, the PII are referred to as privacy parameters or PE (Privacy Enhancements) parameters.

The IEEE 802.11 working group has then proposed a procedure to limit the risk of a user being traced, which consists in dynamically modifying the MAC address of the user device. This mechanism, called Randomized and Changing MAC (RCM) procedure, has been originally introduced as a privacy enhancing feature in the 802.11aq Pre-Association Service Discovery Task Group and finally included in the standard IEEE Std 802.11-2020. It comprises periodical change of the MAC address of a non-AP station (i.e. a station which is not an access point) to a random value, while the non-AP station (STA) is not associated to a network (or, equivalently, to an access point).

Recent requirements of the IEEE 802.11bi working group now targets other privacy parameters than the MAC address, that have to be protected.

However, according to the actual standards and the existing mechanism, a non-AP station cannot change randomly its privacy parameters, such as a MAC address, while the non-AP station is associated with the AP station. Also, the AP station cannot change randomly its privacy parameters. Therefore, the security issues mentioned above remain for these stations: the privacy is not ensured as various behaviors or actions of the non-AP station within the Basic Service Set (BSS) of the AP station can still be tracked and reconciled through the privacy parameters. In the same way, the AP station itself can still be tracked through the privacy parameters, which is prejudicial to privacy when e.g. such AP station is a mobile AP station implemented in a personal mobile phone.

There is thus a need for a method for enabling a station (non-AP or AP) to ease an application of a Randomized and Changing MAC procedure or the like for it to change randomly its privacy parameters, without explicit exchange of the changed privacy parameters.

SUMMARY OF THE INVENTION

In this context, the invention provides a method for changing a value of at least one privacy parameter of a target station among an AP station managing a Basic Service Set, BSS, and a non-AP station of the BSS, the non-AP station and the AP station having a shared function to generate a new value of a privacy parameter, the method comprising at the non-AP station or at the AP station:

- obtaining a key and a parameter having a value varying over time, that are shared with the other station among the non-AP station and the AP station;
- calculating a new value of the at least one privacy parameter by using the shared key and a current value of the shared parameter as inputs of the shared function;
- replacing a value of the at least one privacy parameter by the calculated new value at a target time.

In some embodiments, the method further comprises, at the station, communicating, with the other station, a request for changing the value of the at least one privacy parameter at the target time. The target time is therefore exchanged between the two stations.

In alternative embodiments, the method further comprises, at the station, determining a value representing a (target) time at which the value of the privacy parameter is to be changed by using the shared function with a set of inputs comprising the current value of the shared parameter. The target time is therefore determined locally by both station.

As known by the person skilled in the art, the privacy parameters in the context of communicating stations include any information or parameter or Personally Identifiable Information (PII) that allows an identification or tracking of the communicating stations. As an example, IEEE 802.11 bi task group has defined sets of privacy (or Privacy Enhancements—PE) parameters known as Client Privacy Enhancements, CPE, features and as BSS Privacy Enhancements, BPE, features. A EUI (standing for Extended Unique Identifier) is one of them. It is a unique identifier assigned to the network interface controller of the communicating station for use as a network address during wireless communications, for instance according to IEEE 802 networking technologies. Typically, a EUI may comprise 48 bits (EUI-48, also called MAC address) or 64 bits (EUI-64).

"Communicating with the other station" means exchanging with the other station regardless the communication direction. Therefore, the communication of the request may be from the non-AP station to the AP station, or the reverse, as explained below. Also, the method may target one or more privacy parameters of the non-AP station (hence a CPE parameter), or one or more privacy parameters of the AP station (hence a BPE parameter) in which case the communication of the request may be made to all the non-AP stations of the BSS. Of course, multiple iterations of the method may allow privacy parameters at the AP station and at each of plural non-AP stations of the BSS to be changed over time.

By "shared parameter having a value varying over time", it is meant a parameter whose value is known by both the non-AP station and the AP station, wherein the value of the parameter is different at two different times when the procedure according to the invention is executed again for the same privacy parameter. For example, the shared parameter may be a time, a date, a counter, a EUI of the target station (since, in the context of the present invention, the value of the EUI of the target station can be changed, and therefore varies over time). By "current value of the shared parameter" it is meant the value of the shared parameter at the time at which the procedure is launched, i.e. at which the new value of the privacy parameter or parameters, e.g. the EUI, is calculated.

The shared key is known by both the AP station and the non-AP station. Its value can be dedicated to the non-AP station (i.e. two non-AP stations have two distinct shared keys), or be the same for a subgroup of non-AP stations associated with the AP station or to all the non-AP stations associated with the AP station. Also, its value may be common for the BSS (i.e. all the stations of the BSS) when e.g. the privacy parameter (BPE parameter) relates to the AP station (hence the BSS).

The replacing of the privacy parameter values is performed locally at the non-AP station and/or the AP station.

According to the above method, the privacy parameters of the stations in the BSS may be changed even for the AP station or for any non-AP station yet associated with the AP station, without exchanging the new randomized values of the privacy parameters (e.g. in the request to change). User privacy is therefore increased. Both the AP station and the non-AP station can calculate the same new value of the privacy parameter or parameters to have mirrored parameters and use it from the same moment. This allows them to be able to communicate with each other without interruption (avoiding that the privacy parameter value is changed on one side but not on the other). The user privacy is now improved.

Optional features of the invention are defined below with reference to a method, while they can be transposed into device features. The various embodiments below can be combined, unless obvious incompatibility.

In some embodiments, the at least one privacy parameter includes one or more from:

- one or more Extended Unique Identifiers, EUIs, of the target station,
- one or more MAC addresses of the target station,
- a sequence number used by the target station to uniquely identify a new MSDU (MAC Service Data Unit), A-MSDU (Aggregated-MSDU), or MMPDU (MAC Management Protocol Data Unit) to be transmitted,
- a packet number used by the target station to uniquely identify a new frame to be transmitted. The packet number, incremented for each frame transmission excluding retransmission, is known to provide replay detection protection,
- an association identifier, AID, of the target station to uniquely identify the target station within the BSS,
- a scrambler seed used by the target station to initialize a local scrambler scrambling transmit data and/or descrambling receive data,
- a beacon interval defining the time interval between two consecutive target beacon transmission times, TBTTs,
- a BSS color used as a numerical identifier of the BSS.

The more the number of privacy parameters are changed, the more the user privacy is respected.

In some embodiments, the request for changing the value of the at least one privacy parameter is sent by the AP station to the non-AP station. This reflects a centric-oriented decision to change privacy parameters.

In some embodiments, the target station is the AP station. This scenario targets a change of so-called BPE parameters, related to the AP station. This is particularly beneficial to the privacy of mobile AP stations, e.g. implemented in personal mobile phones, hence of the entire BSS.

In particular embodiments of this scenario, the shared key is the Groupwise Temporal Key, GTK, of the BSS or a derivate thereof. Advantageously, this key is already shared between all the stations of the BSS. Hence, this reduces the complexity of the method.

In some embodiments, the request signals multiple targeted non-AP stations (e.g. all non-AP stations) of the BSS that are declared as BSS Privacy Enhancement, BPE, Clients to the AP station, wherein a BPE Client is configured to change a value of a privacy parameter by using the shared function, and the request signals to each targeted BPE Client to change:

- the value of at least one privacy parameter of the AP station, and
- the value of at least one privacy parameter of the targeted BPE Client.

On its side, the AP station changes the value of its privacy parameter(s) and the values of the privacy parameter(s) of each targeted BPE Client. One may note that this scenario, when applied to all the non-AP stations of the BSS in addition to the AP station as the main target station, ensures the overall privacy within the BSS to be guaranteed.

In some embodiments, the request includes a policy field indicating whether the request also signals, to each of one or more targeted stations different from the target station, to change the value of at least one privacy parameter of the targeted station. This is particularly advantageous for the AP station that may trigger a change of its own privacy parameter or parameters (so-called BPE AP parameters) together with a change of own privacy parameter or parameters in one or more or all (targeted) non-AP stations of the BSS (so-called BPE Client parameters).

In a particular embodiment, a non-AP station of the BSS that is configured to change a value of a privacy parameter by using the shared function declares itself as a BSS Privacy Enhancement, BPE, Client to the AP station, and the policy field takes a value from (i.e. the request-transmitting station previously determines the policy to be applied and then signals it in the request):

- a first value signaling the request is only a request for changing the value of the at least one privacy parameter of the AP station,
- a second value signaling the request targets all BPE Clients of the BSS, and requests each targeted BPE Client to change the value of at least one privacy parameter of the targeted BPE Client,
- a third value signaling the request targets a subgroup of the BPE Clients of the BSS, and requests each targeted BPE Client to change the value of at least one privacy parameter of the targeted BPE Client.

According to a particular feature, in case the policy field takes the third value, the request further includes a BPE Clients group field signaling the subgroup of BPE Clients. The third value plus the BPE Clients group field may also be seen as plural possible values within the policy field to signal plural subgroups of targeted BPE Clients.

In these scenarios, the AP station may dynamically manage and adjust the privacy within the BSS.

In some embodiments, the method further comprises, at the AP station, when the request requests a targeted BPE Client to change the value of at least one privacy parameter of the targeted BPE Client,

- obtaining a second key and a second parameter having a value varying over time, that are shared with the targeted BPE Client;
- calculating a new value of the at least one privacy parameter of the targeted BPE Client by using the shared second key and a current value of the shared second parameter as inputs of the shared function;
- replacing a value of the at least one privacy parameter of the targeted BPE Client by the calculated new value of the at least one privacy parameter at a second target time (which may be the target time if directly signaled in the request, or be a different time determined locally, e.g. using the shared function as described below).

This scenario therefore provides high level of privacy of the entire BSS.

In some embodiments, the method further comprises, at the non-AP station, determining from the request that the non-AP station belongs to the targeted BPE Clients, and in the affirmative:

- obtaining a second key and a second parameter having a value varying over time, that are shared with the AP station;
- calculating a new value of the at least one privacy parameter of the non-AP station by using the shared second key and a current value of the shared second parameter as inputs of the shared function;
- replacing a value of the at least one privacy parameter of the non-AP station by the calculated new value of the at least one privacy parameter at a second target time (which may be the target time if directly signaled in the request, or be a different time determined locally, e.g. using the shared function).

This approach is preferably implemented at each BPE Client that is targeted in the request. It turns out that the AP station and any targeted BPE non-AP station can calculate the same new value of the privacy parameter or parameters to have mirrored parameters and use it from the same moment. This allows them to be able to communicate with each other without interruption.

In a particular embodiment, the shared second key is the Pairwise Transient Key, PTK, of the targeted non-AP station or BPE Client or a derivate thereof. Advantageously, this key is already shared between the targeted non-AP station and the AP station, upon the former one associating with the AP station. Hence, this reduces the complexity of the method.

In some embodiments, calculating a new value of the at least one privacy parameter includes:

- obtaining a plurality of bits by applying the shared function to the inputs;
- determining a new value of a first privacy parameter of the target station from a first subset of bits among the plurality of bits; and
- determining a new value of a second and distinct privacy parameter of the target station from a second subset of bits among the plurality of bits.

Of course, this approach can be extended to any number (two or more) of privacy parameters of the target station. For example four or five CPE parameters may be considered or three or four BPE parameters. Multiple bit chunks within the resulting plurality of bits may correspond (hence directly provide) new randomized values for the multiple privacy parameters.

Hence, a single call to the shared function is required to perform simultaneous randomized change of multiple privacy parameters as recommended by 802.11bi for a given STA. The proposed scenario substantially reduces complexity and costs in terms of implementation.

In a particular embodiment, the first subset of bits and the second subset of bits have no bit in common. This means the subsets of bits to provide the new randomized values do not overlap. In alternative embodiments, an overlapping thereof may be allowed to reduce the length of the required binary result from the shared function.

In embodiments as described below, one or more other (e.g. separate) subsets of the resulting bits may be dedicated to the provision of the one or more target times at which the privacy parameter changes are effective.

In some embodiments, the request includes an indication relative to the target time at which the value of the at least one privacy parameter is to be changed. Alternatively, the target time may be indicated in any other frame, e.g. in a beacon frame sent by the AP station. The target time is therefore explicitly indicated by the request transmitting station (either non-AP station or AP station).

Alternatively, the method further comprises, at the non-AP station or at the AP station, determining a value representing the target time at which the value of the at least one privacy parameter is to be changed by using the shared function with inputs comprising the current value of the shared parameter. The same determination is made at both stations that must apply the mirrored privacy parameters at the same time, to efficiently communicate one with the other.

Thanks to this approach, the time at which the change is performed is not exchanged between the non-AP station and the AP station. User privacy is therefore increased.

In particular embodiments, the determining of the value representing the target time at which the value of the at least one privacy parameter is to be changed and the calculation of the new value of the at least one privacy parameter comprise:

- obtaining a plurality of bits by applying the shared function to the inputs;
- determining the new value of the at least one privacy parameter from a first subset of bits among the plurality of bits; and
- determining the value representing the target time at which the value of the at least one privacy parameter is to be changed from a second subset of bits among the plurality of bits. As mentioned previously, the new values for the privacy parameters and the target time value may therefore be generated from several separate subsets of bits composing the binary result of one iteration/call of the shared function.

Using the same result of the application of the same function advantageously reduces the number of calculations to be made for performing the changing method.

In particular embodiments, the first subset of bits and the second subset of bits have no bit in common.

In particular embodiments, determining the value representing the target time is responsive to receiving the request. Alternative events to trigger the determining step may include a change of a previous value of the at least one privacy parameter into a current (randomized) value (which is now to be changed), the reception of a message from the other station acknowledging the request, the reception of the shared key when transmitted as explained below, or the reception of a message from the other station acknowledging the reception of such shared key when transmitted. This allows an addressed non-AP station to obtain knowledge of the target time as decided by the AP station.

Exemplary implementations of the determination of the target time value include one or more from:

- a number of units of time at the end of which the value of the at least one privacy parameter is to be changed is a function of the determined value,
- the units of time are Target Beacon Transmission Times, TBTTs,
- the determined value is an integer value k,
  - wherein, following the determining of the value representing the target time at which the value of the at least one privacy parameter is to be changed, a plurality of subsequent beacon frames are sent by the AP station or received by the non-AP station;
  - wherein the target time at which the value of the at least one privacy parameter is to be changed corresponds to a time at which the [k+1]-th beacon frame among the plurality of subsequent beacon frames is sent by the AP station or received by the non-AP station.
- the determined value is an integer value k;
  - wherein the request for changing the value of the at least one privacy parameter comprises a field whose value represents an integer scaling factor s;
  - wherein, following the determining of the value representing the target time at which the value of the at least one privacy parameter is to be changed, a plurality of subsequent beacon frames are sent by the AP station or received by the non-AP station;
  - wherein the target time at which the value of the at least one privacy parameter is to be changed corresponds to a time at which the [m+1]-th beacon frame among the plurality of subsequent beacon frames is sent by the AP station or received by the non-AP station, m being equal to k times s.

In one or several embodiments, the method may be performed at the non-AP station, and the obtaining of the key shared with the AP station may comprise, at the non-AP station:

- receiving, from the AP station, a request for obtaining the shared key;
- upon reception of the request for obtaining the shared key, generating the shared key; and
- sending the generated shared key to the AP station.

According to these embodiments, the shared key may be dedicated to the non-AP station which has to change the value of its privacy parameters such as the EUI, and none of the other non-AP stations of the BSS has access to the key. Therefore, none of the other non-AP stations of the BSS can calculate the privacy parameters (e.g. EUI) of the non-AP station whose values must be changed. The security is therefore increased.

It is noted that the sending of the shared key by the non-AP station to the AP station is performed after their association, and therefore in an encrypted manner. Thus, a third party who would intercept the message containing the key could not use it.

In addition, the shared key may be generated pseudo-randomly. The security is therefore increased, since its value cannot be inferred by a third party.

Symmetrically, when the method is performed at the AP station, and the obtaining of the key shared with the non-AP station may comprise, at the AP station:

- sending, to the non-AP station, a request for obtaining the shared key; and
- in response to the request for obtaining the shared key, receiving the shared key from the non-AP station.

In one or several embodiments, the shared function may be a pseudo-random function, PRF. Therefore, the new value of the privacy parameter (e.g. EUI) is generated pseudo-randomly, and it cannot be inferred by a third party, which increases security and privacy. In addition, a pseudo-random function already exists according to the standard. Therefore, no new function is needed to implement the method for changing the privacy parameters of the target station.

In one or several embodiment, the current value of the shared parameter may be a current value of a EUI of the target station. By “current value of the EUI”, it is meant the value of the EUI at the time the new value is calculated, i.e. the value of the EUI before the changing. Alternatively, it may be the current value of any of the privacy parameters, or even be a mix (e.g. concatenation) of several of them.

Alternatively, the current value of the shared parameter may be a current time value. By “current time”, it is meant for example a time read from a clock at which the new value is generated. In these embodiments, the value of the current time may be rounded (e.g. to the nearest second, to the nearest tenth of a second, etc.) to ensure the value is the same at the AP station and at the non-AP station. Also, these embodiments require to define at which time the new value is calculated by both the AP station and the non-AP station (e.g., when the request for changing is sent/received, or when the change has to be applied, etc.).

In one or several embodiments, the non-AP station or AP station may store a registry comprising the value of the at least one privacy parameter of the target station, and the replacing of the value of the at least one privacy parameter by the calculated new value may comprise: replacing the value of the at least one privacy parameter of the target station in the registry by the calculated new value. In other words, at the time at which the change is to be applied, the registry of the AP station and the registry of the non-AP station may be updated with the new value to have mirrored values. After this update, all data transmissions between the AP stations and the non-AP are done with the new value of the, e.g. EUI.

In one or several embodiments, the EUI of the non-AP station may be a MAC address of the non-AP station, i.e. a EUI-48.

In one or several embodiments, the request for changing the value of the at least one privacy parameter may be sent by the AP station and received by the non-AP station. The request may be specific to one non-AP station (in this case, only the privacy parameter or parameters, e.g. EUI, of the concerned non-AP station are changed), or it may be sent to all the non-AP stations associated with the AP and supporting a privacy-parameters-changing procedure (in this case, all the privacy parameter or parameters, e.g. EUIs, of the non-AP stations are changed at the same time).

For example, the request for changing the value of the at least one privacy parameter may be a beacon frame. In this case, the request is sent to all the non-AP stations associated with the AP and supporting a privacy-parameters-changing procedure.

In addition, the indication relative to the target time at which the value of the at least one privacy parameter is to be changed may be a counter included in the beacon frame, the counter indicating a number of Target Beacon Transmission Times, TBTTs.

Furthermore, after the request for changing the value of the at least one privacy parameter, a plurality of subsequent beacon frames may be sent by the AP station and received by the non-AP station, each subsequent beacon frame including a respective value of the counter, the value of the counter being decremented by one for each subsequent beacon frame;

and the target time at which the value of the at least one privacy parameter is to be changed may be a time at which the beacon frame with a value of the counter equal to zero is sent from the AP station and received by the non-AP station.

Alternatively, the request for changing the value of the at least one privacy parameter may be sent by the non-AP station and received by the AP station. This reflects a station-oriented decision to change its own privacy parameters.

In one or more embodiments, the indication relative to a target time at which the value of the at least one privacy parameter is to be changed may be included in the request for changing the value of the at least one privacy parameter.

For example, the indication relative to the target time at which the value of the at least one privacy parameter is to be changed may be a number k of Target Beacon Transmission Times, TBTTs, in which the value of the at least one privacy parameter is to be changed. In this case, the value of the privacy parameter may be changed when a k-th beacon frame since the communicating of the request is sent from the AP station or received by the non-AP station.

Alternatively, the indication relative to a target time at which the value of the at least one privacy parameter is to be changed may be a time value. In this case, the value of the privacy parameter may be changed when a beacon frame corresponding to a first beacon frame after the time value is reached is sent from the AP station or received by the non-AP station.

In one or more embodiments, capabilities for implementing a procedure for changing the value of the at least one privacy parameter may have been exchanged during association between the non-AP station and the AP station. Therefore, each non-AP station declares if it supports the privacy-parameters-changing procedure and knows whether the AP station supports the privacy-parameters-changing procedure.

Correlatively, the invention also provides a wireless communication device comprising at least one microprocessor configured for carrying out the steps of any of the above methods. The wireless communication device is a non-AP MLD.

Another aspect of the invention relates to a non-transitory computer-readable medium storing a program which, when loaded into and executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Some embodiments of the present invention are illustrated by way of example, and not by way of limitation, in the FIGURES of the accompanying drawings, in which like reference numerals refer to similar elements and in which:

FIG. 10 illustrates examples frame formats to activate and operate a MAC address change procedure, according to one or several embodiments of the invention;

FIG. 11 illustrates an example of a frame format for operating a MAC address change procedure initiated by an AP, according to one or several embodiments of the invention;

FIG. 14 illustrates an exemplary protected action frame for operating the BSS RCM procedure, according to embodiments of the invention;

FIGS. 15*a* and 15*b* illustrate respectively a CPE list and a BPE list, listing privacy parameters of a non-AP station and of an AP station that have to be changed, according to embodiments of the invention, referred below to as "first embodiments";

FIGS. 16*a* and 16*b* illustrate respectively the corresponding CPE and BPE look-up tables matching each privacy parameter of the lists to a binary subset of the share function output;

DESCRIPTION OF SOME EMBODIMENTS

Figure 1:
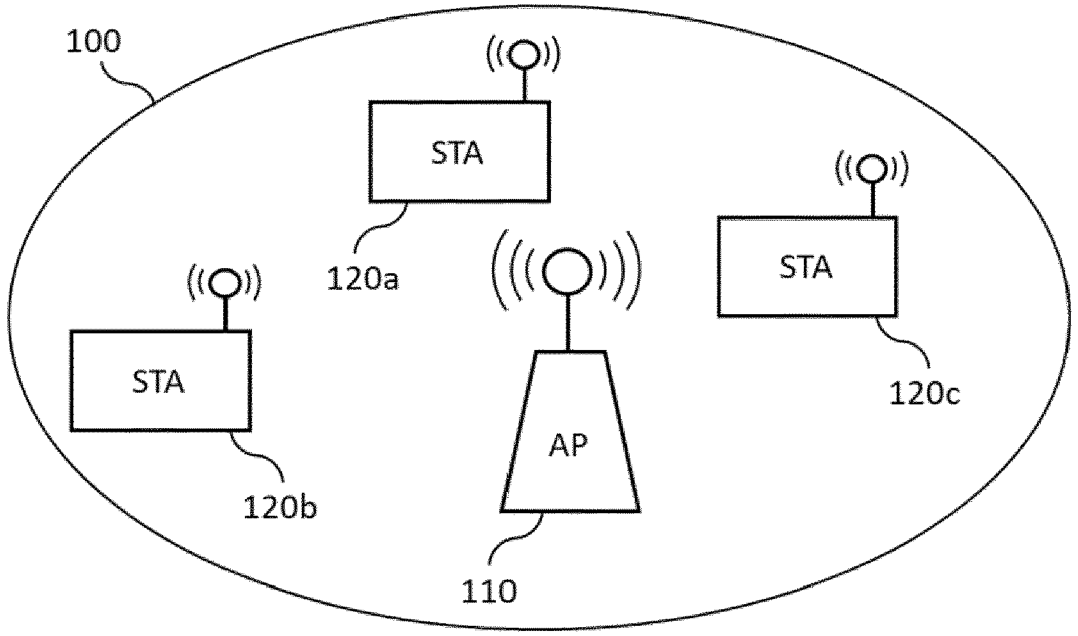
FIG. 1 illustrates an example of a network system in which embodiments of the invention may be used.

The IEEE 802.11 working group has then proposed a procedure to limit the risk of a user being traced, which consists in dynamically modifying the MAC address of the user device. This mechanism, called Randomized and Changing MAC (RCM) procedure, Changing only the MAC addresses is a first step to improve the privacy but it is often not sufficient, other elements, referred to as Personally Identifiable Information (PII) or privacy parameters, can also be dynamically modified in order to be not identifiable and/or not trackable. For instance, for the RCM procedure specified in the standard IEEE Std 802.11-2020, every time the MAC address of the non-AP STA is changed to a new random value, counters in all Sequence Number (SN) spaces used to identify each transmitted frame (MSDU or MMPDU) are reset randomly as well as the seeds of the scramblers used at PHY level for shuffling the frame data payload before transmission or de-shuffling upon reception.

Since 2019, a specific IEEE 802.11bi task group is in charge of proposing new technical features (beyond the RCM procedure) in order to enhance the privacy in 802.11 networks. At the current stage, it specifies a set of privacy requirements which extends the consideration beyond the sole MAC addresses, to new privacy parameters, referred to as Privacy Enhancements (PE) parameters, relative to AP station and/or non-AP station, while the non-AP station is currently associated or not with the AP station. Further, these multiple PE parameters are preferably simultaneously changed and randomized.

Below, it is therefore made indifferently reference to "privacy parameter" and "PE parameter" (or CPE or BPE parameter as specific implementations), the MAC address or EUI (standing for Extended Unique Identifier) being a mere example of a privacy parameter.

Embodiments of the invention propose a BSS or Client RCM procedure, to change one or more privacy or PE parameters of one or several target stations of the BSS without service interruption. For this, the AP station and the non-AP station or stations involved in the BSS or Client RCM procedure generate locally and in parallel the next random value or values for the considered privacy parameters by using a shared function so as to obtain the same results, hence mirrored values for the privacy parameters. These mirrored values are used in the subsequent communications between the stations.

In embodiments, the procedure performs simultaneous and randomized change of multiple privacy parameters. It relies on a shared function locally performed in parallel by the AP station and/or the non-AP stations for generating all at once the same next randomized values of a list of privacy parameters, still allowing no exchange of these new values over the air. These next values are then used as new values by the stations.

The stations, which store a privacy parameters register with all the current values for the privacy parameters of the stations with which they exchange data, update the register with the new values of the privacy parameters for the concerned target stations. Also, the stations apply the privacy parameters change in a synchronized manner, to prevent frames from being sent with old privacy parameter values, e.g. old MAC address, which is no longer relevant for the target station, or with privacy parameter values updated at one station but not at the other. Therefore, embodiments of the present invention propose mechanisms to ensure that the updating of the privacy parameters is done in a synchronized manner between the concerned stations, regardless of whether it is on AP or non-AP station's initiative.

According to specific embodiments, the invention proposes to change the MAC address of a non-AP station, while this non-AP station is associated with an AP (or "AP station"). Again, the MAC address is used here as an example, while any privacy parameter may be involved instead.

The MAC address, or EUI-48 address, of a device is an Extended Unique Identifier (EUI) composed of 48 bits. It can be administered universally or locally. A universally administered address is uniquely assigned to the device by the manufacturer. On the contrary, a locally administered address is assigned to the device by software or network administrator, and replaces the physical burned-in address. The second-least-significant bit of the first octet of the MAC address, i.e. the seventh bit of the address, also referred to as "U/L bit" (for "Universal/Local bit"), indicates whether it is universally (when set to 0) or locally (when set to 1) administered. The least-significant bit of the first octet of the MAC address, i.e. the eighth bit of the address, also referred to as "I/G bit" (for "Individual/Group bit"), indicates whether the frame is sent to only one receiving device (when set to 0, indicating unicast transmission) or to a plurality of devices (when set to 1, indicating multicast transmission).

In a BSS, the MAC addresses used by stations for over-the-air (OTA) communications are referred to as OTA MAC addresses and are indicated either in the Transmitter Address (TA) field or Receiver Address (RA) field of the IEEE 802.11 frames (corresponding to addresses 2 or 3). Hence, below, "MAC address" and "OTA MAC address" are indifferently used.

In order for the AP station and the non-AP station to be able to continue exchanging data or frames, the new MAC address of the non-AP station must be known by both the AP and the non-AP station. For this, the embodiments provide that the AP station and the non-AP station each determine in parallel the next MAC address of the non-AP station, so as to obtain the same result. This next MAC address is used as new MAC address identifying the non-AP station. The AP station, which stores a register with all the MAC addresses of the non-AP stations associated with it, updates the register with the new MAC address of the concerned non-AP station. Also, the AP station and the non-AP station apply the MAC change in a synchronized manner, to prevent frames from being sent with an old MAC address which is no longer the current address of the station, or with a MAC address updated at one entity but not at the other. Therefore, the present invention proposes mechanisms to ensure that the updating of the MAC address is done in a synchronized manner at the AP station and at the non-AP station.

In one or more specific embodiments, the invention therefore relates to a method to change the public MAC Address of an associated station using a standard pseudo-random generator based on shared private information. The change can be at the AP station's or non-AP station's initiative. This method makes correlation between a MAC address and a given station very difficult for non-registered station. Privacy of the given station is therefore improved.

One or more specific embodiments propose that both the non-AP station and the AP station calculate a same counter, this counter defining a target time at which the change of MAC address has to be applied by both stations. This counter made of a value representing the target time at which the value of the MAC address is to be changed is determined by using the shared function with a set of inputs comprising the current value of the shared parameter. Therefore, the updating of the MAC address is done in a synchronized manner at the AP station and at the non-AP station, and no information regarding the target random time at which the change has to be applied is exchanged between the non-AP station and the AP.

In the following, the procedure for changing a privacy parameter, e.g. the MAC address of a non-AP station already associated with an AP station, is referred to as "Enhanced RCM procedure", ERCM procedure, or "Seamless Enhanced RCM procedure", SERCM procedure. Therefore, all the acronyms "ERCM" used in the description may be replaced by "SERCM". ERCM or SERCM may be implemented on non-AP station's initiative to change one of its own privacy parameters, in which case it is made reference to "Client RCM procedure" ("Client" designating a non-AP station). On the other hand, when it is on AP station's initiative to change one of AP's own privacy parameters, it is made reference to "BSS RCM procedure".

The invention therefore seeks to fill in the lacks of the known technics in offering procedures that allow the randomization of privacy parameters of target stations during the lifetime of the BSS.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals, i.e. wireless devices or stations. A TDMA system may allow multiple user terminals to share the same frequency channel by dividing the transmission signal into different time slots or resource units, each time slot being assigned to different user terminal. An OFDMA system utilizes orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless device or station implemented in accordance with the teachings herein may comprise an access point (so-called AP) or not (so-called non-AP station or non-AP STA).

While the examples and embodiment are described in the context of Wi-Fi networks, the invention may be used in any type of wireless networks, like, for example, mobile phone cellular networks that implement very similar mechanisms.

FIG. 1 illustrates an example of a network system in which embodiments of the invention may be used.

FIG. 1 represents an 802.11 network (i.e. a Wi-Fi network) system 100 comprising four wireless devices: an access point (AP) station 110 and three non-AP stations (non-AP STAs) 120*a*, 120*b*, 120*c*. Of course, the number of non-AP stations 120*a*, 120*b*, 120*c* may be different from three. The AP station 110 provides wireless connections between the non-AP stations 120*a*, 120*b*, 120*c* and a wider network, such as the Internet. The connection of a non-AP station 120*a*, 120*b*, 120*c* to the AP station 110 is performed by a standardized process called association. Once a non-AP station 120*a*, 120*b*, 120*c* is associated with the AP station 110, the non-AP station 120*a*, 120*b*, 120*c* can send data to the network and receive data from the network through the AP station 110.

The AP station 110 may comprise, be implemented as, or known as a Node B, Radio Network Controller (RNC), evolved Node B (eNB), 5G Next generation base station (gNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology. It can be a standalone product or it may be integrated in a device, for instance a broadband remote access server (BRAS).

A non-AP station 120*a*, 120*b*, 120*c* may comprise, be implemented as, or known as a subscriber station, a subscriber unit, a mobile station (MS), a remote station, a remote terminal, a user terminal (UT), a user agent, a user device, a user equipment (UE), a user station (STA), or some other terminology. In some implementations, a non-AP station 120*a*, 120*b*, 120*c* may be or may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or a smartphone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the non-AP station 120*a*, 120*b*, 120*c* may be a wireless node. Such wireless node may provide, for example, connectivity for or to a network (e.g., a wide area network such as the Internet or a cellular network) via a wired or wireless communication link.

The AP station 110 manages a set of stations that together organize their accesses to the wireless medium for communication purposes. All the stations (AP station 110 and non-AP station 120*a*, 120*b*, 120*c*) form a service set, which may be referred to as basic service set, BSS (although other terminology can be used). It is noted that the AP station 110 may manage more than one BSS: each BSS is thus uniquely identified by a specific basic service set identifier (BSSID) and managed by a separate virtual AP station implemented in the physical AP station 110.

In order to ensure user privacy, the AP station 110 and the non-AP STAs 120*a*, 120*b*, 120*c* have been configured with a dot11MACPrivacyActivated set to true. This is a Management Information Base (MIB) variable controllable by an external management entity to define whether the non-AP STA can apply (variable set to true) specific mechanisms for enhancing the privacy at MAC level, including the RCM procedure, or not (variable set to false). The use of this variable (alternatively another variable may be defined) may be extended to mechanisms for enhancing the privacy of other privacy or PE parameters than the sole MAC addresses of the stations.

The IEEE 802.11bi task group has specified two sets of privacy features or mechanisms. The first one, referred to as set of Client Privacy Enhancements (CPE) features, prevents the identification and the tracking of a Client (non-AP STA). The second one, referred to as set of BSS Privacy Enhancements (BPE) features, prevents the identification and the tracking of a BSS.

From these, a CPE-capable AP is referred to as CPE AP and a CPE-capable non-AP STA is referred to as CPE non-AP STA or CPE Client. Similarly, a BPE-capable AP is referred to as BPE AP and a BPE-capable non-AP STA is referred to as BPE non-AP STA or BPE Client. In the same way, a non BPE-capable and/or non-CPE capable non-AP STA is referred to as legacy non-AP STA or legacy Client with respect to the BPE and/or CPE features.

Typically, the CPE features are initiated by a CPE Client, referring to as initiating CPE client, and the BPE features by the BPE AP. The CPE features involve the simultaneous and random change of multiple PE parameters, referred to as CPE parameters. Similarly, the BPE features involve the simultaneous and random change of multiple PE parameters, referred to as BPE parameters. The PE parameters of a station are own parameter identifying the station, that are used to efficiently communication with another station.

In the following, "PE" is used as a generalization of "BPE" and "CPE".

Depending on the scenario, the AP STA 110 is a CPE AP and the non-AP STA 120*a*, 120*b*, 120*c* are CPE Clients (e.g. scenarios of FIGS. 2*a*-2*b*, 4-11, 17*a*-17*d*, 19, 20), or the AP STA 110 is a BPE AP and the non-AP STA 120*a*, 120*b*, 120*c* are BPE Clients (scenarios of FIGS. 3*a*-3*b*, 4-11, 12*a*-14, 17*a*-17*d*, 19, 20). According to other embodiments, the AP STA 110 is both a CPE and BPE AP and the non-AP STA 120*a*, 120*b*, 120*c* are both CPE and BPE Clients.

Exemplary CPE parameters include the following ones which only regard the CPE Clients (the CPE parameters being therefore PE Client parameters):

The MAC address of the CPE Client (i.e. non-AP station) for over-the-air (OTA) communications, referred to as OTA MAC Address, which is indicated either in the Transmitter Address (TA) field or the Receiver Address (RA) field of the IEEE 802.11 frames (corresponding to address 2 or 3). Optionally, the CPE Client may have several OTA MAC addresses, each one used for a given purpose: a MAC address when exchanging data, another MAC address when exchanging measurements, a MAC address when transmitting, a MAC address when receiving, and so on.

The Sequence Number (SN) which is included in the Sequence Number field of the Sequence Control field of the MAC Header of an 802.11 frame (MSDU, A-MSDU, or MMPDU). It is a 12-bit field. The sequence number is incremented for each frame transmission and remains constant in case of a frame retransmission. It is therefore used by the CPE Client to uniquely identify a new MSDU (MAC Service Data Unit), A-MSDU (Aggregated-MSDU), or MMPDU (MAC Management Protocol Data Unit) to be transmitted.

The Packet Number (PN) which is included in the Packet Number field of the CCMP Header of the plaintext MAC payload of the frame. It is a 48-bit packet number. It is used for the encryption of the frame and allows to uniquely identify the frame being transmitted for replay detection. The packet number is incremented for each frame transmission and remains constant in case of a frame retransmission. It is therefore used by the CPE Client to uniquely identify a new frame to be transmitted.

The Association Identifier AID (AID) which is a unique identifier assigned by the AP station to the non-AP station during the association. It is a 16-bit field and it is included in many frames for different usages as the power saving or the resources allocation in the MU OFDMA.

The Scrambler Seed which corresponds to the seed used by the PLCP/OFDM PHY DATA scrambler to initialize its initial state (section 17.3.5.5), i.e. to initialize a local scrambler scrambling transmit data and/or descrambling receive data. It corresponds to a 7-bits parameter.

BPE parameters for BPE Clients, also named BPE Client parameters, include the same as the CPE parameters with respect to the BPE Clients.

Exemplary BPE parameters for the BPE AP, also named BPE AP parameters, include the following ones:

The OTA MAC address of the BPE AP which is indicated either in the Transmitter Address (TA) field or Receiver Address (RA) field of the IEEE 802.11 frames (corresponding to address 2 or 3). Optionally, the BPE AP may have several OTA MAC addresses, each one used for a given purpose as mentioned above for the CPE Clients.

The Scrambler Seed which corresponds to the seed used by the PLCP/OFDM PHY DATA scrambler to initialize its initial state (section 17.3.5.5), i.e. to initialize a local scrambler of the BPE AP, scrambling transmit data and/or descrambling receive data. It corresponds to a 7-bits parameter.

The Beacon Interval which corresponds to the difference or time interval between two Target Beacon Transmission Times (TBTTs), a TBTT being the time at which an AP station is configured to send its beacon frame. The beacon Interval is given in Time Units (TU), a TU being equal to 1024 microseconds. It is a 16-bit field set to the number of TU between Beacon transmissions and it is included in the Beacon Interval field of the beacon frames These lists of CPE/BPE parameters are not exhaustive and other CPE/BPE parameters can be considered. For instance, as another BPE AP parameter, the BSS color which has been introduced by IEEE 802.11ax task group used to identify a BSS may also be considered. It is included in the BSS Color field of the BSS Color Information of HE Operation element which is included in Beacon, Probe Response and (Re) Association frames. It is a 6-bits parameter.

FIGS. 2*a*, 2*b*, 3*a* and 3*b* illustrate, using flowcharts, general steps of method for changing at least one value of a privacy parameter of a target station in a Basic Service Set, BSS, according to the embodiments of the invention.

Client-Initiated Procedures

Figure 2A:
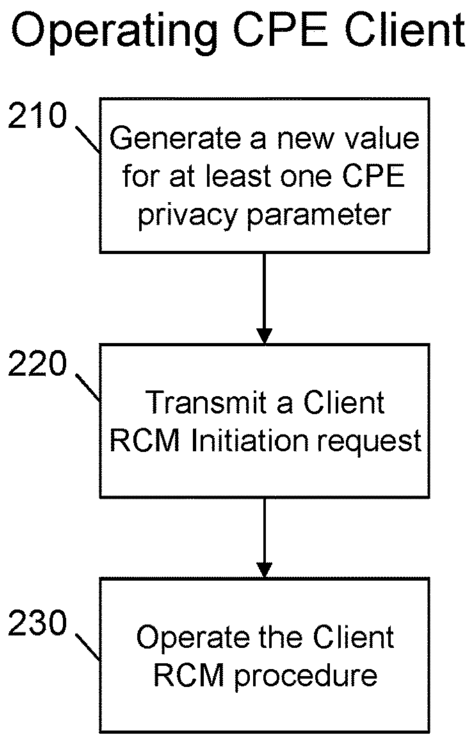
FIGS. 2*a* and 2*b* illustrate a Client-initiated (CPE) procedure for randomization of one or more privacy parameters of a CPE Client, according to embodiments of the invention.
Figure 2B:
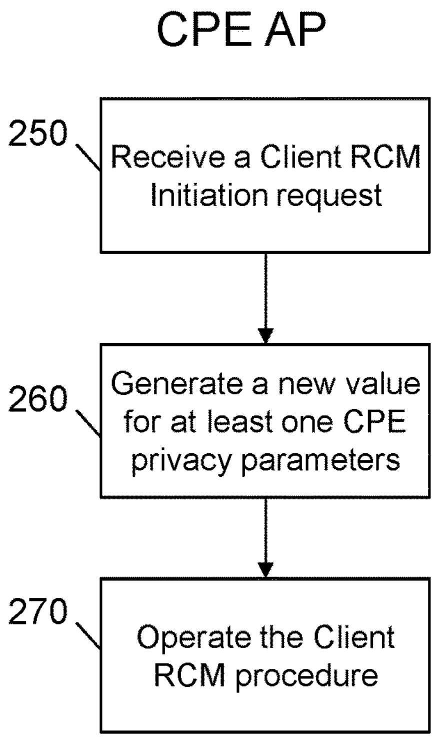
Figure 3A:
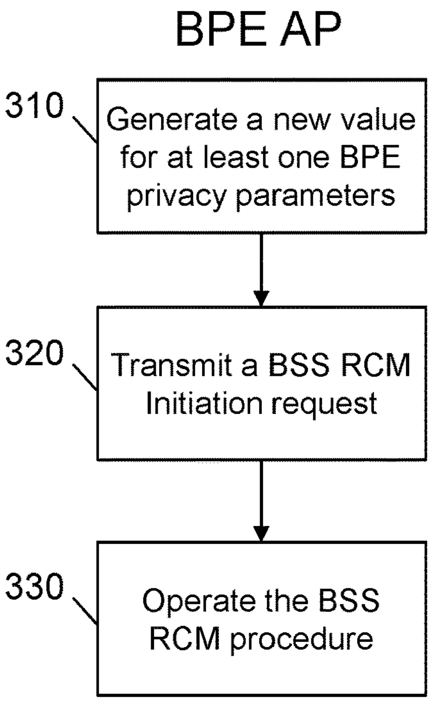
FIGS. 3*a* and 3*b* illustrate an AP-initiated (BPE) procedure for randomization of one or more privacy parameters of either the BPE AP or one or more BPE Clients or both, according to embodiments of the invention.
Figure 3B:
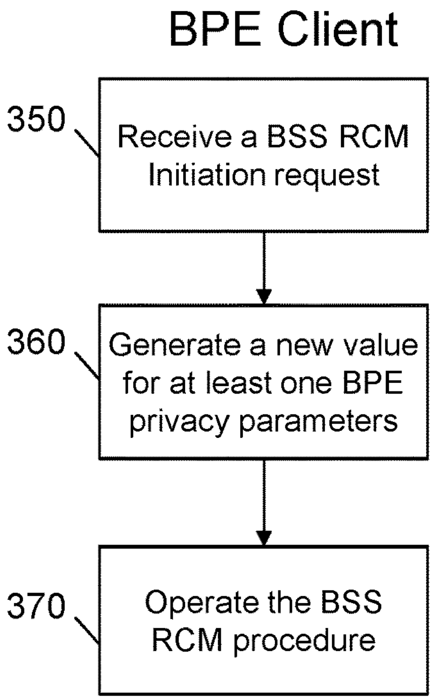

FIGS. 2*a* and 2*b* illustrate a Client-initiated (CPE) procedure for randomization of one or more privacy parameters of said CPE Client, while FIGS. 3*a* and 3*b* illustrate an AP-initiated (BPE) procedure for randomization of one or more privacy parameters of either the BPE AP or one or more BPE Clients or both.

The Client RCM procedure of FIGS. 2*a* and 2*b* is initiated by a CPE Client, referred to as operating CPE Client or operating station, and consists in assigning a new randomized value to each of one or more of its CPE privacy parameters. It means the operating CPE Client is the target station for which privacy parameters have to be changed.

For this change, the operating CPE Client and the CPE AP use a shared function such as the pseudo-random function (PRF) specified in the section 12.7.1.2 of the standard IEEE Std 802.11-2020. It is identified in the present document by the term PRCM PRF. According to other embodiments, the shared function is any block cipher algorithm allowing to cipher a block, with similar input parameters (shared key and shared parameter having a value varying over time). The description below mostly concentrates on the PRCM PRF for ease of explanation. However, similar considerations can be made with respect to any block cipher algorithm.

The PRCM PRF is based on 3 main input parameters, denoted K, A, B, as well as an auxiliary parameter Len specifying the number of pseudo-random bits (128, 192, 256, . . . ) generated by the PRCM PRF. For most embodiments below, Len may be set to 128.

The parameter A is a text string specific to the application for which the PRCM PRF is used. In the scope of the Client RCM procedure, it may be set to string "Client RCM". Obviously, any other text strings may be used.

The parameter B is a variable length string which shall be known by all the STAs impacted by the Client RCM procedure of the operating STA. It is a shared parameter for the calculation. According to an embodiment, this shared value is the current OTA MAC address of the operating STA or the current value of the privacy parameter to be changed. According to another embodiment, the shared value corresponds to any CPE parameter of the operating STA. According to another embodiment, it may contemplate using as another shared value, e.g. predefined values, as the current time, and so on.

The parameter K is a secret key specific to the operating STA.

In the scope of the Client RCM procedure, it may correspond to any key, referred to as IPRCM key, shared between the operating CPE Client and the CPE AP. Such a key identifies a station and is shared, in a secret fashion (hence it is a secret key), between the two stations to be known by both. It may be a secret cryptographic key shared between the CPE Client and the CPE AP. In one or more embodiments, the IPRCM key is the Pairwise Transient Key (PTK) generated in parallel by the CPE AP and the operating CPE Client during the 4-Way handshake mechanism when associating. In another embodiment, the IPRCM key may be inherited or derived from PTK by using any block ciphers which encrypt a block of data of fixed size (e.g. 128 bits). For instance, the key derivation function PBKDF2 as specified in IETF RFC 2898 may be used as it is already embedded in the stations, in particular to generate the Pairwise Master Key (PMK) from the Pre-Shared Key (PSK) and the Pairwise Transient Key (PTK) from the Pairwise Master Key (PMK).

In alternative embodiments, the IPRCM key may correspond to any key shared between the operating CPE Client and the CPE AP. For example, this shared key may be stored in the memory of the device comprising the CPE AP (e.g. an internet connection box), and may also be read by a user on the housing of this device. The user may then enter this shared key manually, for example by means of a touch screen, into the user equipment comprising the operating CPE Client. Of course, other solutions for the user equipment comprising the operating CPE Client to recover the IPRCM key are possible. For example, the IPRCM key may be read elsewhere than on the housing of the device comprising the CPE AP (e.g. on a notice supplied with the device), or can be received directly on the user equipment comprising the CPE Client from another equipment (e.g. by Short Message Service, SMS, or via a Bluetooth® connection).

In yet other embodiments, the IPRCM key may be generated at the CPE AP and transmitted to the operating CPE Client via a protected action frame for instance. Since the IPRCM key is exchanged between the operating CPE Client and the CPE AP, the communications between these entities must be secured. Of course, other embodiments are possible for obtaining and specifying the PRCM key, as long as both the operating CPE Client and the CPE AP obtain the same key. Exemplary exchanges of a key between a non-AP station and the AP station are described below with reference to FIGS. 6 and 10.

At the operating CPE Client side (FIG. 2*a*), when the latter initiates the Client RCM procedure at step 210, it launches the PRCM PRF with the input parameters set as described before for generating an output corresponding to a sequence of pseudo-random bits from which only the L leftmost bits are extracted, L being the number of bits required for the CPE privacy parameter or parameters to be changed. As an example, the leftmost 46 bits (i.e. the 46 most significant bits) are selected to generate a new MAC address value. The function generating these 46 pseudo-random bits is referred to as PRF-128/46.

Therefore, the operating CPE Client obtains the key K and the parameter B having a value varying over time, that are shared with the CPE AP station, and calculates a new value of the at least one privacy parameter by using the shared key and a current value of the shared parameter as inputs of the shared function.

The PRCM PRF may be reiterated with a different shared parameter B and/or a different text string A to generate a new value for another CPE privacy parameter. In some advantageous scenarios as illustrated below with reference to FIGS. 15*a* to 16*b*, multiple randomized values for multiple privacy parameters may be generated all at once from a single iteration of/call to the PRCM PRF.

Next, step 220 consists for the operating CPE Client in transmitting a Client RCM initiation request to the CPE AP, indicating that the Client RCM procedure has been initiated by the operating CPE Client. The latter therefore communicates, with the CPE AP, a request for changing the value of the at least one privacy parameter of the CPE Client at a target time. This is to trigger the CPE AP to change the same privacy parameters with the same values (as explained with reference to FIG. 2*b* below) in a synchronous manner.

In some embodiments, the request includes an indication, e.g. a Change Date field, relative to the target time at which the value of the privacy parameter or parameters is to be changed by both operating CPE Client and CPE AP. Details of such signaling are provided in some embodiments below, e.g. with reference to FIGS. 2*a* to 6*b* and 9*a* to 14.

Alternatively, a value representing the target time at which the value of the privacy parameter or parameters is to be changed can be determined (locally at both stations) by using the shared function with inputs comprising the current value of the shared parameter. Preferably, it may be generated from the same iteration of the shared PRCM PRF function when calculating the new value of the privacy parameter or parameters. Details of such embodiments are provided in some embodiments below, e.g. with reference to FIGS. 17*a* to 20.

According to some embodiments, the Client RCM initiation request is a new protected action frame, referred to as Client RCM action frame. For this, a new Category field assigned to a specific value in the range [31,125] as specified in the table 9-51 of the IEEE Std 802.11-2020, so far reserved. For the purpose of illustration, the category value assigned for Client RCM procedure action frame is 31. Of course, any other value in the above range may be used. Exemplary Client RCM initiation requests are shown under references 1040, 1400 and 1840 in FIGS. 10, 14 and 18, described below.

Next, at step 230, the operating CPE Client operates the Client RCM procedure at the target time, consisting in updating its register with the new randomized values of the CPE parameter or parameters. In other words, the operating CPE Client replaces a value of the at least one privacy parameter by the calculated new value of the at least one privacy parameter at the target time.

At the CPE AP side (FIG. 2*b*), the CPE AP receives, at step 250, the Client RCM Initiation request from the operating CPE Client. In practice, the CPE AP may receive plural requests from various "operating" CPE Clients wishing to change one or more of their CPE privacy parameters. The CPE AP has thus communicated, with the operating CPE Client, about a request for changing the value of the at least one privacy parameter at the target time.

At step 260, in response to the request, the CPE AP initiates the same Client RCM procedure with respect to the privacy parameter or parameters of the operating CPE client. The "same Client RCM procedure" means that the same shared function is used with the same input parameters as step 210 for generating the same output. In embodiments, the output corresponds to the same sequence of pseudo-random bits, from which the L leftmost bits are retrieved as new value for the privacy parameter or parameters to change. In other words, the CPE AP obtains the key K and the parameter B having a value varying over time, that are shared with the operating CPE Client, and calculates a new value of the at least one privacy parameter by using the shared key and a current value of the shared parameter as inputs of the shared function.

This ensures the operating CPE Client and the CPE AP have mirrored values for said privacy parameter or parameters of the operating CPE Client (target station).

Next, at step 270, the CPE AP operates the Client RCM procedure at the target time (either explicitly indicated in the request or locally determined) in updating its register by the new randomized values of the CPE parameters for the operating CPE Client.

AP-Initiated Procedures

The BSS RCM procedure of FIGS. 3*a* and 3*b* is initiated by a BPE AP and consists in assigning a new randomized value to each of one or more of its privacy parameters (BPE AP parameters), as well as optionally assigning new randomized values to privacy parameters of one or more or all of its BPE Clients (BPE Client parameters).

In these embodiments, the BPE AP is the target station for which BPE AP parameters have to be changed, and other stations (targeted BPE Clients) may also be concerned by changes of their BPE Client parameters.

Exemplary decision criteria to adopt one or the other strategies are provided below with reference to FIG. 12*a*.

For ease of explanation, the BSS RCM procedure in the following description only targets a change in at least one BPE AP parameter. Dedicated shared key and shared parameters may also be used to generate new values for the BPE Client parameters, using the shared function.

For the change of at least one BPE AP parameter, the BPE AP and BPE Clients also use a shared function as described above, such as the PRCM PRF. In the scope of the BSS RCM procedure, parameter A may be set to string "BSS RCM", although other text strings may be used. Shared parameter B may be set to the current OTA MAC address of the BPE AP or to the current value of its BPE AP parameter to be changed, or to any BPE AP parameter, or even to any other shared value, e.g. predefined values, as the current time, and so on. PCRM key K, referred to as GPRCM key, is a key shared by all BPE Clients associated with the BPE AP. Such a key identifies the BPE AP and is shared, in a secret fashion (hence it is a secret key), with the BPE Clients, to be known by both. It may be a secret cryptographic key shared between the BPE AP and the BPE Clients. In one or more embodiments, the GPRCM key is the Groupwise Temporal Key (GTK) provided by the AP station in the EAP-Key Message 3 during the 4-Way handshake mechanism with the non-AP stations wishing to associate. This GTK is conventionally used to generate the encryption keys which are used to cipher data sent by the AP station over the wireless medium. In another embodiment, the GPRCM may be inherited or derived from GTK by using any block ciphers which encrypt a block of data of fixed size.

For instance, the key derivation function PBKDF2 as specified in IETF RFC 2898 may be used as it is already used embedded in the stations, in particular to generate the Pairwise Master Key (PMK) from the Pre-Shared Key (PSK) and the Pairwise Transient Key (PTK) from the Pairwise Master Key (PMK).

Similar to the IPRCM key, in alternative embodiments, the GPRCM key may correspond to any key shared between the BPE AP and all its associated BPE Clients as described above, and/or may be generated by the BPE AP and transmitted to the BPE Clients via for instance protected action frame or an encrypted information element in the beacon frame. Since the GPRCM key is exchanged between the BPE AP and all its associated BPE Clients, the communications between these entities is preferably secured. Of course, other embodiments are possible for obtaining and specifying the GPRCM key, as long as both the BPE AP and BPE Client obtain the same shared key.

At the operating BPE AP side (FIG. 3*a*), when the latter initiates the BSS RCM procedure at step 310, it launches the PRCM PRF with the input parameters set as described before for generating an output corresponding to a sequence of pseudo-random bits from which only the L leftmost bits are extracted, L being the number of bits required for the BPE AP parameter or parameters to be changed. As an example, the leftmost 46 bits (i.e. the 46 most significant bits) are selected to generate a new MAC address value. The function generating these 46 pseudo-random bits is referred to as PRF-128/46.

Therefore, the BPE AP obtains the key K and the parameter B having a value varying over time, that are shared with the BPE Client or Clients, and calculates a new value of its at least one privacy parameter by using the shared key and a current value of the shared parameter as inputs of the shared function.

The PRCM PRF may be reiterated with a different shared parameter B and/or a different text string A to generate a new value for another of its BPE privacy parameters. In some advantageous scenarios as illustrated below with reference to FIGS. 15*a* to 16*b*, multiple randomized values for multiple BPE AP parameters may be generated all at once from a single iteration of/call to the PRCM PRF.

Next, step 320 consists for the BPE AP in transmitting a BSS RCM initiation request to the BPE Client or Clients, indicating that the BSS RCM procedure has been initiated by the BPE AP. In practice, the BPE AP may send the request to a single BPE Client, to plural BPE Clients or to all BPE Clients of the BSS. Exemplary implementations are illustrated below with reference to FIGS. 12*a* to 14.

The BPE AP therefore communicates, with the BPE Clients, a request for changing the value of the at least one BPE AP parameter at a target time. This is to trigger the BPE Clients to change the same BPE AP parameters with the same values (as explained with reference to FIG. 3*b* below) in a synchronous manner.

In some embodiments, the request includes an indication, e.g. a Change Date field, relative to the target time at which the value of the privacy parameter or parameters is to be changed by both the BPE AP and the BPE Clients. Details of such signaling are provided in some embodiments below, e.g. with reference to FIGS. 2*a* to 6*b* and 9*a* to 14.

Alternatively, a value representing the target time at which the value of the privacy parameter or parameters is to be changed can be determined (locally at both stations) by using the shared function with inputs comprising the current value of the shared parameter. Preferably, it may be generated from the same iteration of the shared PRCM PRF function when calculating the new value of the privacy parameter or parameters. Details of such embodiments are provided in some embodiments below, e.g. with reference to FIGS. 17*a* to 20.

According to some embodiments, the BSS RCM initiation request is a new protected action frame, referred to as BSS RCM action frame. For this, a new Category field assigned to a specific value in the range [31,125] as specified in the table 9-51 of the IEEE Std 802.11-2020, so far reserved. For the purpose of illustration, the category value assigned for BSS RCM procedure action frame is 32. Of course, any other value in the above range may be used. Exemplary Client RCM initiation requests are shown under references 1040, 1400 and 1840 in FIGS. 10, 14 and 18, described below.

Next, at step 330, the BPE AP operates the BSS RCM procedure at the target time, consisting in updating its register with the new randomized values of the BPE AP parameter or parameters. In other words, the BPE AP replaces a value of its at least one BPE AP parameter by the calculated new value of the at least one BPE AP parameter at the target time.

At the BPE Client side (FIG. 3*b*), each BPE Client receives, at step 350, the BSS RCM Initiation request from the BPE AP. The BPE Client has thus communicated, with the operating CPE Client, about a request for changing the value of the at least one BPE AP parameter, at the target time.

At step 360, in response to the request, the BPE Client initiates the same BSS RCM procedure with respect to the BPE AP parameter or parameters. The "same BSS RCM procedure" means that the same shared function is used with the same input parameters as step 310 for generating the same output. In embodiments, the output corresponds to the same sequence of pseudo-random bits, from which the L leftmost bits are retrieved as new value for the BPE privacy parameter or parameters to change. In other words, the BPE Client AP obtains the key K and the parameter B having a value varying over time, that are shared with the BPE AP, and calculates a new value of the at least one privacy parameter by using the shared key and a current value of the shared parameter as inputs of the shared function.

This ensures the BPE AP and the BPE Client have mirrored values for said BPE AP parameter or parameters of the BPE AP (target station).

Next, at step 370, the BPE Client operates the BSS RCM procedure at the target time (either explicitly indicated in the request or locally determined) in updating its register by the new randomized values of the BPE AP parameters.

Exemplary Procedures to Change the EUI of a Non-AP Station

Exemplary methods for changing a value of a EUI of a non-AP station associated with an AP station are now described with reference to FIGS. 4 to 11. As mentioned above, these exemplary methods may be extended to any CPE or BPE privacy parameter of the non-AP station. These exemplary methods implement either a Client RCM procedure described above (FIGS. 2*a* and 2*b*) or a BSS RCM procedure described above (FIGS. 3*a* and 3*b*) depending on the station initiating the procedure.

Figure 4:
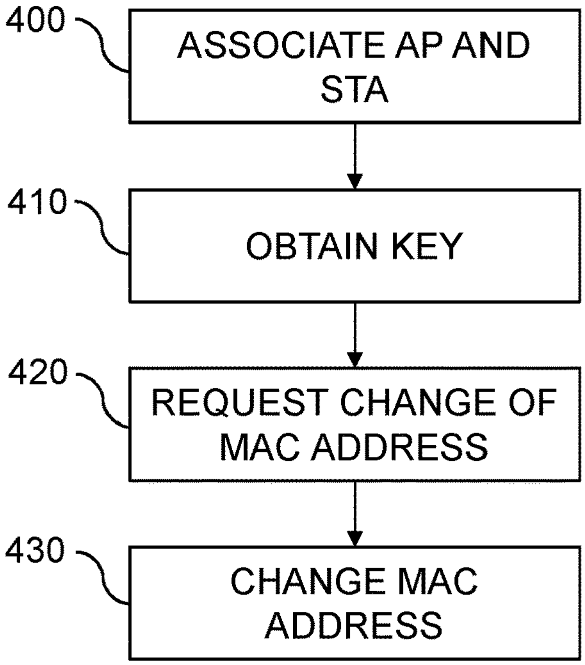
FIG. 4 is an example of a flow chart describing a method for changing a MAC address of a non-AP station associated with an AP, according to one or several embodiments of the invention.

FIG. 4 is an example of a flow chart describing a method for changing a MAC address of a non-AP station associated with an AP, according to one or several embodiments of the invention. It represents an Enhanced RCM (ERCM) procedure allowing the dynamic change of the MAC address of a non-AP STA when it is associated with an AP. As detailed below, after association, encrypted information (ERCM key)

is shared between AP and non-AP STA. Then, upon AP or non-AP STA request, both AP and non-AP STA compute a new transient MAC address for the changing STA, without sharing it, by using same pseudo-random generator with same parameters. Then, at the request for changing the MAC address of the non-AP station initiated by the AP or the non-AP STA, both AP and non-AP STA apply the MAC address change for the changing STA.

In one or more embodiments, both the non-AP station and the AP may be configured with a dot11MACPrivacyActivated set to true, as it is the case for the non-AP station (only) in the standardized RCM mechanism.

At a first step 400, the non-AP station associates with the AP according to protocols defined in IEEE 802.11 standards. During the association (step 400), the non-AP station and the AP declare their capabilities, in particular their capabilities to implement a mechanism for changing the MAC address of the non-AP station, when it is associated with an AP ("ERCM capability"). For example, the ERCM capability may be signaled by using a frame format 700 as described with reference to FIG. 7. It is noted that from the moment the non-AP station and the AP are associated, communications between them are secured.

Then, a key, referred to as "ERCM key", is obtained at both the non-AP station and the AP (step 410). The ERCM key is a key known by the non-AP station and the AP, which is used to calculate the new MAC address of the non-AP station.

In one or more embodiments, the ERCM key may be a key obtained during the authentication and association procedures between the non-AP station and the AP. For example, after a successful authentication, the non-AP station and the AP have a shared key called Pairwise Master Key (PMK), which is common to all the non-AP stations of the BSS. After authentication, a 4-Way handshake is performed, during which a key specific to each non-AP station is derived from the PMK, called Pairwise Transient Key (PTK), which is the key to be used for ciphering communications between the non-AP station and the AP. In one or several embodiments, the PTK may be used as ERCM key.

In alternative embodiments, the ERCM key may correspond to any key shared between the non-AP station with the AP. For example, this shared key may be stored in the memory of the device comprising the AP (e.g. an internet connection box), and may also be read by a user on the housing of this device. The user may then enter this shared key manually, for example by means of a touch screen, into the user equipment comprising the non-AP station. Of course, other solutions for the user equipment comprising the non-AP station to recover the ERCM key are possible. For example, the ERCM key may be read elsewhere than on the housing of the device comprising the AP (e.g. on a notice supplied with the device), or can be received directly on the user equipment comprising the non-AP station from another equipment (e.g. by Short Message Service, SMS, or via a Bluetooth® connection). It is noted that in these embodiments, the ERCM key is common to all the non-AP stations.

In the above embodiments, the ERCM key is not exchanged between the non-AP station and the AP. Therefore, the ERCM key cannot be recovered by a third party which would listen to the communications between the two entities (and could thus also calculate the next MAC address of the non-AP station), which ensures the security of the MAC address change procedure. In these embodiments, steps 400 and 410 can be carried out in either order.

Figure 8:
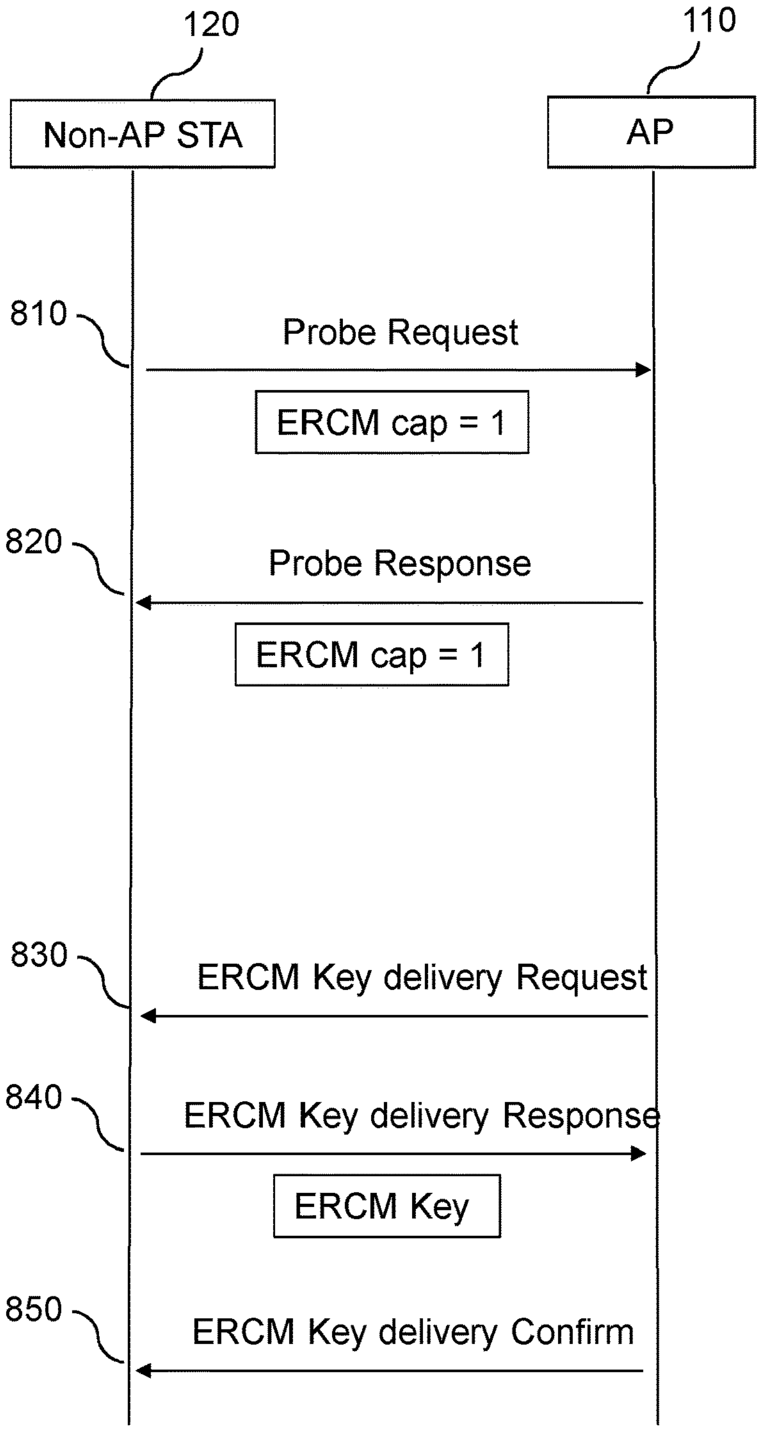
FIG. 8 illustrates an example of a sequence of steps for activating a procedure for changing the MAC address of a non-AP station associated with an AP, according to one or several embodiments of the invention.

In other embodiments, the ERCM key may be generated at the non-AP station and transmitted to the AP, as in steps 830, 840 and 850 of FIG. 8. Since the ERCM key is exchanged between the non-AP station and the AP, the communications between these entities must be secured. Therefore, in these embodiments, step 410 must be performed after step 400.

Of course, other embodiments are possible for step 410, as long as both the non-AP station and the AP obtain the same key.

In steps 400 and 410, it is assumed that the MAC address of the non-AP station has a first value, known (and stored) by both the non-AP station and the AP.

At step 420, a request for changing the MAC address of the non-AP station is exchanged between the non-AP station and the AP. As detailed below, this request may be sent by the non-AP to the AP, or by the AP to the non-AP station. To ensure that both the non-AP station and the AP start using the new MAC address at the same time (and thus avoid problems with frames sent, whose MAC address field does not correspond to the current MAC address of the non-AP station), this request may contain an indication relative to a time (also known as "target time") after which the new MAC address must be used. Examples of such indication are provided with reference to FIGS. 9*a* and 9*b*. In the following, the time at which the new MAC address must be used is referred to as "ERCM Date" or "ERCM Change Date".

Alternatively, the indication relative to a time after which the new MAC address must be used may not be included in the request, and may be obtained by other means. For example, it may be decided that the MAC address of the non-AP station is changed periodically, and the next time at which the MAC address is to be changed corresponds to the next instant of the periodical time sequence.

The new MAC address is then calculated in parallel by both the non-AP station and the AP. From the moment the ERCM change Date is reached, the new calculated MAC address is used for communications between the non-AP station and the AP (step 430).

As mentioned above, there is a synchronous change of the MAC address. At the request for changing the MAC address of the non-AP station initiated by the AP or the non-AP STA, both AP and non-AP STA apply the MAC address change for the changing STA. In case of AP initiation, ERCM is intended to all the non-AP stations ERCM-capable. ERCM procedure may make use of a new ERCM IE to be included in the beacon frame including an ERCM Change counter corresponding to the number of TBTTs until the next transient MAC address is effective, as detailed below with reference to FIG. 11. In case of non-AP initiation, ERCM procedure may make use of a new action frame including an ERCM Change date corresponding to the number of TBTTs until the next transient MAC address is effective, as detailed below with reference to FIG. 10.

It is noted that the new MAC address may be calculated at any time between steps 420 and 430, or even at the same time as step 430, when the change is operated (i.e. when the new calculated MAC address becomes the address of the non-AP station).

To calculate the new MAC address of the non-AP station, a procedure similar to that currently used for the standardized RCM mechanism may be applied. More specifically, the U/L bit of the new MAC address is set to 1, the I/G bit is set to 0, and the remaining 46 bits are randomly generated. For instance, the remaining 46 bits can be generated by using the pseudo-random function (PRF) specified in the section 12.7.1.2 of the standard IEEE Std 802.11-2020 and defined as follows:

PRF(K, A, B, Len)
for i←0 to do
R←R||H-SHA-1(K, A, B, i)
return L(R, 0, Len)
where Len is the number of bits (128, 192, 256, . . . ).

More specifically, the PRF-128 (i.e. PRF(K, A, B, 128)), which generates 128 pseudo-random bits, may be used. From the generated 128 bits, the leftmost 46 bits (i.e. the 46 most significant bits) may be selected. This function is referred to as PRF-128/46.

The PRF function of the standard is based on 3 input parameters, denoted K, A and B. K is a secret key coded on 256 bits, A is a text string specific to the application for which the PRF is used, and B is a variable length string. To calculate the new MAC address, both the non-AP station and the AP apply the same PRF function to the same input parameters, to therefore obtain a same output result, which constitutes the new MAC address of the non-AP station. The input parameters used for this computation may be as follows: K is set to the ERCM key obtained at step 410 and A is set to "ERCM" to indicate that the PRF is used for calculating a new MAC address in the context of an ERCM mechanism. B may set to any value known by both the non-AP station and the AP, and changing over time. For example, B may be the current MAC address of the non-AP station, an actual current time (in this case, the current time may be rounded, for example to the nearest tenth of second or to the nearest second, to avoid problems due to an imperfect synchronization between the clocks of the non-AP station and of the AP), etc. Examples and embodiments are detailed below.

It is noted that, according to different embodiments of the invention, the above method may be applied to only one non-AP station of a BSS, or to a subgroup of non-AP stations (each AP-(non-AP station) couple applying in parallel the changing method), or to all non-AP stations of the BSS.

Figure 5A:
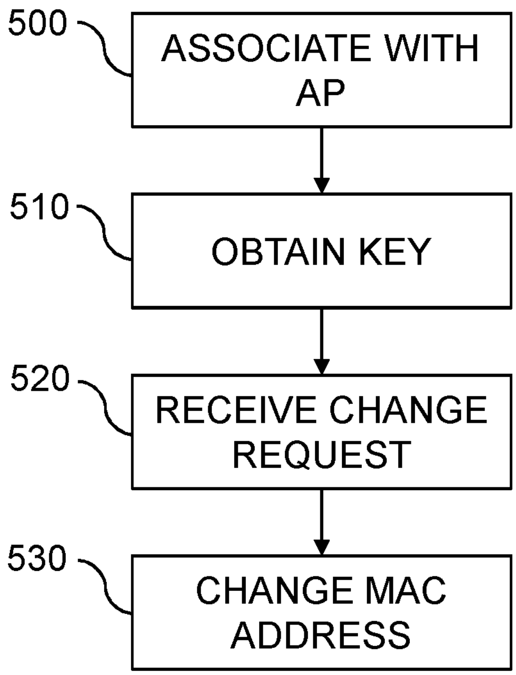
FIGS. 5*a* and 5*b* illustrate steps performed at a non-AP station for changing its MAC address, according to one or several embodiments of the invention.
Figure 5B:
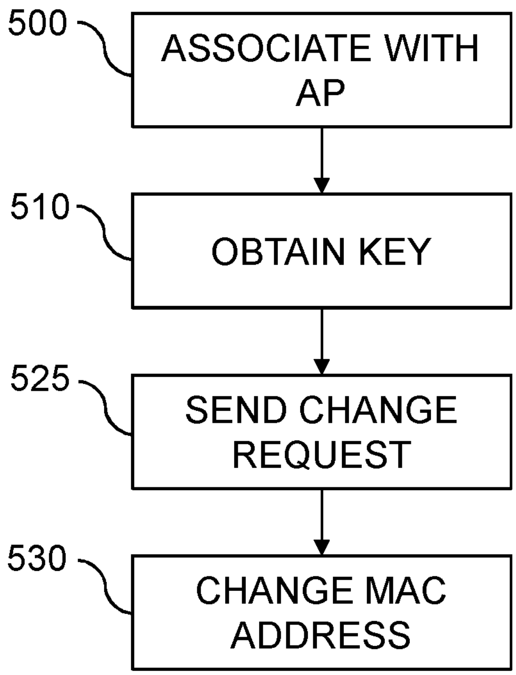

FIGS. 5*a* and 5*b* illustrate steps performed at a non-AP station for changing its MAC address, according to one or several embodiments of the invention.

More specifically, FIG. 5*a* illustrates steps performed at a non-AP station for changing its MAC address at its own request, and FIG. 5*b* illustrates steps performed at a non-AP station for changing its MAC address at the request of the AP. It is noted that these embodiments are not mutually exclusive and can coexist in the same non-AP station. For example, the AP may be configured to indicate at certain times (for example periodically) to the non-AP station that the latter has to change its MAC address, while the non-AP station may be configured to indicate at other times corresponding to particular events (for example, when the non-AP station stays still for a predefined time or sends the same type of traffic for a predefined time) that it wants to change its MAC address.

It is noted that steps 500, 510, 520 (FIG. 5*a*) or 525 (FIG. 5*b*) and 530 are parts of steps 400, 410, 420 and 430 of FIG. 4, respectively, performed by the non-AP station.

With reference to FIG. 5*a* and FIG. 5*b*, the non-AP station first associates with the AP (step 500). During the association (step 500), the non-AP station and the AP declare their capabilities, in particular their capabilities to implement a mechanism for changing the MAC address of the non-AP station, when it is associated with an AP ("ERCM capability"). For example, the ERCM capability may be declared by using a frame format 700 as described below with reference to FIG. 7.

Then, the "ERCM key" may be obtained by the non-AP station (step 510) as detailed above with reference to FIG. 4.

In embodiments represented in FIG. 5*a*, a request for changing the MAC address of the non-AP station is received by the non-AP station (step 520), for example from the AP (as an alternative, the request may be sent from a third device of the network to both the non-AP station and the AP). In embodiments represented in FIG. 5*b*, the request for changing the MAC address of the non-AP station is sent from the non-AP station (step 525), for example to the AP (as an alternative, the request may be sent to a third device of the network, which transmits it to the AP). In one or more embodiments, the request may comprise an indication relative to the ERCM change Date, i.e. the date at which the change must be applied by both the non-AP station and the AP. Alternatively, the ERCM change Date may be obtained at the non-AP station and at the AP by other means, for example from a third-party device, or according to a predefined list of times (periodic or not) at which the MAC address must be changed.

The new MAC address is then calculated by the non-AP station and the change is operated at the ERCM change Date (step 530), as explained above with reference to FIG. 4. It is noted that the new MAC address may be calculated at the ERCM change Date (i.e. at step 530) or before (e.g. between steps 520/525 and 530, or even before 520/525). However, the effective change is performed when the ERCM date is reached.

Figure 6A:
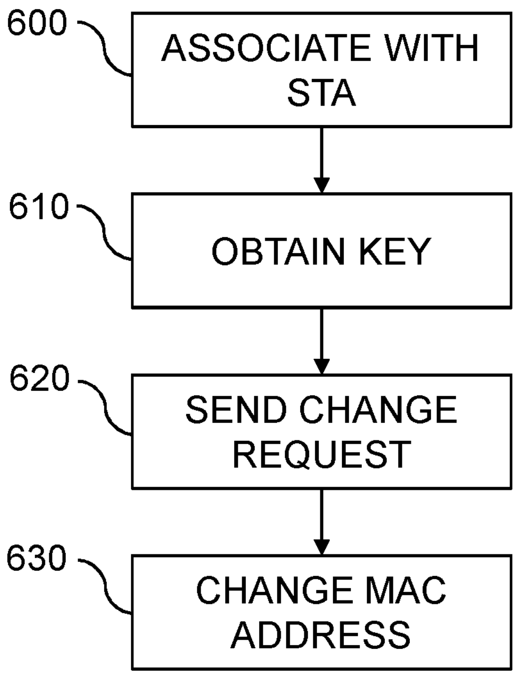
FIGS. 6*a* and 6*b* illustrate steps performed at an AP for changing the MAC address of a non-AP station with which it is associated, according to one or several embodiments of the invention.
Figure 6B:
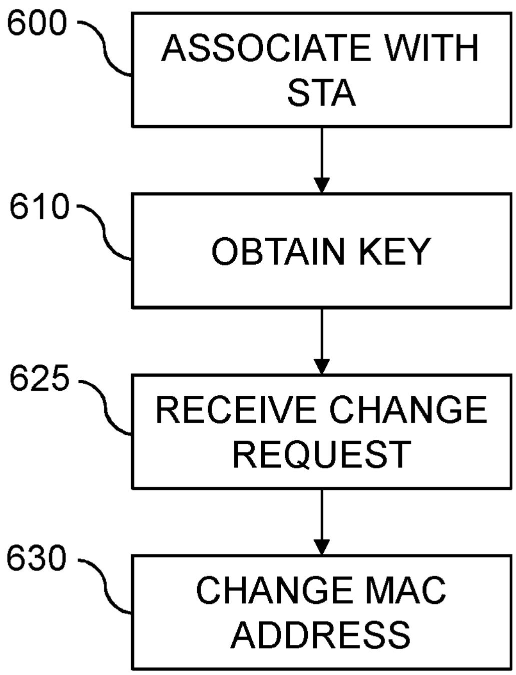

FIGS. 6*a* and 6*b* illustrate steps performed at an AP for changing the MAC address of a non-AP station with which it is associated, according to one or several embodiments of the invention.

More specifically, FIG. 6*a* illustrates steps performed at the AP for changing the MAC address of a non-AP station associated with the AP, at the request of the non-AP station (or, alternatively, of a third device of the network). FIG. 6*b* illustrates steps performed at the AP for changing the MAC address of a non-AP station associated with the AP, at its own request. By "changing the MAC address of a non-AP station associated with the AP", it is meant that the AP calculates a new value and stores as new MAC address of the non-AP station the calculated value. As soon as the ERCM date is reached, this new MAC address becomes the one used in the exchanges of frames between the AP and the non-AP station.

Steps of FIGS. 6*a* and 6*b* respectively correspond to steps of FIGS. 5*a* and 5*b*, at the AP's side. It is noted that steps 600, 610, 620 (FIG. 6*a*) or 625 (FIG. 6*b*) and 630 are parts of steps 400, 410, 420 and 430 of FIG. 4, respectively, performed by the AP.

With reference to FIG. 6*a* and FIG. 6*b*, the AP first associates with the non-AP station (step 600). During the association (step 600), the non-AP station and the AP exchange messages to signal to each other their capabilities, in particular their capabilities to implement a mechanism for changing the MAC address of the non-AP station, when it is associated with an AP ("ERCM capability"). For example, the ERCM capability may be declared by using a frame format 700 as described with reference to FIG. 7.

Then, the "ERCM key" is obtained by the AP (step 610) as detailed above with reference to FIG. 4.

In embodiments represented in FIG. 6*a*, a request for changing the MAC address of the non-AP station is sent by the AP (step 620), for example to the non-AP station (as an alternative, the request may be sent to a third device of the network, which transmits it to the non-AP). In embodiments represented in FIG. 6*b*, the request for changing the MAC address of the non-AP station is received at the AP (step 625), for example from the non-AP station. In alternatives, the request may be sent from a third device of the network to both the non-AP station and the AP, or it may be sent from the non-AP station to a third device which transmits it to the AP.

In one or more embodiments, the request may comprise an indication relative to the ERCM change Date, i.e. the date at which the change must be applied by both the non-AP station and the AP. Alternatively, the ERCM change Date may be obtained at the non-AP station and at the AP by other means, for example from a third-party device, or according to a predefined list of times (periodic or not) at which the MAC address must be changed.

The new MAC address is then calculated by the non-AP station and the change is operated at the ERCM date (step 630), as explained above with reference to FIG. 4. It is noted that the new MAC address may be calculated at the ERCM date (i.e. at step 630) or before (e.g. between steps 620/625 and 630, or even before 620/625). However, the effective change is performed when the ERCM date is reached.

Figure 7:
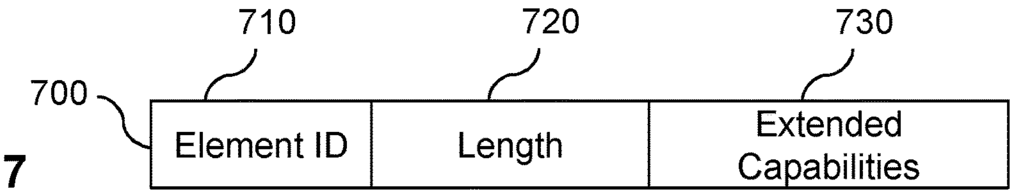
FIG. 7 illustrates an example of a frame format to advertise the capability of a station to support a MAC address change procedure, according to one or several embodiments of the invention.

FIG. 7 illustrates an example of a frame format to advertise the capability of a station to support a MAC address change procedure, according to one or several embodiments of the invention. An ERCM Capability field is used in the STA and AP to advertise their capability to support ERCM.

In one or more embodiments, the capability for a station (non-AP station and AP) to support ERCM procedure may be signalled during association in an Extended Capabilities Information Element (IE) 700 as defined in the section 9.4.2.26 of the standard IEEE Std 802.11-2020.

As represented in FIG. 7, the Extended Capabilities IE 700 contains three fields: an Element ID field 710, a length field 720 and an Extended Capabilities field 730. The Element ID field 710 is set to value '127' corresponding to 'Extended Capabilities' extended. The length field 720 indicates the number of octets in the Extended Capabilities field 730 excluding the Element ID field 710 and the length field 720. For illustrative purpose, it may be set to n=16 octets. The Extended Capabilities field 730 is a bit field indicating the extended capabilities being advertised by the station transmitting the IE. The Extended Capabilities field is shown in Table 9-153 of the standard IEEE Std 802.11-2020.

A bit so far reserved in standard may be assigned to the ERCM capability, to indicate that the station supports ERCM procedure. It may correspond to the k-th bit of the Extended Capabilities field 730, k being an integer between 88 and 8*n, n being the length of the Extended Capabilities field 730 expressed in number of bytes. When this bit is set to 1, it may indicate that the station supports ERCM procedure, and when this bit is set to 0, it may indicate that ERCM is not supported by the station.

A new row may be added to Table 9-153—Extended Capabilities field, Clause 9.4.2.26 of the standard IEEE Std 802.11-2020.

Insert new row in Table 9-153-Extended Capabilities field, Clause 9.4.2.26

| Bit | Information | Notes |
|---|---|---|
| k | Enhanced RCM Capability | The STA sets Enhanced RCM Capabilities bit to 1 to indicate support for Enhanced RCM and sets to 0 if Enhanced RCM is not supported. |

As represented in FIG. 8, in one or several embodiments, after association, encrypted information (ERCM key) is shared between AP and non-AP via specific action frames.

FIG. 8 illustrates an example of a sequence of steps for activating a procedure for changing the MAC address of a non-AP station associated with an AP, according to one or several embodiments of the invention.

First, the non-AP station 120 may send a probe request (step 810) for initiating an association procedure with the AP 110. The probe request may contain an Extended Capabilities IE 700 as defined above with reference to FIG. 7, for which the k-th bit of the Extended capabilities field 730, corresponding to the ERCM Capability, is set to 1 ("ERCM cap=1" in FIG. 8).

Next, AP 110 may send a probe response (step 820) to non-AP station 120 in response to the probe request. The probe response may also contain an Extended Capabilities IE 700 for which the k-th bit of the Extended capabilities field 730, corresponding to the ERCM Capability, is set to 1.

As both AP 110 and non-AP station 120 support ERCM, an ERCM procedure may be initiated. The ERCM initiation is performed after the association procedure and the establishment of the security context, so as the payload of the transmitted frames is encrypted.

In one or more embodiments, the ERCM procedure may be initiated by the AP 110. In such embodiments, the AP 110 may transmit (step 830) a request to the non-AP station 120 to obtain an ERCM key. Alternatively, the request may be sent to a third device which transmits it to the non-AP station 120. For example, this request may be an "ERCM Key delivery Request" 1010 as detailed below with reference to FIG. 10.

At the reception of the ERCM Key delivery Request, the non-AP station 120 may generate a key, for instance on 256 bits, called ERCM key. This key is intended to be used for generating the next MAC address of the non-AP station 120 at both the non-AP station 120 and the AP 110, as described above, with reference to FIG. 4. The ERCM key may be constant, or it may vary, for instance for each SSID, AP or ESS, or fully random.

Once the ERCM key is generated, the non-AP station 120 may send it to the AP 110 in a message (step 840). This message may be for example an "ERCM Key delivery Response" 1020 as detailed below with reference to FIG. 10.

At the reception of the message comprising the ERCM Key, the AP 110 may extract the key from the received message and store it. Also, in an optional step 850, the AP 110 may acknowledge the reception of the ERCM key to the non-AP station 120 by sending a confirmation message. For example, such message may be an "ERCM delivery Confirm" 1030 as detailed below with reference to FIG. 10.

According to other embodiments of the invention, the ERCM procedure may be initiated by a non-AP station 120. In such embodiments, the non-AP STA 120 may generate and transmit the ERCM Key to the AP 110 (step 840) without having received any ERCM Key delivery Request. In such embodiments, step 830 is omitted.

Figure 9A:
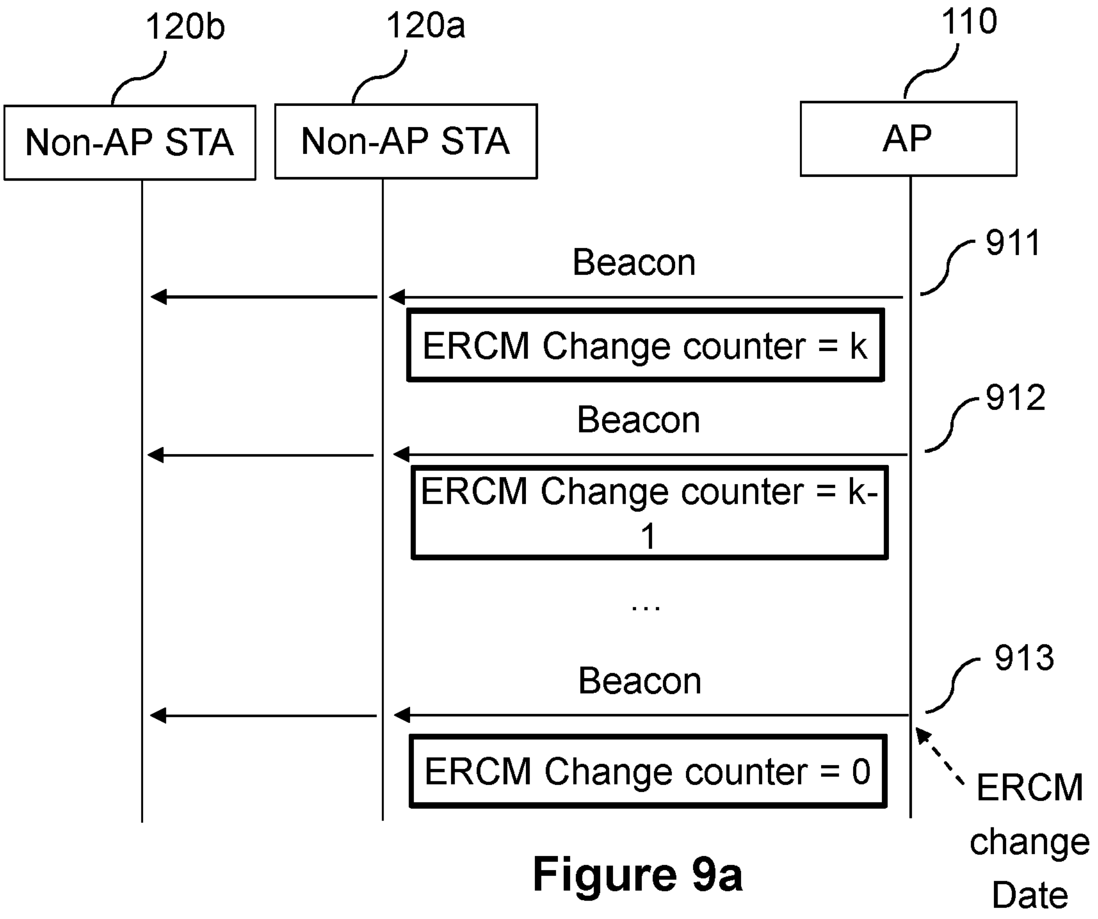
FIGS. 9*a* and 9*b* illustrates examples of sequence of steps for operating a procedure for changing the MAC address of a non-AP station associated with an AP, according to one or several embodiments of the invention.
Figure 9B:
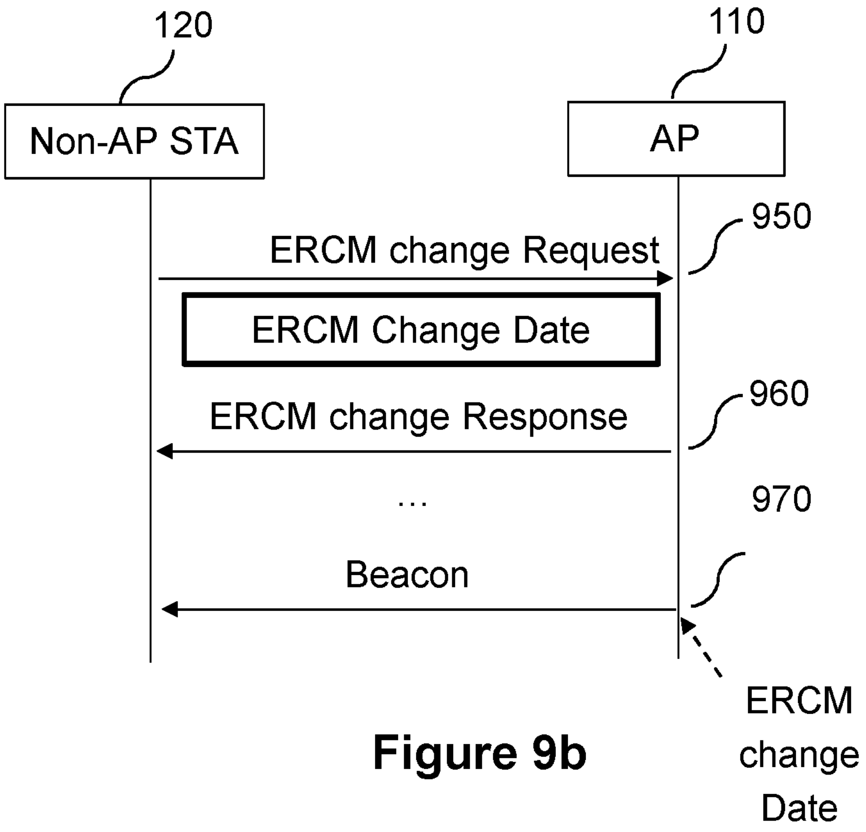

Alternatively, the non-AP station 120 may send a request for changing its MAC address to the AP (e.g. as in step 950 of FIG. 9*b*). In response to this request, the AP may send a request for obtaining an ERCM key (step 830) to the non-AP station. In such embodiments, step 830 is implemented.

As an alternative, whether the ERCM procedure is initiated by the non-AP station 120 or by the AP 110, the non-AP station 120 and the AP 110 may already have the ERCM key and steps 830, 840 and 850 may be omitted.

FIGS. 9*a* and 9*b* illustrates examples of sequence of steps for operating a procedure for changing the MAC address of a non-AP station associated with an AP, according to one or several embodiments of the invention. The changing procedure may be operated as soon as the initiation procedure (for example according to FIG. 8) is completed.

The changing procedure basically comprises two steps: the computation of the new MAC address for each non-AP station 120, and the effective change of the MAC address at a date, called ERCM change Date, from which the new calculated MAC address is used for data exchanges between the AP 110 and the non-AP station 120. Therefore, during the changing procedure, each non-AP station 120 changes its MAC address from a current value @mac(n) to a new value @mac(n+1).

The new MAC address must be calculated by both the non-AP station(s) 120 and by the AP 110. At the ERCM change Date, both the non-AP station(s) 120 and the AP 110 may modify their respective registry by updating the MAC address of the non-AP station 120 from @mac(n) to @mac (n+1).

Furthermore, the other privacy measures specified by the IEEE Std 802.11-2020 for RCM may also be applied. For example, counters in all sequence number spaces used to identify data frames relative to non-AP station 120 may be reset and the non-AP station 120 may reset seeds used within the PHY DATA scrambler on the next PPDUs to be transmitted.

According to one or more embodiments, the AP 110 and the non-AP station 120 both store a list of MAC addresses, and each time a change of MAC address must be performed, the next value on the list is chosen as the new MAC address. Such embodiments could however present security problems, if a third party had access to the list. Also, it can be envisaged to apply the same function on the AP side and on the non-AP station side to determine, for example, an index corresponding to the row of the next MAC address. This index may be advantageously determined randomly.

In alternative embodiments, the next MAC address of a non-AP station 120 may be calculated randomly. For example, the AP 110 and the non-AP station 120 may use the same pseudo-random function (PRF) with the same input parameters. Therefore, both the AP 110 and the non-AP station 120 obtain the same output @mac(n+1). The PRF may be used for calculating the 46 leftmost bits, as described above. By generating MAC addresses in a random or pseudo-random manner, it is not possible for a third party to predict the next address, which would pose security problems. In addition, there is already a pseudo-random function in the standard (specified for instance in section 12.7.1.2 of the standard IEEE Std 802.11-2020), which can advantageously be reused within the framework of the present invention. Therefore, no supplementary function is needed to implement the present invention.

Upon AP or non-AP STA request, both AP and non-AP STA compute a new transient MAC address for the changing STA, without sharing it, by using the standardized PRF-128 (section 12.7.1.2-IEEE Std 802.11-202) with same parameters.

For example, the next MAC address @mac(n+1) may be computed by using the PRF-128/46 with the following 3 parameters: K is set to the ERCM key of the non-AP station, A is set to the string "ERCM" and B is set to the current MAC address @mac(n) of the non-AP station. That is to say:

$$@MAC(n+1) = PRF\text{-}128/46\,(ERCM\text{ Key}, \text{“}ERCM\text{”}, @MAC\,(n), 128)$$

where:

From the generated 128 bits, the leftmost 46 bits (i.e. the 46 most significant bits) are selected;

In addition to the 46 bits, the U/L bit of the new MAC address is set to 1, the I/G bit is set to 0;

@MAC (n) corresponds to the current address MAC of the non-AP STA.

Alternatively, the next MAC address @mac(n+1) may be computed by using the PRF-128/46 with the following 3 parameters: K is set to the ERCM key of the non-AP station, A is set to the string "ERCM" and B is the current time.

Alternatively, the next MAC address @mac(n+1) may be computed by using the PRF-128/46 with the following 3 parameters: K is set to the ERCM key of the non-AP station, A is set to the string "ERCM" and B corresponds to any parameter which changes over the time and which is known by the AP and non-AP station.

However, in the last two cases, it is necessary to make sur that the value of the parameter is indeed the same with the AP and the non-AP station. For example, when B represent the current time, its value may be rounded to avoid differences between the values at the non-AP station and at the AP due to imperfect synchronization (even slight) between the clocks of the non-AP station and of the AP. Also, the new value may be calculated at a same time at the non-AP station and at the AP station (e.g. at step 913, or 950/960, or 970 in FIGS. 9*a*, 9*b*). When B is the current MAC address, this problem does not arise.

According to embodiments represented in FIG. 9*a*, the changing procedure may be initiated by the AP 110 and intended to all the non-AP stations 120*a*, 120*b* of the BSS for which the initiation procedure has been performed. In other words, according to these embodiments, the AP 110 indicates to all the non-AP stations 120*a*, 120*b* for which the initiation procedure has been performed that they have to change their respective MAC addresses, and all these non-AP stations 120*a*, 120*b* change their respective MAC addresses at the same time (the ERCM change Date).

In the embodiments described below, the ERCM change Date is expressed in terms of number of Target Beacon Transmission Times (TBTTs). Of course, the ERCM change Date may be expressed differently, for example as an actual time (which may be rounded to avoid problems due to an imperfect synchronization of the clocks of the non-AP and the AP).

As specified in IEEE 802.11 standards, the AP 110 periodically (every TBTT) transmits beacon frames, which are management frames containing information relative to the network, to the non-AP stations 120*a*, 120*b* of the BSS. According to embodiments represented in FIG. 9*a*, the beacon frames may include an indication relative to the ERCM change Date. For instance, each beacon frame may include a counter field to indicate that a change of MAC address is in progress. For example, each beacon frame transmitted by the AP 110 to all the non-AP stations 120*a*, 120*b* of the BSS may contain an information element as described below with reference to FIG. 11. The counter may be initially set to a value corresponding to the time at which the change must be operated (for instance, an initial value of k may indicate that the change must be operated in (k+1) TBTTs, k being an integer), and decremented of one unit at each transmission of a next frame. When the counter reaches the value 0, the change must be operated. Therefore, all transmissions of frames subsequent to the beacon frame associated with a counter equal to 0 must be performed with the new MAC address.

With reference to FIG. 9*a*, the non-AP stations 120*a*, 120*b* receives a beacon frame including a counter, called ERCM Change counter, set to a value k (step 911). This indicates that all the non-AP stations 120*a*, 120*b* (for which an initiation procedure has been done) must change their respective MAC addresses at a time corresponding to (k+1) TBTTs. Then, a next beacon frame is sent from the AP 110 to the non-AP stations 120*a*, 120*b* (step 712), comprising a ERCM Change counter with a value (k−1). After (k+1) beacon frame transmissions, the AP 110 sends a beacon frame with an ERCM Change counter equal to 0 to the non-AP stations 120*a*, 120*b* (step 913), indicating that the respective MAC addresses of the non-AP stations 120*a*, 120*b* must be updated. All subsequent transmissions between the AP 110 and the non-AP stations 120*a*, 120*b* may be performed with the new MAC addresses of the non-AP stations 120*a*, 120*b*.

The repetition of the counter (and therefore of the ERCM change Date) in beacon frames subsequent to the first beacon frame indicating a coming change of MAC address (i.e. the one sent at step 911) advantageously allows the non-AP stations 120*a*, 120*b* to be informed that their MAC addresses must be changed, even if they are in power safe or sleep mode. Indeed, even if one non-AP station misses one beacon frame, it can receive at least one counter before the next ERCM change Date by being awoken.

It is noted that the non-AP station may calculate the new MAC address anytime between steps 911 and 913. However, the effective change must be performed at step 913. Also, the AP may calculate the new MAC address before step 913, and perform the effective change at step 913.

Even if the embodiments of FIG. 9*a* use beacon frames, it has to be understood that other types of frames may be used similarly.

According to alternative embodiments represented in FIG. 9*b*, the changing procedure may be initiated by a non-AP station 120.

A request for changing MAC address is sent from the non-AP station 120 to the AP 110 (step 950). This request may be an "ERCM change Request" 1040, as described below with reference to FIG. 10. This request may contain an indication relative to the ERCM change Date. For instance, it may comprise a field (e.g. an ERCM Change Date field 1043, as represented in FIG. 10) indicating in terms of TBTTs the date of the next address change. For example, a value set to k may indicate that the change must be operated in (k+1) TBTTs, and a value set to 0 may indicate that the next MAC address is to be applied immediately. Therefore, all message transmissions subsequent to the transmission of the beacon frame associated with a counter equal to 0 are performed by using the new MAC address.

In response to the request for changing the MAC address, the AP 110 may acknowledge that it has received the request (step 960), for example by sending to the non-AP station 120 an "ERCM change Response" 1050 as described with reference to FIG. 10.

According to embodiments, when the non-AP station 120 sends the request for changing its MAC address, it may implement a counter reflecting the ERCM change date (e.g. a counter equal to k or (k−1), when the ERCM change date is expressed in number of TBTTs). Each time a new beacon frame is received from the AP 110, the counter may be decremented by one unit. At the reception, by the non-AP station 120 from the AP 110, of the beacon frame corresponding to the ERCM date, i.e. when the counter reaches the value zero (step 970), the change of MAC address is applied. The new MAC address may be effective at the start of the next TBTT. That means that all transmissions subsequent to the transmission of the beacon frame corresponding to the ERCM change date (step 970) are done with the new MAC address.

It is noted that the AP may calculate the new MAC address anytime between steps 950 and 970. However, the effective change must be performed at step 970. Also, the non-AP station may calculate the new MAC address before step 970, and perform the effective change at step 970.

Even if examples described with reference to FIGS. 9*a* and 9*b* use beacon frames and express time in TBTTs, other embodiments are possible. The embodiments only requires that an indication relative to the time at which the change is to be made is shared between the non-AP station and the AP, and that the non-AP station and the AP have means for counting the time. For example, it is possible to send an actual date, as long as the non-AP station and the AP have access to a same clock or to synchronized clocks. Changes may be performed periodically, or at predetermined times.

Also, it is noted that, alternatively to FIG. 9*a*, the AP 110 may request that only one non-AP station 120 changes its MAC address. For this, an ERCM change Request (similar to that of FIG. 9*b*) may be sent from the AP 110 to the concerned non-AP station 120.

FIG. 10 illustrates examples frame formats to activate and operate a MAC address change procedure. All frame formats represented in FIG. 10 are identified by a 'Category' field assigned to a specific value in the range [31,125] as specified in the table 9-51 of the IEEE Std 802.11-2020, so far reserved. For the purpose of illustration, the category value assigned for ERCM action frame may be set to 31 (or 31 for Client RCM action frame or 32 for BSS RCM action frame depending on which station initiates the RCM procedure). Another value may be used.

For example, the following may be added in the Table 9-51-Category values:

| Code | Meaning |
|---|---|
| k | Enhanced RCM |

where k is an integer between 31 and 125.

The frame formats represented in FIG. 10 are identified by the single octet 'ERCM Action' field, which follows immediately the Category field. The values of the ERCM Action field may be defined in the following table, that may be inserted at the end of 9.6 Action frame format details of the standard IEEE Std 802.11-2020:

| Action Field value | Meaning |
|---|---|
| 1 | ERCM Key delivery Request |
| 2 | ERCM Key delivery Response |
| 3 | ERCM Key delivery Confirm |
| 4 | ERCM change Request |
| 5 | ERCM change Response |

An ERCM Action field value set to 1 may correspond to an ERCM Key delivery Request. An ERCM Action field value set to 2 may correspond to an ERCM Key delivery Response. An ERCM Action field value set to 3 may correspond to an ERCM Key delivery Confirm. An ERCM Action field value set to 4 may correspond to an ERCM change Request. An ERCM Action field value set to 5 may correspond to an ERCM change Response.

For example, the ERCM Key delivery Request 1010 may contain a Category field 1011 set to value 31 and an ERCM Action field 1012 set to value 1.

The ERCM Key delivery Response 1020 may contain a Category field 1021 set to value 31, an ERCM Action field 1022 set to value 2 and an ERCM Key field 1023 containing an ERCM key of 256 bits.

The ERCM Key delivery Confirm 1030 may contain a Category field 1031 set to value 31 and an ERCM Action field 1032 set to value 3.

The ERCM change Request 1040 may contain a Category field 1041 set to value 31, an ERCM Action field 1042 set to value 4 and an ERCM Change Date field 1043. The ERCM Change Date field 1043 may indicate the date on which the change of MAC address is to be applied. In one or more embodiments, this date may be expressed in number of Target Beacon Transmission Times (TBTTs).

Other embodiments are possible. For example, the date on which the change of MAC address is to be applied may be an actual date. In such embodiments, the non-AP station and the AP must have sufficiently synchronized respective clocks (or have access to such clocks), to prevent the change from being made at one device but not the other.

The ERCM change Response 1050 may contain a Category field 1051 set to value 31 and an ERCM Action field 1052 set to value 5.

FIG. 11 illustrates an example of a frame format for operating a MAC address change procedure initiated by an AP, according to one or several embodiments of the invention.

It corresponds to an Information Element (IE) as specified in the section 9.4.2 in the standard IEEE Std 802.11-2020.

A dedicated IE may be specified for ERCM procedure, referred to as ERCM IE 1100. An IE may be identified by an Element ID 1110 and an Element ID Extension 1130 assigned to a specific value in the range [99,255] as specified in table 9-92 of the IEEE Std 802.11-2020, so far reserved. For the purpose of illustration, the Element ID Extension for identifying an ERCM IE may be set to 99.

An ERCM IE 1000 may contain an Element ID field 1010 set to 255, a Length field 1020, an Element ID Extension field 1030 set to 99 and an ERCM Change counter field 1040.

The Length field 1020 indicates the number of octets in the IE 1000 excluding the Element ID field 1010 and the Length field 1020. Its value is 2.

The ERCM Change counter field 1040 indicates the ERCM date, which corresponds to the date when the next MAC address has to be applied. It may be expressed in Target Beacon Transmission Time (TBTT) and its integer value may correspond to the number of TBTTs until the next MAC address is effective. Other embodiments are possible.

Exemplary Procedures to Change a BPE AP Parameter

Exemplary methods for changing a value of a EUI or any BPE AP parameter of the BPE AP associated with BPE non-AP stations are now described with reference to FIGS. 12*a* to 14. These exemplary methods implement the BSS RCM procedure described above (FIGS. 3*a* and 3*b*).

Hence, the request for changing the value of the at least one BPE AP parameter is sent by the BPE AP to the BPE Client or Clients. The target station for which privacy parameters are changed is the BPE AP, although the request may also signal targeted BPE Clients and signal to each such targeted BPE Client to also change the value of its at least one BPE Client parameter.

Figure 12A:
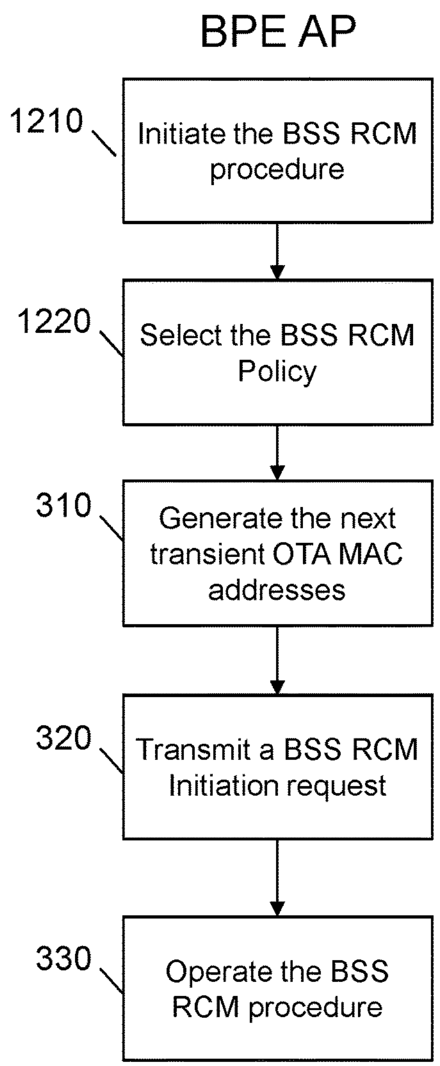
FIGS. 12*a* and 12*b* illustrate steps performed at BPE AP and at a BPE Client respectively, for operating a BSS RCM procedure, according to one or several embodiments of the invention.
Figure 12B:
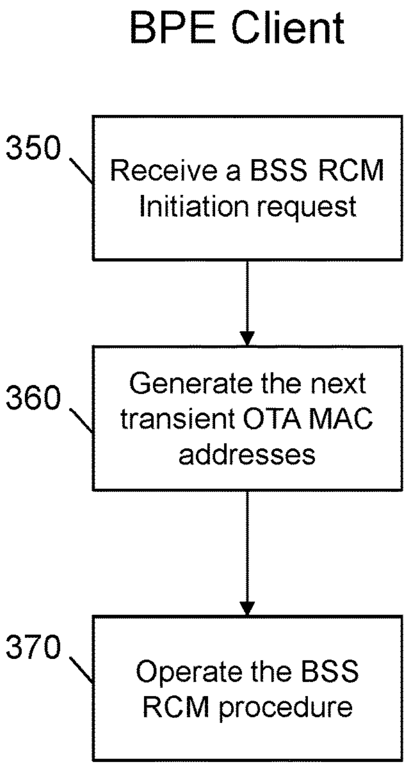

FIGS. 12*a* and 12*b* illustrate steps performed at BPE AP and at a BPE Client respectively, for operating a BSS RCM procedure, according to one or several embodiments of the invention. Preferably, each targeted BPE Client performs the method of FIG. 12*b*.

With respect to the BPE AP side, the shown method (FIG. 12*a*) includes, compared to FIG. 3*a*, a decision procedure at steps 1210 and 1220 to select an appropriate strategy with respect e.g. to the BPE Clients that also have their BPE Client parameters changed.

Step 1210 concerns the initiation of the BSS RCM procedure which may be based on various triggering criteria at the BPE AP.

The BPE AP may consider various triggering parameters or events (BSS RCM event) knowing that at each time that the BSS RCM procedure is applied, the privacy is improved while generating potential negative effects in terms of QoS, for instance by provoking notably potential service interruptions for legacy client (because they cannot infer the new value of the BPE AP or Client parameter that changes) or/and generating additional computational costs for BPE Clients in order to compute new values for their OTA MAC addresses or other BPE parameters.

A first exemplary triggering parameter is a maximum interval between the initiation of two BSS RCM procedures. For example, the BPE AP may periodically triggers the BSS RCM procedure in order to change at least one of its BPE AP parameters, possibly following a privacy interval generated randomly with a bounded value corresponding to the maximum interval between the initiation of two BSS RCM procedures.

A second exemplary triggering parameter is representative of a current state of the BSS. For example, this may be the number of associated BPE Clients, the number of legacy Clients, a ratio thereof, the number of BPE and/or legacy Clients on doze or active mode, a measure of the current uplink and downlink traffic from and/or intended to BPE and/or legacy Clients. For example, as the activity (in terms of traffic or number of stations or number of BPE Clients) increases, the BPE AP may be liable to trigger the BSS RCM procedure in order to change at least one of its BPE AP parameters.

A third exemplary triggering parameter is representative of a kinematic state of the BPE AP. For example, as long as the BPE AP is still, no BSS RCM procedure is triggered (or it is triggered on a periodic basis), while when the BPE AP is mobile, the BSS RCM procedure may be triggered more frequently or based on the distance travelled by the BPE AP (e.g. above a certain distance threshold, the BSS RCM procedure is triggered).

These exemplary triggering parameters may be combined, although other triggering parameters may be involved. For example, the BPE AP may advance the initiation of the BSS RCM procedure during the above privacy interval if it considers the negative effects in terms of service are acceptable, the acceptance being for instance expressed in terms of legacy Clients or/and BPE Clients (in doze mode or not, transmitting UL data or not) less than a predetermined threshold.

Once a BSS RCM procedure is triggered, the BPE AP may select at step 1220 a BSS RCM policy determining for example whether the BSS RCM procedure only modifies its BPE AP parameters (hence of the BSS) or also modifies BPE Client parameters of some BPE Clients.

The BSS RCM policy may be selected from predefined policies based on the BSS RCM event or on any parameter/event described above. The selection of the BSS RCM Policy is implementation dependent and out of the scope of the present invention.

As an example only, three BSS RCM Policies are defined as follows.

A first BSS RCM policy consists in the change of only BPE AP parameter or parameters (e.g. its OTA MAC address). The first policy is identified by BSS RCM Policy 0.

A second BSS RCM policy consists in the change of the BPE AP parameter or parameters and of BPE Client parameter or parameters of all BPE Clients of the BSS. The second policy is identified by BSS RCM Policy 1.

A third BSS RCM policy consists in the change of the BPE AP parameter or parameters and of the BPE Client parameter or parameters of a subset of the BPE Clients in the BSS. The third policy is identified by BSS RCM Policy 2.

Of course, other policies may be defined that may vary with respect to the number of BPE Clients involved and/or with respect to the number of BPE Client or AP parameters to be changed. As an example, two policies may be based on the above policy examples and only differ by the number of BPE Client or AP parameters to be changed.

For the following steps, the selected BSS RCM Policy identifies the BPE Clients (none of them, a subset of them or all of them) involved in the BSS RCM procedure in addition to the BPE AP for which its BPE AP parameter or parameters have to be also changed.

Next step is step 310 already described which consists in the generation of the next/new value for the at least one BPE AP parameter. This may involve the generation of new values for several BPE AP parameters.

If the BSS RM Policy involves the change of BPE Client parameter or parameters (Policy 1 or Policy 2), new values for these BPE Client parameter or parameters for each of the concerned BPE Clients are also calculated/generated.

The generations rely on the use of the shared function, e.g. PRCM PRF. As an example for generating new values for the OTA MAC Addresses of the BPE AP and of BPE Clients, the PRF-128/46 function is used, wherein parameter A is set to string "BSS RCM", parameter B is the current OTA MAC Address of the station (BPE AP or one BPE Client) for which the new value is to be generated, and key K is either the GPRCM key when generating a new OTA MAC address for the BPE AP or is the IPRCM key corresponding to the BPE Client for which the new OTA MAC address is to be generated.

The PRCM PRF is therefore launched by the BPE AP for each BPE station (AP or Client) involved in the BSS RCM procedure (i.e. for which a BPE parameter, e.g. OTA MAC Address, shall be changed).

If the BSS RCM Policy 0 is selected, the PRCM PRF is launched only for generating the next/new value of the BPE AP parameter or parameters, e.g. transient BPE AP's OTA MAC Address @AP_MAC(n+1), with the parameters set as described above (GPRCM key, current BPE AP's OTA MAC Address @AP_MAC(n) for parameter B). The next transient BPE AP's OTA MAC Address @AP_MAC(n+1) corresponds then to the 46 output random bits for which it is added the U/L bit set to 1 and the I/G bit is set to 0.

$$@AP\_MAC(n+1) = PRF\text{-}128/46\,(GPRCM\ \text{Key}, \text{“}BSS\ RCM\text{”}, @AP\_MAC(n))$$

supplemented with U/L bit and I/G bit.

If the BSS RCM Policy 1 or 2 is selected, the PRCM PRF is also launched (in addition to the BPE AP parameters) for generating the BPE Client parameter or parameters of each BPE Client targeted in the BSS RCM procedure (all the BPE Clients of the BSS for BSS RCM Policy 1, only a part of the BPE Clients of the BSS for BSS RCM Policy 2).

For each targeted BPE Client, the PRCM PRF is launched for generating the next/new value of its BPE AP parameter or parameters, e.g. transient BPE Client's OTA MAC Address @CLIENT_MAC(n+1), with the parameters set as described above (IPRCM key, current BPE Client's OTA MAC Address @CLIENT_MAC(n) or AP's OTA MAC Address @CLIENT_MAC(n) for parameter B). The next transient Client's OTA MAC Address @CLIENT_MAC(n+1) corresponds then to the 46 output random bits for which it is added the U/L bit set to 1 and the I/G bit is set to 0.

@CLIENT_MAC(n+1)=PRF-128/46(IPRCM Key, "BSS RCM", @CLIENT_MAC(n) supplemented with U/L bit and I/G bit.

With these policies 1 and 2, the BPE AP obtains a second key (IPRCM per BPE Client) and a second parameter having a value varying over time (e.g. OTA MAC Address per BPE Client but not only), that are shared with the BPE AP, and calculates a new value of at least one BPE Client parameter of the BPE Client by using the shared second key and a current value of the shared second parameter as inputs of the shared function.

Next step is step 320 already described which consists in the transmission of the BSS RCM initiation request indicating that a BSS RCM procedure has been initiated by the BPE AP.

Figure 13:
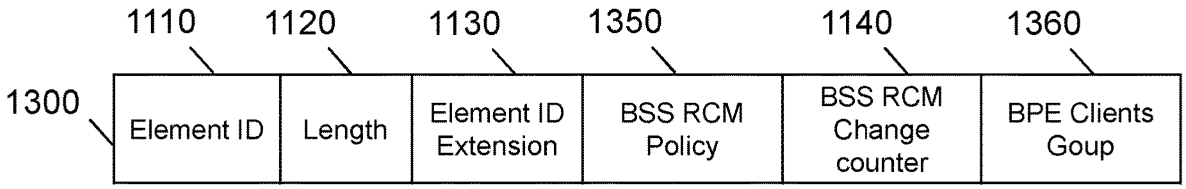
FIG. 13 illustrates an exemplary information element for signaling an ERCM procedure initiated by the BPE AP (hence a BSS RCM procedure), according to embodiments of the invention.

The BSS RCM initiation request may correspond to an encrypted information element 1300 in the beacon frame as shown FIG. 13 or a protected action frame 1400 as shown in FIG. 14.

FIG. 13 illustrates an exemplary information element for signaling an ERCM procedure initiated by the BPE AP (hence a BSS RCM procedure), according to embodiments of the invention. It corresponds to an Information Element (IE) as specified in the section 9.4.2 in the standard IEEE Std 802.11-2020.

This IE specified to the BSS RCM procedure is referred to as BSS RCM IE. It is an enhanced variant of the IE shown in FIG. 11.

BSS RCM IE is identified by an Element ID 255 and an Element ID Extension assigned to a specific value in the range [99,255] as specified in the table 9-92 of the IEEE Std 802.11-2020, so far reserved. For the purpose of illustration, the Element ID Extension for identifying a BSS RCM IE is 100. Therefore, the request includes a policy field 1350 indicating whether the request also signals, to each of one or more targeted BPE Clients (targeted stations different from the target station), to change the value of at least one of its BPE Client parameters, wherein the policy field takes a value from:

- a first value signaling the request is only a request for changing the value of the at least one privacy parameter of the BPE AP,
- a second value signaling the request targets all BPE Clients of the BSS, and requests each targeted BPE Client to change the value of at least one privacy parameter of the targeted BPE Client, a third value signaling the request targets a subgroup of the BPE Clients of the BSS, and requests each targeted BPE Client to change the value of at least one privacy parameter of the targeted BPE Client.

BSS RCM IE 1300 contains Element ID field 1110 set to 255, Length field 1120 indicating the number of octets in the element excluding the Element ID 1110 and Length field 1120, an Element ID Extension field 1130 set to 100, an BSS RCM Policy field 1350, an BSS RCM Change counter field 1140 and a BPE Clients Group field 1360.

BSS RCM Policy field 1350 is a 2-bit value which indicates the BSS RCM Policy to be applied selected by the BPE AP. It is set to 0 (resp. 1 and 2) when the BSS RCM Policy 0 (resp. 1 and 2) is selected.

The BSS RCM Change counter field 1140 is similar to ERCM Change counter 1140 of FIG. 11. It is of course optional in the way the target time at which the BPE parameter change has to be done may be locally calculated by the stations as described in embodiments below with reference to FIGS. 17*a* to 20. BSS RCM Change counter field 1140 indicates the BSS RCM Change date (target time) which corresponds to the date when the next randomized value of the BPE privacy parameter or parameters to change will be applied. It is expressed in Target Beacon Transmission Time (TBTT) and its integer value corresponds to the number of TBTTs until the next randomized value of the BPE privacy parameter or parameters to change will be effective. For example, a value set to k may indicate that the change must be operated in (k+1) TBTTs.

BPE Clients Group field 1360 is an optional field which is present when BSS RCM Policy is 2. BPE Clients Group field 1360 is used to indicate the BPE Client STAs involved in the BSS RCM procedure. As an example, the field is a bitmap similar to the Partial Virtual Bitmap field of the TIM element (section 9.2.4.5 of the IEEE Std 802.11-2020), each BPE Client having a specific bit in the Partial Virtual Bitmap based on its AID given by the BPE AP during the association phase. In the bitmap, a bit is set to 1 if the corresponding BPE Client is involved in the BSS RCM procedure and is set to 0 otherwise.

FIG. 14 illustrates an exemplary protected action frame for operating the BSS RCM procedure, referred to as BSS RCM action frame. This is a variant of action frames 1040 shown in FIG. 10.

A new Category field 1410 is assigned to a specific value in the range [31,125] as specified in the table 9-51 of the IEEE Std 802.11-2020, so far reserved. For the purpose of illustration, the category value assigned for BSS RCM action frame may be 31. Of course, any other value in the above range may be used. The protected action frame also contains BSS RCM Policy field 1350, optional BSS RCM Change counter field 1140 and BPE Clients Group field 1360 already described.

After the transmission of the request, step 330 consists for the BPE AP to operate the BSS RCM procedure at the target time (e.g. BSS RCM change Date).

The current value of the at least one BPE AP parameter, e.g. its OTA MAC Address, is replaced in its registry by the calculated new value of that parameter.

If BSS RCM Policy 1 or 2 has been selected, the same applies for the targeted BPE Clients: the BPE AP replaces, in its registry, the current value of the at least one BPE Client parameter of each target BPE Client, e.g. its OTA MAC Address, by the corresponding calculated new value of that parameter.

As shown in FIG. 12*b*, the process at the BPE Client side is quite similar to the one of FIG. 3*b*. However, due to the signaling of the BSS RCM Policy, step 350 is slightly adapted according to one or several embodiments of the invention. The process of the Figure is therefore performed by each BPE Client of the BSS.

At step 350, the BPE Client receives a BSS RCM Initiation request. According to the BSS RCM Policy field 1350 and if present, the BPE Clients Group field 1360, the receiving BPE Client determines whether it is involved in the BSS RCM procedure or not (hence whether one or more of its BPE Client parameters such as its OTA MAC address, have to be changed). In other words, the BPE Client determines from the request that it belongs to the targeted BPE Clients as specified in fields 1350 and 1360.

Next step is step 360 where the BPE Client generates the next/new value for the at least one BPE AP parameter, e.g. the new transient BPE AP's OTA MAC Address @AP_MAC(n+1), by launching the PRCM PRF with the same input parameters as step 310 (GPRCM key, current BPE AP's OTA MAC Address @AP_MAC(n) for parameter B).

Moreover, in the affirmative of the determination of step 350 (meaning the BPE Client is targeted by the BSS RCM procedure), it also generates the next/new value for its BPE Client parameter or parameters to be changed, e.g. its new/next transient BPE Client's OTA MAC Address @Client_MAC(n+1), by launching also the PRCM PRF with the same input parameters as step 310 (IPRCM key, current OTA MAC Address @Client_MAC(n) for parameter B).

This ensures the BPE AP and the BPE Client calculates the same new values for the same BPE parameters.

Finally, step 370 consists for the BPE Client in operating the BSS RCM procedure at the target time (e.g. as specified in the BSS RCM change Date field 1140). The current value of the at least one BPE AP parameter, e.g. its OTA MAC Address, is replaced in its registry by the calculated new value of that parameter.

Furthermore, if the BPE Client is involved in the BSS RCM procedure due to BSS RCM Policy 1 or 2, the same applies for its BPE Client parameter or parameters to be changed: the BPE Client replaces, in its registry, the current value of its BPE Client parameter or parameters, e.g. its OTA MAC Address, by the corresponding calculated new value of that parameter.

Procedures with Simultaneous Generation of Randomized Values

The embodiments described above mainly focus on the calculation of a single new value of a BPE or CPE parameter from an iteration of or call to the PRCM PRF, which new value replaces the current value for that parameter at a target time explicitly specified in the request.

It is contemplated allowing multiple privacy parameters of a target station to be changed using embodiments of the present invention. A possible implementation includes multiple simultaneous iterations of the PRCM PRF, each one using dedicated K, A, B parameters to generate the new randomized value for one privacy parameters (e.g. A may be a string specific to each privacy parameter and/or B may be the current value of the targeted privacy parameter). However, the complexity and the cost of such a solution in terms of implementation would be unacceptable in view of the number of privacy parameters to be considered at both the AP station side and each non-AP station side.

There are also embodiments mentioned above where the target time is not explicitly signaled in the request, but is computed to each station side. To ensure the stations have the same target time, a possible implementation includes using another iteration of the PRCM PRF to obtain the target time. In other words, the station may determine a value representing the target time at which the value of the at least one privacy parameter is to be changed, by using the shared function with inputs comprising the current value of the shared parameter (e.g. parameter B).

Again, this is not fully satisfactory due to the complexity and costs of implementing multiple iterations of the PRCM PRF.

That is why embodiments of the invention provide using a single iteration of the PRCM PRF (i.e. a single call thereto) to generate all at once multiple values that can be used as new values for privacy parameters and/or as target times. In this respect, the (AP or non-AP) station that has to compute such values, obtains a plurality of bits by applying the shared function to the inputs; uses a first subset of bits among the plurality of bits as a new value for a privacy parameter to be changed; and uses a second subset of bits among the plurality of bits as a new value for another privacy parameter to be changed or as a value representing the target time.

These embodiments therefore propose a global procedure for performing simultaneous and randomized change of multiple privacy parameters and target time without exchange thereof over the network (avoiding a third party to intercept them). As the generation of the new randomized values for a set of privacy parameters is performed all at once, implementation complexity and costs are reduced.

An illustrative application of these embodiments is to allow stations (BPE or CPE, AP or non-AP STA) to change simultaneously and randomly the values of a set of privacy parameters when they change their MAC Addresses (themselves privacy parameters) without any exchange of their new randomized values over the air.

First embodiments are described with reference to FIGS. 15*a* to 16*b*, that focus on the generation of multiple new values for multiple BPE/CPE parameters of the same station. In these first embodiments, the CPE stations (FIGS. 2*a* and 2*b*) or the BPE stations (FIGS. 3*a* and 3*b*) obtain the above plurality of bits by applying the shared function to the inputs; determine a new value of a first privacy parameter of the target station from a first subset of bits among the plurality of bits; and determine a new value of a second and distinct privacy parameter of the target station from a second subset of bits among the plurality of bits. Of course, a higher number of new values for privacy parameters may be generated using one and the same iteration of the shared function.

Second embodiments are described with reference to FIGS. 17*a* to 20, that focus on the generation of the target time using the same iteration of the PRCM PRF that generate a new value for a BPE/CPE parameter. In these second embodiments, the CPE stations (FIGS. 2*a* and 2*b*) or the BPE stations (FIGS. 3*a* and 3*b*) obtain a plurality of bits by applying the shared function to the inputs; determine the new value of the at least one privacy parameter from a first subset of bits among the plurality of bits; and determine the value representing the target time at which the value of the at least one privacy parameter is to be changed from a second subset of bits among the plurality of bits.

Of course, the first and second embodiments may be combined together. For instance, the obtained plurality of bits may comprise a first binary portion that is split in multiple subsets of bits corresponding to multiple new values for multiple privacy parameters of the same target station and a second binary portion that provides one or more target time values.

Simultaneous Generation of Randomized Values for Privacy Parameters

Back to the first embodiments, a list of privacy parameters, referred to as Privacy Enhancement (PE) list, may be assigned by the AP or negotiated between the AP and the non-AP STA(s) during the association. A CPE list may be made of privacy parameters of a non-AP station, while a BPE list may be made of privacy parameters of a BPE AP. A PE list may be made of a CPE list and of a BPE list. Below, the PE list may refer to any of these lists.

The PE list is ordered. For this, a rank is assigned at each privacy parameter and the PE list is ordered according to this rank. These ranks are either predetermined or assigned during the association between the AP station and the non-AP STA(s). Therefore the same ordering is known by the stations.

FIG. 15*a* illustrates a CPE list made of five privacy parameters of a non-AP station (CPE Client, extendable to BPE Client). The ordered list declares first the 46-bit OTA MAC address of the non-AP station (46 bits because the U/L bit and I/G bit are fixed), then the 12-bit Sequence Number, then the 48-bit Packet number, then the 16-bit AID, and finally the 7-bit Scrambler Seed. Any other order may be contemplated. Similarly, any other set of CPE privacy parameters may be contemplated.

FIG. 15*b* illustrates a BPE AP list made of four privacy parameters of a BPE AP station. The ordered list declares first the 46-bit OTA MAC address of the BPE AP, then the 7-bit Scrambler Seed, then the 16-bit Beacon Interval and finally the 6-bit BSS Color. Any other order may be contemplated. Similarly, any other set of BPE AP parameters may be contemplated.

The generation of new values for the privacy parameters of the PE list occurs at steps 210 and 260 (FIGS. 2*a* and 2*b*) or steps 310 and 360 (FIGS. 3*a* and 3*b*).

The shared function is a function which generates from a set of input parameters a sequence of pseudo-random bits of a given length. For the following description, the output binary sequence is referred to as PE output and is split into predetermined "chunks" or subsets of bits. Each chunk or subset is assigned to one of the privacy parameters of the PE list considered and therefore provides its new random value.

A PE correspondence or look-up table may be used, that indicates for each privacy parameter of the PE list, its assigned chunk/subset within the PE output. The same table may be locally generated by the AP and the non-AP STA(s) based on the ranking/order declared or negotiated during association.

A chunk or subset is characterized by the positions of its first bit (start position) and last bit (end position) within the PE output. Its length corresponds to the length of its assigned privacy parameter.

Preferably, the chunks or subsets are separate, meaning they do not overlap within the PE output. As a consequence, the generated PE output must have a length at least equal to the length of the PE list (which corresponds to the total sum of the length of its elements).

According to an embodiment, the shared function is the PRCM PRF mentioned above. Section 12.7.1.2 of the standard IEEE Std 802.11-2020 specifies six PRF functions: PRF-128, PRF-192, PRF-256, PRF-384, PRF-512 or PRF-704, generating respectively 128, 192, 256, 384, 512, or 704 randomized bits. Hence, depending on the desired PE output length, an appropriate PRF function is selected.

As mentioned above, alternatively, the shared function may be any block cipher algorithm allowing to cypher a block.

Taking the example of the Client RCM procedure initiated by a CPE client (FIGS. 2*a* and 2*b*), the CPE Client (at step 210) or the CPE AP (at step 260) uses a shared function corresponding to a PRF which is selected according to the CPE list and more specially, so as to generate a number of pseudo-random bits more than the length of the CPE list. As an example, the CPE list of FIG. 15*a* requires a length equal to 129 bits. Hence, the PRF-192 may be selected, which generates 192 pseudo-random bits from which only the leftmost 129 bits (i.e. the 129 most significant bits) are matched to the privacy parameters of the CPE list.

FIG. 16*a* illustrates the CPE correspondence table indicating the matching between each chunk or subset of the shared function output (CPE output) with one of the CPE privacy parameters. In this example, the CPE output is divided in five chunks corresponding to the five CPE parameters of FIG. 15*a*. The new random value of the OTA MAC address corresponds to the chunk starting from the first bit up to the 46th bit of the CPE output. The new random value of the SN corresponds to the chunk starting from the 47th bit up to the 58th bit of the CPE output. The new random value of the PN corresponds to the chunk starting from the 59th bit up to the 106th bit of the CPE output. The new random value of the AID corresponds to the chunk starting from the 107th bit up to the 122th bit of the CPE output. The new random value of the Scrambler Seed corresponds to the chunk starting from the 123th bit up to the 129th bit of the CPE output.

De facto, once the CPE output has been generated, the new random values of each CPE parameter for the CPE Client can be directly retrieved by merely extracting them from their assigned chunk. Therefore a single iteration of the PRF-192 allows each CPE Client and CPE AP to obtain all the new values for the CPE parameters.

Taking now the example of the BSS RCM procedure initiated by the BPE AP (FIGS. 3*a* and 3*b*), the BPE AP (at step 310) or the BPE Client (at step 360) uses a shared function corresponding to a PRF which is selected according to the BPE AP list and more specially, so as to generate a number of pseudo-random bits more than the length of the BPE AP list. As an example, the BPE AP list of FIG. 15*b* requires a length equal to 75 bits. Hence, the PRF-128 may be selected, which generates 128 pseudo-random bits from which only the leftmost 75 bits (i.e. the 75 most significant bits) are matched to the privacy parameters of the BPE AP list.

Figure 16B:
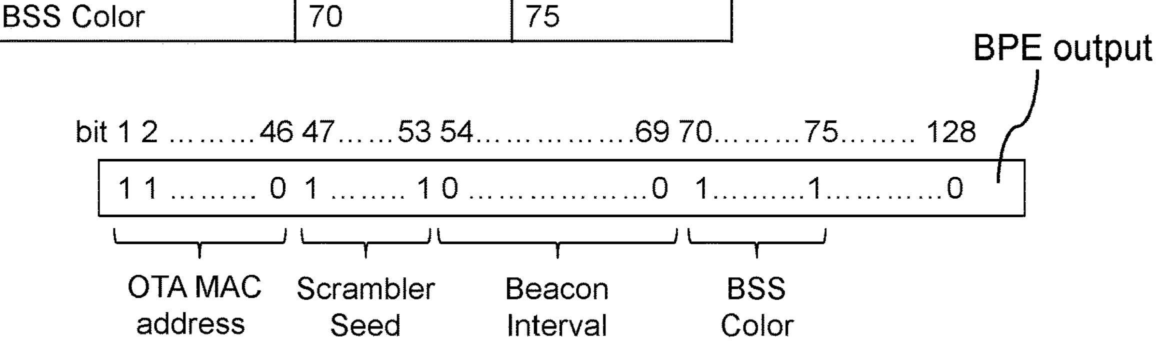

FIG. 16*b* illustrates the BPE correspondence table indicating the matching between each chunk or subset of the shared function output (BPE output) with one of the BPE AP parameters. In this example, the BPE output is divided in 4 chunks. The new random value of the OTA MAC address corresponds to the chunk starting from the first bit up to the 46th bit of the BPE output. The new random value of the Scrambler Seed corresponds to the chunk starting from the 47th bit up to the 53th bit of the BPE output. The new random value of the Beacon Interval corresponds to the chunk starting from the 54th bit up to the 69th bit of the BPE output. The new random value of the BSS Color corresponds to the chunk starting from the 70th bit up to the 75th bit of the BPE output.

De facto, once the BPE output has been generated, the new random values of each BPE AP parameter can be directly retrieved by merely extracting them from their assigned chunk. Therefore a single iteration of the PRF-128 allows the BPE AP and each BPE Client to obtain all the new values for the BPE AP parameters.

Moreover, according to the BSS RCM Policy applied for the BSS RCM procedure by the BPE AP, the procedure may also include the change of values for BPE Client parameters of some or all BPE Clients. As an example, the CPE list described above may be used as a list for those BPE Client parameters to be changed.

With such policy, as mentioned above, the BPE AP has to generate new values for those BPE Client parameters, for each targeted BPE Clients (step 310), while the BPE Clients have to generate new values for their own BPE Client parameters if they are targeted (e.g. BSS RCM Policy 1 or associated bit enabled in bitmap 1360 in case of BSS RCM Policy 2) (step 360).

Each of these generations may be conducted along the lines described above with reference to FIGS. 15*a* and 16*a* with respect to the CPE list. Each generation requires one iteration of the PRF-192 function. Once the corresponding output has been generated, the new random values of each BPE Client parameter for the concerned BPE Client can be directly retrieved by merely extracting them from their assigned chunk. Therefore a single iteration of the PRF-192 allows the BPE AP and the BPE Client to obtain all the new values for the BPE Client parameters of that BPE Client.

Simultaneous Generation of Randomized Values for Privacy Parameter and Target Time Back to the second embodiments where the PE (CPE or BPE) output is also used to provide a value representing the target time at which the value or values of the concerned CPE/BPE parameter or parameters are to be changed. For instance, it is clear that the unused portion of the CPE output (bits 130 to 192 in FIG. 16*a*) or of the BPE output (bits 76 to 128 in FIG. 16*b*) can be used to define the target time.

FIGS. 17*a*-17*d* are examples of flow charts describing a method for changing a MAC address of a non-AP station associated with an AP, according to several embodiments of the invention.

For ease of illustration, they make reference to FIG. 4 in which steps 400 and 410 are parts of a process called "initiation procedure", in which the stations (AP and non-AP) declare their capabilities and may exchange the ERCM key (GPRCM and/or IPRCM depending on the scenario). A detailed example of an initiation procedure is provided above with reference to FIG. 8.

At step 420 where the ERCM procedure is triggered, the next value of the MAC address of the non-AP station is calculated (step 421) by both the AP and the non-AP station. In addition, they determine a value representative of the target time at which the MAC address of the non-AP station must be changed. In one or several embodiments, the value representative of the time at which the MAC address of the non-AP station must be changed may be an integer value used as initial value of a counter, called "ERCM counter". For the sake of simplicity, this determined value is referred to below as "ERCM counter value". The time at which the MAC address of the non-AP station must be changed, called "ERCM date" or "ERCM change date", is defined by the ERCM counter value. For example, the ERCM counter value may represent a number of units of time in which the MAC address has to be changed, and the ERCM date may correspond to the time at which the determined number of units of time have elapsed from the triggering of the ERCM procedure 420. In other embodiments further described below, the ERCM counter value determined at step 422 may be multiplied by an integer value called "ERCM scaling factor" to obtain the number of units of time in which the MAC address has to be changed.

At step 421, the next value of the MAC address of the non-AP station is obtained in parallel by both the non-AP station and the AP as described above with reference to FIG. 4.

Once the next value of the MAC address of the non-AP station is obtained, the change (from the current MAC address to the next MAC address) has to be performed at the same target time, called "ERCM date", to ensure that both stations use the same MAC address of the non-AP station and thus avoid frame losses (in case of frames sent with a MAC address field that does not correspond to the current MAC address of the non-AP station). A possible solution would be for one station to send, to the other station, an indication relative to the ERCM date. However, this may raise issues in terms of privacy. Indeed, if the ERCM date is exchanged between the non-AP station and the AP, this ERCM date could be recovered by a third party, which could then detect the change of MAC address. Another solution would be to perform address changes periodically, without having to exchange information relating to the ERCM date, but this could also be tracked by a third party which would identify these periodic requests.

To overcome this privacy issue, the second embodiments of the present invention propose that both the non-AP station and the AP determine, at step 422, a same value, called ERCM counter value as mentioned above, representative of the time, called ERCM date, at which the MAC address of the non-AP station must be changed. For example, the ERCM counter value may be an integer value representing a number of Target Beacon Transmission Times (TBTTs, one TBTT corresponding to 100 milliseconds in 802.11 standards) or a number of time units (TUs, one TU being equal to 1024 milliseconds in 802.11 standards) until applying the change of the MAC address of the non-AP station at both the non-AP station and the AP. Privacy is further increased since no information related to the ERCM procedure is exchanged between the AP and the non-AP station.

In one or several embodiments, both the AP and the non-AP station may calculate the ERCM counter value at step 422 by using the same function with the same set of input parameters, therefore ensuring that the result is the same at both the non-AP station and the AP.

After having obtained the value of the next MAC address of the non-AP station and the value of the ERCM counter, the non-AP station and the AP both wait for the ERCM date defined by the ERCM counter value to be reached to apply the change of the MAC address (step 430). In one or more embodiments, each of the non-AP station and the AP may have a respective counter, initialized to the ERCM counter value determined at step 422, and each counter may be decremented by one unit for each unit of time elapsed. For example, if the ERCM date is expressed in terms of TBTTs, the ERCM counter value k determined at step 422 may be an integer value representing the number of TBTTs until applying the change of the MAC address (i.e. the replacement of the current value of the MAC address by the new value obtained at step 421). The AP may store a counter whose initial value is set to k, and each time the AP broadcasts a beacon frame (i.e. each TBTT) after the triggering of the ERCM procedure (step 420), the counter of the AP is decremented by one unit. When the counter reaches the value zero, the change is applied. The non-AP station may implement a similar counter, which is initialized to the value k on receipt of the first beacon frame following the triggering of the ERCM procedure (step 420), the counter is decremented by one unit. When the counter reaches the value zero, the change is applied.

According to embodiments, the change may be applied by the AP and the non-AP station just after the reception of the (k+1)-th beacon frame following the triggering of the ERCM procedure (step 220), which means that all the frames following the sending/the reception of this (k+1)-th beacon frame are sent with the new value of the MAC address of the non-AP station. Of course, other embodiments are possible. For example, the change may be applied by the AP and the non-AP station just after the reception of the k-th beacon frame following the triggering of the ERCM procedure (step 420).

As further detailed below, several events may trigger an ERCM procedure (step 420). For example, an ERCM procedure may be triggered as soon as the initiation procedure is performed, in particular upon reception by the AP of the ERCM key (step 840 of FIG. 8), or upon reception by the non-AP station of the confirmation message that the AP has received the ERCM key (step 850 of FIG. 8). An ERCM procedure may also be triggered by the reception, by the AP or the non-AP station, of a request for changing the MAC address of the non-AP station (as detailed with reference to FIG. 20). An ERCM procedure may also be triggered by a change of the MAC address of the non-AP station (step 430). In other words, as soon as the MAC address of the non-AP station has been performed, a new ERCM procedure is launched. It is understood that these examples are not independent and mutually exclusive embodiments of the invention. Several distinct types of events may trigger an ERCM procedure in a same embodiment of the invention.

Referring again to FIG. 2*a*, if the ERCM date defined be the ERCM counter is reached, for example if the values individual counters of the AP and the non-AP station are both equal to zero, the change of the MAC address is applied at the AP and the non-AP station (step 430). For example, the respective registers of the non-AP station and of the AP may be updated with the new value of the MAC address of the non-AP station obtained at step 421. As soon as step 430 is performed, this new value is used for communications between the non-AP station and the AP. As mentioned above, a new ERCM procedure 420 may be launched immediately following the change.

Figure 17A:
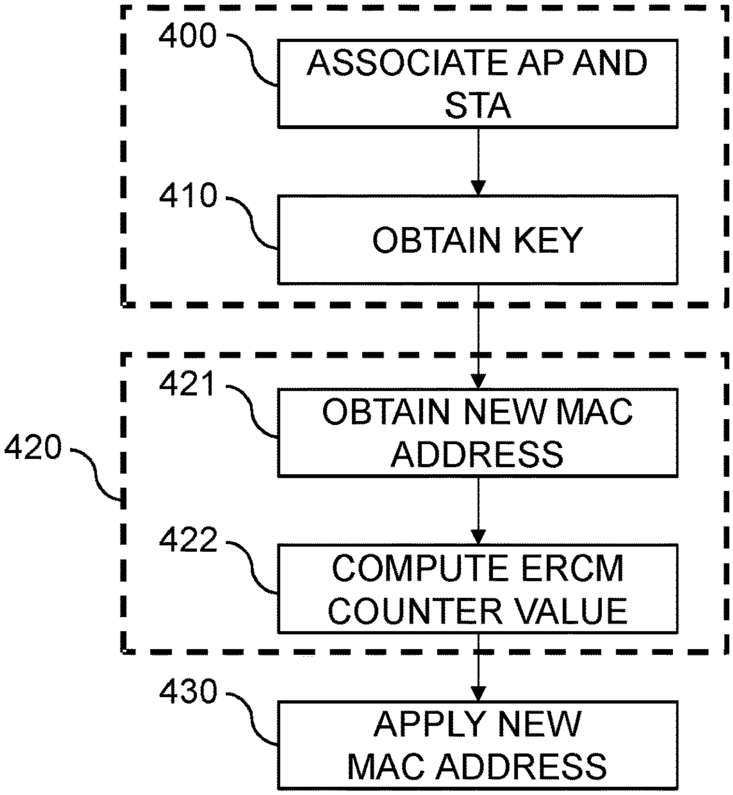
FIGS. 17*a*-17*d* are examples of flow charts describing a method for changing a MAC address of a non-AP station associated with an AP, according to several embodiments of the invention, referred below to as "second embodiments"
Figure 17B:
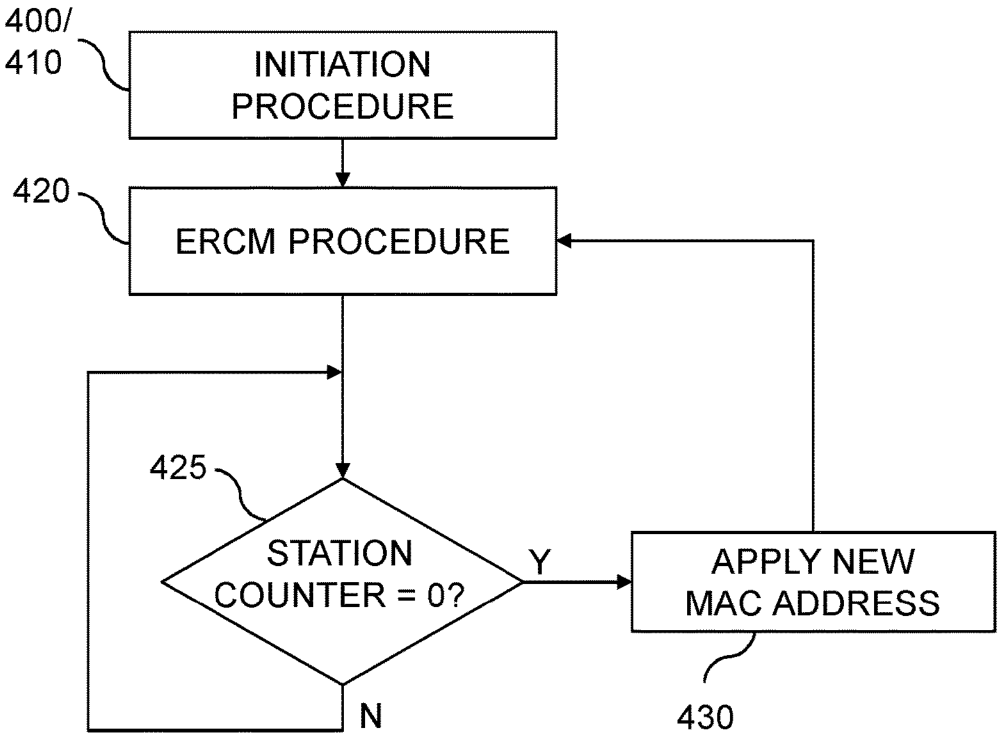

Reference is now made to FIG. 17*b*, which represents a first particular embodiment of the method of FIG. 17*a* in which the ERCM procedure is triggered completely automatically, without any exchange of a request for changing the MAC address of the non-AP station. Steps 400, 410 and 420 are similar to FIG. 17*a*. As mentioned above, during the ERCM procedure (step 420), an ERCM counter value may be determined, for example calculated by both the AP and the non-AP station by applying a same function to a same set of input parameters. Each station may launch a respective counter whose value is initially set to the ERCM counter value calculated at step 420 decremented at each unit of time.

At each station, as long as the counter does not reach the value 0 (step 425, arrow "N"), or another predefined value common to both stations, the counter continues to be decremented at each time of unit. When the counter reaches the value 0 (step 425, arrow "Y"), the new value of the MAC address obtained at step 420 is applied (step 230) and a new ERCM procedure is launched (step 420).

Figure 17C:
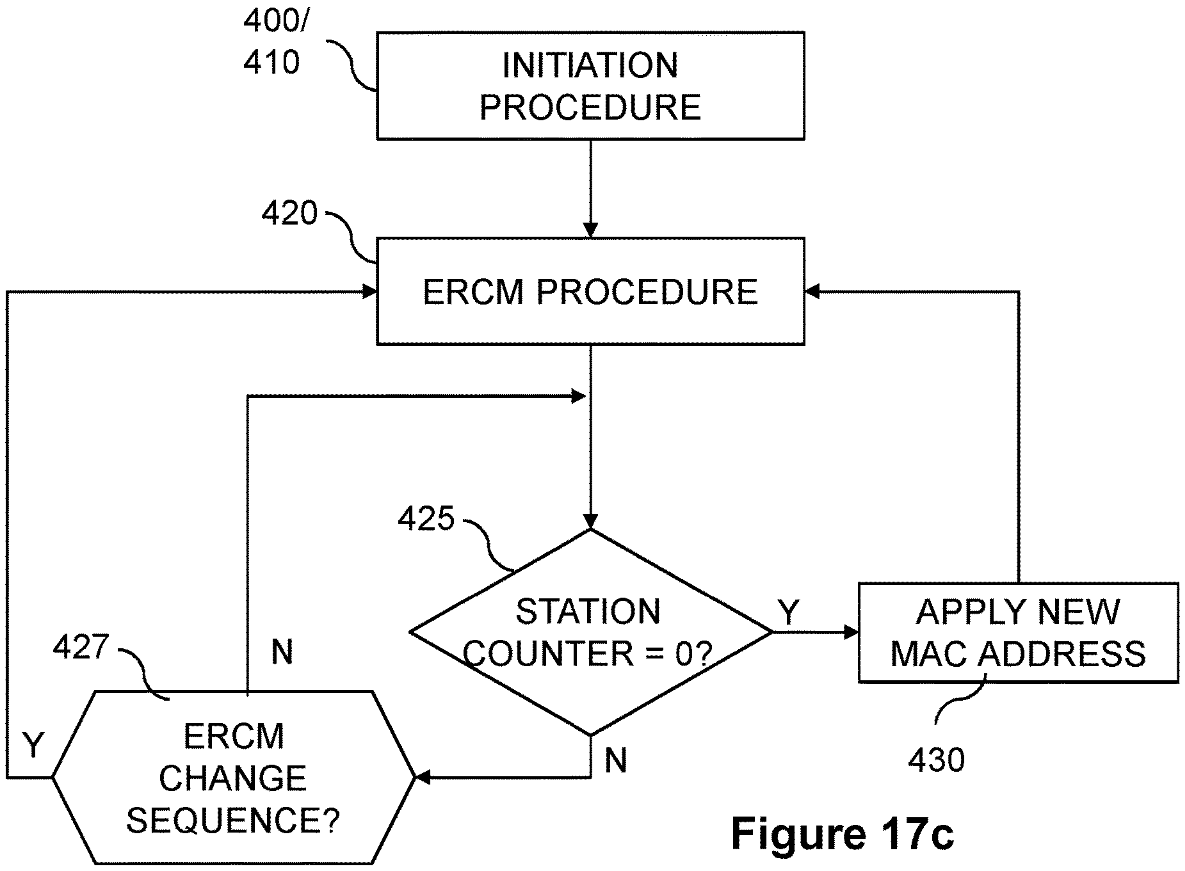

FIG. 17*c* represents another embodiment, in which the ERCM procedure may be triggered automatically and also upon reception of a request for changing the MAC address of the non-AP station (also referred to as "change request" or "ERCM change request").

Steps 400, 410 and 420 are similar to FIG. 17*a*. As mentioned above, during the ERCM procedure (step 420), an ERCM counter value may be determined, for example calculated by both the AP and the non-AP station by applying a same function to a same set of input parameters. Each station may launch a respective counter whose value is initially set to the ERCM counter value calculated at step 420 and decremented at each unit of time. At each station, when the counter reaches the value 0 (step 425, arrow "Y"), the new value of the MAC address obtained at step 420 is applied (step 430) and a new ERCM procedure is launched (step 420).

As long as the counter has not reached the value 0 (step 425, arrow "N"), a request for changing the MAC address of the non-AP station may be exchanged between the non-AP station and the AP (step 427, arrow "Y"). This request may be sent by the non-AP to the AP (as an alternative, the request may be sent to a third device of the network, which transmits it to the AP), or by the AP to the non-AP station (as an alternative, the request may be sent to a third device of the network, which transmits it to the non-AP station). It is noted that these embodiments are not mutually exclusive and can coexist in the same non-AP station. For example, the AP may be configured to indicate at certain times to the non-AP station that the latter has to change its MAC address (to ensure, for example, that all the non-AP stations of the BSS regularly change their respective MAC addresses), while the non-AP station may be configured to indicate at other times corresponding to particular events (for example, when the non-AP station stays still for a predefined amount of time or sends the same type of traffic for a predefined amount of time) that it wants to change its MAC address. As an alternative, the request may be sent from a third device of the network to both the non-AP station and the AP. Examples of such request are detailed with reference to FIGS. 18 and 20.

Upon reception of a change request by at least one station among the AP and the non-AP station (step 427, arrow "Y"), a new ERCM procedure may be launched (step 420). The value of the next MAC address and the ERCM counter value previously obtained are replaced by the value of the next MAC address and the ERCM value obtained during the new ERCM procedure 420. The initial values of the counters of the stations may be set to the ERCM value determined during the new ERCM procedure, and the process may continue as detailed above with the values obtained at the new ERCM procedure 420.

For the counters to be synchronized between the AP and the non-AP station, they must be initialized and decremented at same times, for example at the reception or the sending of the first beacon frame immediately following the reception or the sending of the change request at step 427. In such embodiments, it will be understood that the new ERCM procedure 420 must be performed after the reception of the change request (step 420) by one of the stations and before the AP sends the next beacon frame.

Other embodiments are possible. For example, the calculation of the next value of the MAC address and of the ERCM counter at step 430 may be performed at the reception or the sending of the beacon frame immediately following the reception of the change request at step 427, and the counters may be initialized at the reception or the sending of the next beacon frame. It will be understood that the important point is that the AP and the non-AP station are configured to initialize and start decrementing the counters, and apply the MAC address change simultaneously.

As long as no change request is received by at least one station among the AP and the non-AP station (step 427, arrow "N"), the values of the counters continue to be decremented at each unit of time.

In one or several embodiments, the change request may contain a field indicating that a change of the MAC address has to be applied "immediately", e.g. just after the sending or the reception of the beacon frame following the reception of the change request. For example, the change request may be an "ERCM Change Request" 1840 (as described below with reference to FIG. 18) including an "ERCM Reset" field 1844 or an "ERCM Scaling factor" field 1843 set to a predefined value. In these embodiments, the ERCM counter value is not determined during the ERCM procedure 420 consecutive to the reception of the change request 427, but is set to the value zero. Also, the next value of the MAC address obtained at step 420 may advantageously different than the value of the MAC address obtained at a previous ERCM procedure 420.

Such embodiments may be useful, for instance, when the counters of the non-AP station and the AP are not synchronized anymore. Such situation may happen, for example, because the non-AP station is in power safe or in sleep mode, and misses one or several beacon frames sent by the AP. Therefore, the counter of the non-AP station may not be decremented at the non-AP while it is decremented at the AP. In such case, the change of the MAC address may be performed by the AP but not by the non-AP, there will be an inconsistency in the MAC address of the non-AP station in the frames exchanged between the non-AP station and the AP, and the concerned frames may be lost. This loss may be detected by the non-AP station and/or by the AP, which may send the indication that the change must be applied as soon as possible to the other station. Provoking an immediate change of MAC address of the non-AP station may also be useful if, for example, the AP detects that the next value of the MAC address calculated in step 230 is already assigned to another non-AP station (even if this case may be very uncommon). Also, some applications of the non-AP station may require a change of the MAC address of the non-AP station.

In addition or as an alternative, the change request may contain a field representative of an integer value called "scaling factor" or "ERCM Scaling Factor", which may be used to increase or reduce the time between the changes of the values of the MAC address of the non-AP station. When this field is present in the change request, the ERCM counter value determined at step 420 may be multiplied by said integer value to obtain the number of units in which the next change has to be performed. For example, the change request may be an "ERCM Change Request" 1840 (as described below with reference to FIG. 18) including an "ERCM Scaling factor" field 1843 set to a predefined value.

Such embodiments are advantageous since they make it possible to modulate the frequency of the changes according to the context. For example, when the changes are too frequent, data frames may be lost (e.g. data frames prepared before the change and containing the old value of the MAC address) and it may be useful to increase the time between two changes.

Figure 17D:
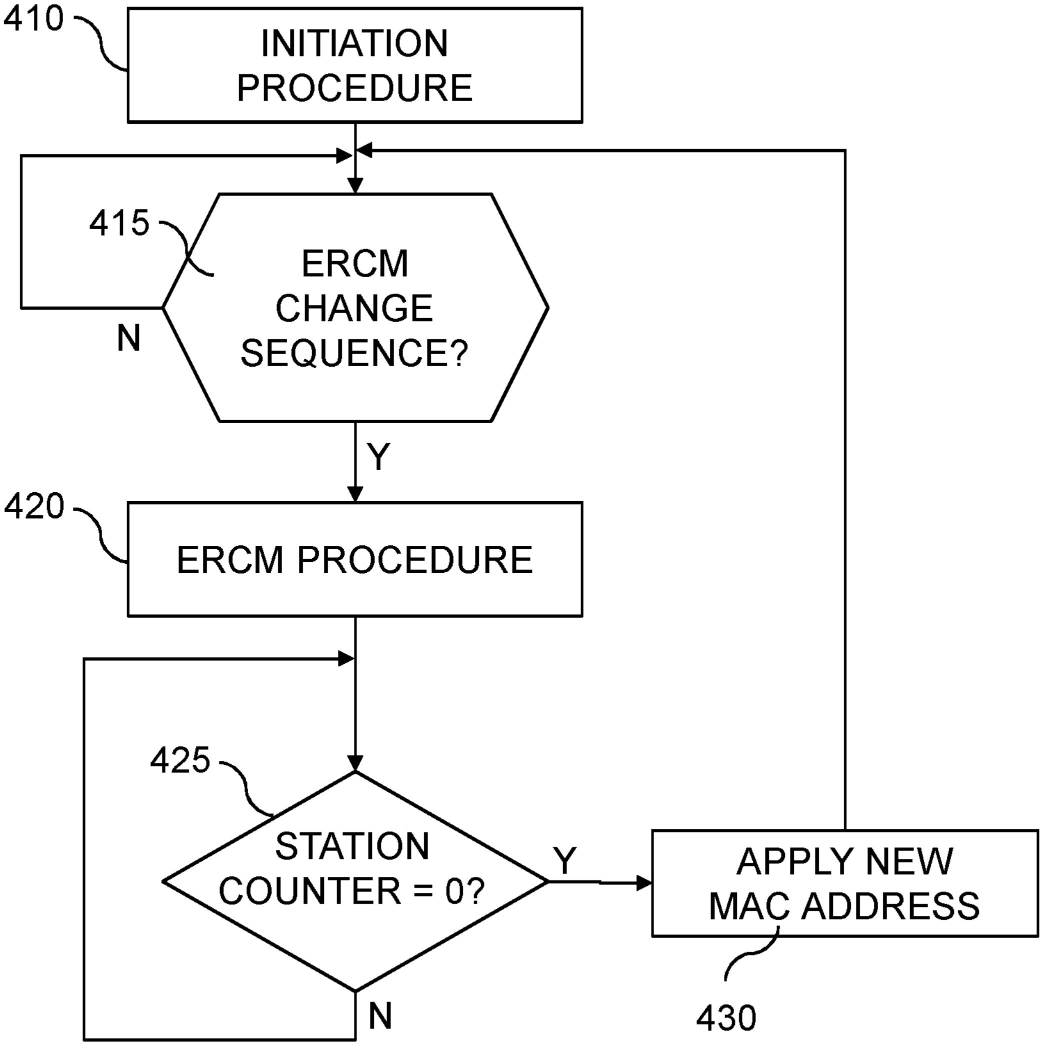

FIG. 17*d* represents yet another embodiment, in which the ERCM procedure is triggered only upon reception of a change request.

Steps 400, 410 and 420 are similar to FIG. 17*a*. In the embodiments of FIG. 17*d*, as long as no change request is exchanged between the AP and the non-AP station (step 415, arrow "N"), no ERCM procedure is triggered. Upon reception, by the AP and/or the non-AP station, of a change request (step 415, arrow "Y"), an ERCM procedure is performed (step 420), during which the next value of the MAC address of the non-AP station and an ERCM counter value may be obtained. Each station among the AP and the non-AP station may then launch a respective counter whose value is initially set to the ERCM counter value calculated at step 420 and decremented at each unit of time. At each station, when the counter reaches the value 0 (step 425, arrow "Y"), the new value of the MAC address obtained at step 420 is applied (step 430). A new ERCM procedure is then launched when a subsequent change request is received at the AP and/or the non-AP station.

It is noted that, according to different embodiments, the above methods related to the second embodiments may be applied to only one non-AP station of a BSS, or to a subgroup of non-AP stations (each AP-(non-AP station) couple applying in parallel the changing method), or to all non-AP stations of the BSS.

For example, when the procedure for changing the MAC address is initiated by a non-AP station, this non-AP station may send a request to the AP indicating that the non-AP station wants to change its MAC address. In such case, the change only concerns said non-AP station. When the procedure for changing the MAC address is initiated by the AP, the AP station may send a unicast request to a particular non-AP station indicating that it has to change its MAC address. Alternatively, it can send a multicast request to a group of non-AP stations, and all the non-AP stations of this group have to change their respective MAC addresses. Yet alternatively, the AP may send a broadcast request (e.g. via a beacon frame) to all the non-AP stations of the BSS, and all the non-AP stations of the BSS have to change their respective MAC addresses.

It is also noted that steps of FIGS. 17*a*-17*d* are performed at both the non-AP station and the AP. When the change is initiated by the AP and concerns a plurality of non-AP stations, the steps of FIGS. 17*a*-17*d*, when they are performed by the AP, are performed independently for each non-AP station among said plurality of non-AP stations.

As detailed above, in the process of FIGS. 17*a*-17*d*, the same next value of the MAC address of the non-AP station must be obtained by both the AP and the non-AP station. Also, the change of the MAC address must be performed by the non-AP station and the AP at the same time. In one or several embodiments, the new value of the MAC address and the value of the ERCM counter may advantageously be determined by applying a same function to a set of input parameters which is the same for the non-AP station and the AP station. Therefore, the result is the same for the non-AP station and the AP. In one or several embodiments, this function may be a pseudo-random function, as specified above (FIG. 4).

The value of the ERCM counter (step 430) may be advantageously calculated from a set of bits among the remaining bits among the bits generated by the PRF and not used for determining the new MAC address.

Using the same result of a unique function for calculating both the new MAC address of the non-AP station and the ERCM counter value advantageously limits the number of operations to be carried out. Using the PRF has the advantage of not requiring any new function compared to the standards, and of generating values in a pseudo-random way, which makes tracking even more complicated. In addition, using a pseudo-random function for computing the ERCM counter value is particularly advantageous when several non-AP stations are concerned by the change of MAC address, because it spreads out the times at which the different non-AP stations change their MAC addresses, therefore avoiding bottlenecks on the AP side. Of course, other embodiments are possible. For example, another function than the PRF may be used, and/or two different functions may be used for calculating the new value of the MAC address and the value of the ERCM counter.

In the following, the current value of the MAC address of a non-AP station 120 is denoted @mac(n), the next value of the MAC address of a non-AP station 120 (to be applied at the ERCM date) is denoted @mac(n+1), and the ERCM counter defining the ERCM date is denoted CC(n+1).

The new MAC address must be calculated by both the non-AP station(s) 120 and by the AP 110. At the ERCM date, both the non-AP station(s) 120 and the AP 110 may modify their respective registry by updating the MAC address(es) of the non-AP station(s) 120 from @mac(n) to @mac(n+1).

Furthermore, the other privacy measures specified by the IEEE Std 802.11-2020 for RCM may also be applied. For example, counters in all sequence number spaces used to identify data frames relative to non-AP station 120 may be reset and the non-AP station 120 may reset seeds used within the PHY DATA scrambler on the next PPDUs to be transmitted.

In one or more embodiments, the next MAC address @mac(n+1) of a non-AP station 120 and the ERCM counter CC(n+1) may be calculated randomly. For example, @mac (n+1) and CC(n+1) may be obtained from the result of the same pseudo-random function (PRF) applied to the same input parameters by the AP 110 and the non-AP station 120. Therefore, both the AP 110 and the non-AP station 120 obtain the same outputs @mac(n+1) and CC(n+1). The pseudo-random function of the standard (specified for instance in section 12.7.1.2 of the standard IEEE Std 802.11-2020) may advantageously be reused within the framework of the present invention. Therefore, no supplementary function is needed to implement the present invention.

For example, the next MAC address @mac(n+1) and the ERCM counter value CC(n+1) may be computed by using the PRF with the following 3 parameters: K is set to the ERCM key of the non-AP station, A is set to the string "ERCM" and B is set to the current MAC address @mac(n) of the non-AP station. That is to say:

PRF-128 (ERCM Key, "ERCM", @mac (n), 128)

From the 128 bits thus generated, the leftmost 46 bits (i.e. the 46 most significant bits) may be used for defining the next value of the MAC address @mac(n+1). The @mac(n+1) of 48 bits corresponds to the 46 randomized bits resulting from the PRF-128/46 with the adding of two fixed bits: the U/L bit of the new MAC address is set to 1 and the I/G bit is set to 0.

Furthermore, from the 128 bits generated, one or more bits among the 128−46=82 remaining bits (i.e. bits non used for calculating @mac(n+1)) may be used for calculating the ERCM counter value CC(n+1). For example, the rightmost m bits (i.e. the m less significant bits, m being an integer between 1 and 82, preferably between 3 and 10) may be selected to determine the value of the ERCM counter CC(n+1). Therefore, no additional calculation is required to determine the ERCM counter value CC(n+1). According to embodiments, the integer value obtained from the selected m bits may be multiplied by a factor called "scaling factor" detailed below with reference to FIG. 18 and the result corresponds to the ERCM counter value.

Alternatively, @mac(n+1) and CC(n+1) may be computed by using the PRF-128 with the following 3 parameters: K is set to the ERCM key of the non-AP station, A is set to the string "ERCM" and B is the current time.

Alternatively, @mac(n+1) and CC(n+1) may be computed by using the PRF-128 with the following 3 parameters: K is set to the ERCM key of the non-AP station, A is set to the string "ERCM" and B corresponds to any parameter which changes over the time and which is known by the AP and non-AP station.

However, in the last two cases, it is necessary to make sur that the value of the parameter is indeed the same with the AP and the non-AP station. For example, when B represent the current time, its value may be rounded to avoid differences between the values at the non-AP station and at the AP due to imperfect synchronization (even slight) between the clocks of the non-AP station and of the AP. When B is the current MAC address, this problem does not arise.

It is noted that, in the case of FIG. 17*c*, when a change request is received (step 427, arrow "Y"), a new ERCM procedure is launched (step 420), during which a new value of the MAC address may be calculated. As mentioned above, this new value of the MAC address may advantageously be different than the value of the MAC address calculated at the previous ERCM procedure (interrupted by the receiving of the change request). For this, the new value of the MAC address may be calculated as a function of the value of the MAC address previously determined (but never applied) instead of the current value of the MAC address. For example, if $@mac_2(n+1)$ denotes the value of the MAC address determined during the new ERCM procedure (i.e. the ERCM procedure launched upon reception of the change request) and $@mac_1(n+1)$ denotes the value of the MAC address determined during the previous ERCM procedure (interrupted by the receiving of the change request), $@mac_2(n+1)$ may be determined by applying the following function:

$$PRF\text{-}128(ERCM\ \text{Key}, \text{“}ERCM\text{”}, @mac_1(n+1), 128)$$

from which the leftmost 46 bits are kept.

The sequence of steps for activating a procedure as shown in FIG. 8 also applies for these second embodiments.

Figure 18:
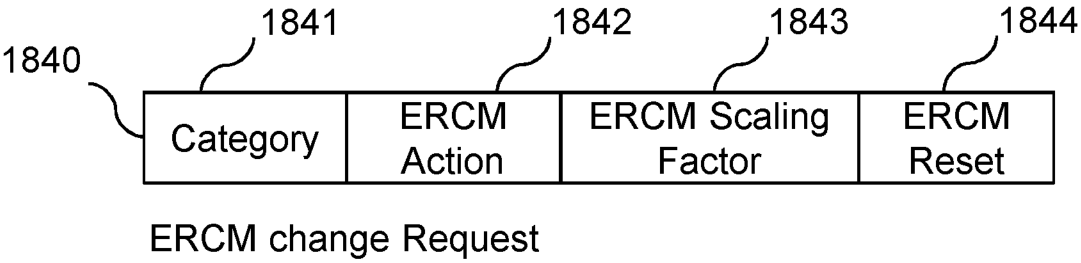
FIG. 18 illustrates an exemplary frame formats for an ERCM Change Request adapted to the second embodiments to activate a MAC address change procedure, according to one or several embodiments of the invention.

FIG. 18 illustrates an exemplary frame format for an ERCM Change Request adapted to the second embodiments. The other frame formats of FIG. 10 applies for the other types of frames exchanged in the second embodiments (e.g. during the procedure of FIG. 8).

The ERCM change Request 1840 may contain a Category field 1841 and an ERCM Action field 1842. The Category field 1841 may be set to value 31 and the ERCM Action field 1842 may be set to value 4.

Optionally, the ERCM change Request 1840 may also contain an ERCM Scaling Factor field 1843 and/or an ERCM Reset field 1844.

The ERCM Scaling Factor field 1843 may represent an integer to be used for computing the ERCM change date, i.e. the date at which the change of the MAC address has to be applied. In some embodiments, the value of the ERCM Scaling Factor field 1843 may be an integer to be multiplied to the value CC(n+1) calculated at step 430 of FIG. 17*a*-17*d* to obtain the ERCM change date. In other words, if the ERCM Scaling Factor field 1843 is set to the value s, s being an integer, and the value of CC(n+1) calculated at step 420 of FIGS. 17*a*-17*d* is equal to k, the change of the MAC address is to be applied at an ERCM change date corresponding to s times k (s×k). For example, if the ERCM change date is expressed in number of Target Beacon Transmission Times (TBTTs), the change of the MAC address has to be applied in (s×k) TBTTs. If the ERCM change date may is expressed in time units (TUs), the change of the MAC address has to be applied in (s×k) TUs.

The ERCM Scaling Factor field 1843 advantageously makes it possible to modulate the dates of MAC address changes according to the context. For example, too frequent changes of MAC address can lead to packet loss (packets prepared in advance and containing a MAC address that is no longer valid). Thanks to the ERCM Scaling Factor field 1843, it is possible to spread out the changes (by setting the field to an integer value strictly greater than 1), and therefore to reduce the loss of packets. Thus, according to some embodiments, it is possible to predefine a threshold, and if the number of packets lost per unit of time exceeds this threshold, a Scaling Factor strictly greater than 1 is applied. For example, the ERCM Scaling Factor may be set by default to a predefined value (e.g. 1) for all the non-AP stations and for the AP. When the AP (resp. the non-AP station) receives an ERCM change Request frame 1840, it may apply the value of the ERCM Scaling Factor field 1843 to compute the ERCM change date. A value ERCM Scaling Factor field 1843 equal to a predetermined value (for example, "FF") may indicate that no modification of the current value of the scaling factor is requested, i.e. that the ERCM scaling factor remains the same. When no modification is requested by the ERCM Change request Action frame, the ERCM Scaling Factor field is set to a predetermined value (such as "FF") indicating the ERCM Scaling factor must remain the same.

The ERCM Reset field 1844 may indicate that a change of MAC address must be applied directly at the reception of the next beacon frame. For example, the value of the ERCM Reset field 1844 may be set to 1 when an ERCM procedure is performed and applied directly upon the next beacon frame reception. In another embodiment, this ERCM Reset field 1844 is not present in the ERCM change Request 1840 and another predetermined value (such as "0") of the ERCM Scaling Factor field 1843 is used instead. In other words, in alternative embodiments, a predetermined value of the ERCM Scaling Factor field 1843 may indicate that a change of MAC address must be applied directly at the reception of the next beacon frame (which replaces the use of an additional dedicated field). In these alternative embodiments, when the value of the ERCM Scaling Factor field 1843 is equal to this predetermined, the value of the ERCM Scaling factor remains the same for the ERCM procedure following the reception of the ERCM change Request 1840.

Indicating that a change of MAC address must be applied directly at the reception of the next beacon frame is useful for resynchronizing AP and non-AP stations. Indeed, a non-AP station may miss one or more beacon Frames. In such case, the count made by the non-AP station of the number of frames received before applying a MAC address change is falsified, which will therefore not apply the change when it should. Therefore, several data packets may be lost because the non-AP station and the AP station do not register the same MAC address for the non-AP station. In addition, this makes it possible to instantly change the MAC address of a non-AP station, at the request of the AP or the non-AP station, for example when it has been detected that the AP and non-AP station are not synchronized anymore (i.e. does not use the same value as the MAC address of the non-AP).

It is noted that the ERCM change Request frames 1840 and/or the ERCM change Response frames 1050 may be either unicast frames or multicast frames or broadcast frames to launch ERCM procedure for a group of non-AP stations or for all non-AP stations.

Figure 19:
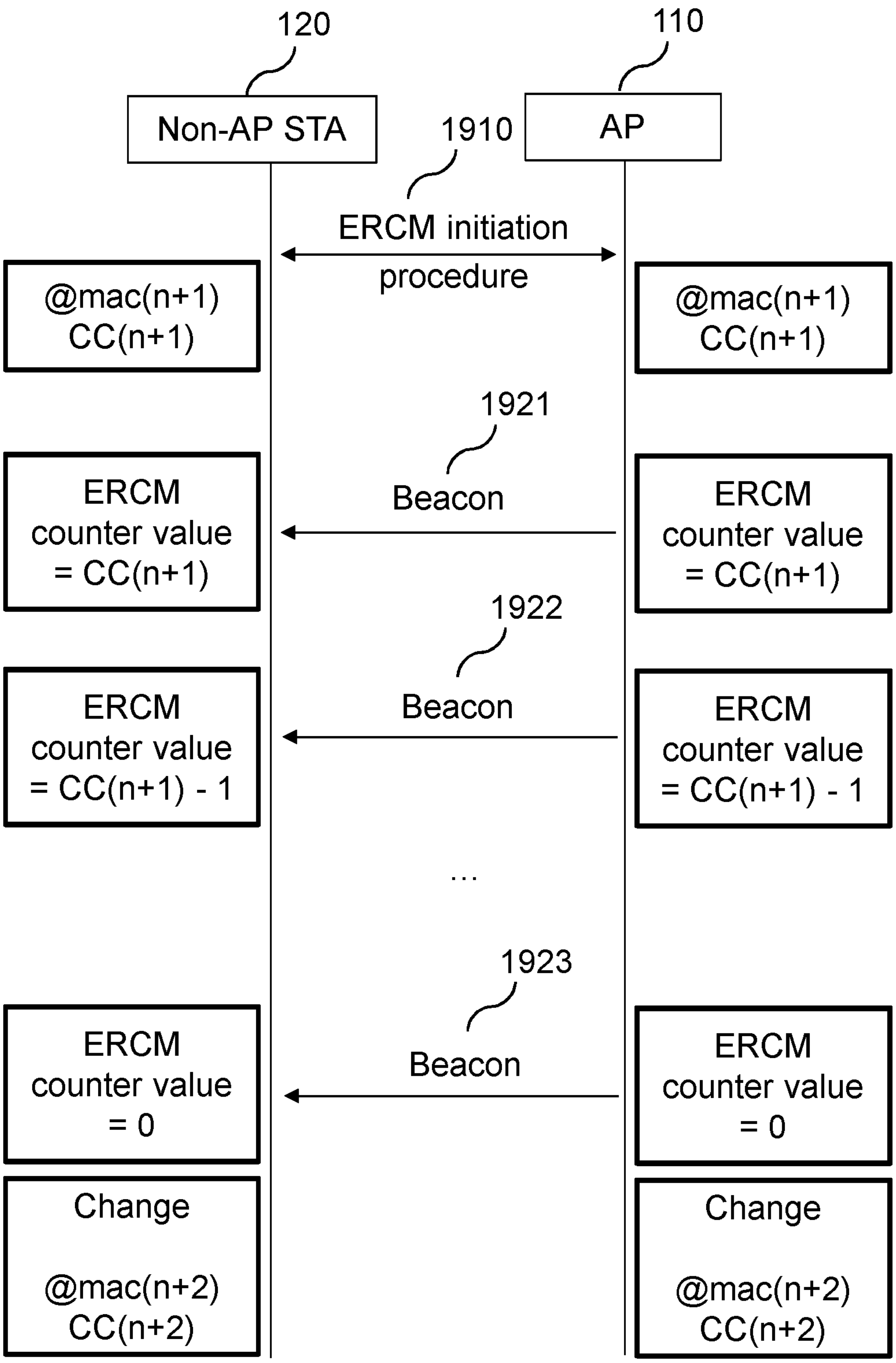
FIG. 19 illustrates an example of sequence of steps for operating a procedure for changing the MAC address of a non-AP station associated with an AP, according to one or more second embodiments of the invention.

FIG. 19 illustrates examples of sequence of steps for operating a procedure for changing the MAC address of a non-AP station associated with an AP, according to other second embodiments.

FIG. 19 represents particular embodiments of the method depicted in FIG. 17*b*, in which no request for changing the value of the MAC address of the non-AP station is exchanged between the non-AP station 120 and the AP 110. In other words, FIG. 17 represents a method for synchronous MAC address generation, in which no exchange of any ERCM Change Request to compute a new transient MAC address for the changing STA is needed.

First, an ERCM initiation procedure is performed (step 1910, corresponding to steps 400, 410 of FIGS. 17*a*-17*d*), for example according to the procedure described above with reference to FIG. 8. During this ERCM activation procedure, the ERCM key may be exchanged between the AP 110 and the non-AP station 120. When the ERCM activation procedure is completed, the AP 110 and the non-AP station 120 may obtain the next value @mac(n+1) of the MAC address of the non-AP station and the ERCM counter value CC(n+1) (step 420 of FIG. 17*a*-17*d*). In one or several embodiments, at the sending/the reception of the first beacon frame following the ending of the ERCM activation procedure (step 1921), a counter may be initialized at both the AP 110 and the non-AP station 120, as described above. In one or several embodiments, this counter is initialized to a value equal to CC(n+1). Alternatively, this counter may be initialized to a value equal to CC(n+1) multiplied by a scaling factor.

For example, this counter may be initialized at the sending/the reception of the first beacon frame following the sending/the reception of the ERCM Key delivery Response (step 840 of FIG. 8) or, if an ERCM Key delivery Confirm is exchanged, the sending/the reception of the ERCM Key delivery Confirm (step 850 of FIG. 8).

Then, each time a new beacon frame is sent/received (steps 1922, 1923), the counters are decremented by one unit at both the AP 110 and the non-AP station 120. When its counter reaches the value zero (at step 1923 in FIG. 19), the change of the MAC address may be performed, the next value @mac(n+2) of the MAC address of the non-AP station 120 and the next value of the ERCM counter CC(n+2) may be calculated, and new counters may be initialized at the AP 110 and the non-AP station 120 at the sending/the reception of the next beacon frame (new step 1921). All transmissions subsequent to the transmission of the beacon frame corresponding to the value of the counters equal to zero (step 1923) are done with the new MAC address.

According to embodiments, the method of FIG. 19 may therefore comprise:

- Calculating a ERCM counter value (CC) (4 bits) using the standardized PRF-128 (section 12.7.1.2-IEEE Std 802.11-202) with same parameters as to compute the new transient MAC address (new set of bits):

$$CC(n+1) = PRF\text{-}128/4(ERCM\ \text{Key}, \text{“}ERCM\text{”}, CC(n), 128)$$

- From the generated 128 bits, the new set of 4 bits (different from the leftmost 46 bits used for the new transient MAC address) are selected.
  - The ERCM counter value defines a number of TBTTs before applying the new transient MAC address
- Synchronous management of the ERCM counter value:
  - No exchange of the ERCM Change counter value in the beacon frame.
  - Synchronous decrease of the ERCM Change counter value starting after the first beacon following the ERCM initiation procedure or after the previous transient MAC address validation.

Figure 20:
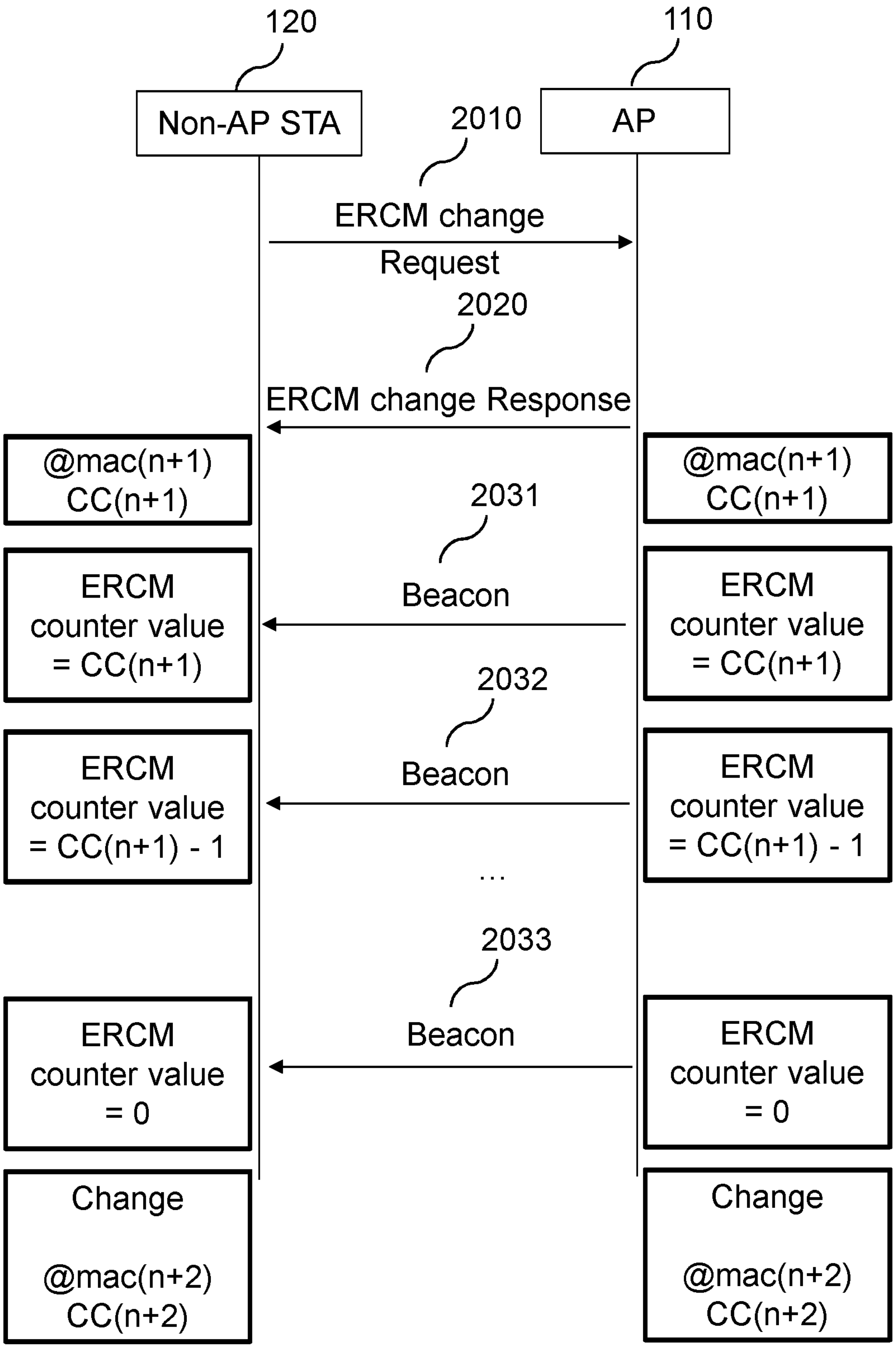
FIG. 20 illustrates an example of sequence of steps for operating a procedure for changing the MAC address of a non-AP station associated with an AP, according to other second embodiments of the invention.

FIG. 20 illustrates examples of sequence of steps for operating a procedure for changing the MAC address of a non-AP station associated with an AP, according to other second embodiments.

FIG. 20 represents other particular embodiments of the methods depicted in FIGS. 17*c*-17*d*, in which the reception of a change request by the non-AP station 120 and/or the AP 110 may trigger an ERCM procedure.

A request for changing the MAC address of the non-AP station 120 is sent from the non-AP station 120 to the AP 110 (step 2010). This request may be an “ERCM change Request” 1840, as described below with reference to FIG. 18. This request indicates to the AP 110 that the non-AP station 120 wants to change its MAC address. In response to the request for changing the MAC address, the AP 110 may acknowledge that it has received the request (step 2020), for example by sending to the non-AP station 120 an “ERCM change Response” 1050 as described with reference to FIG. 10.

At the reception of the ERCM change Response (for the non-AP station 120) or just after sending the ERCM change Response (for the AP 110), the AP 110 and the non-AP station 120 may both obtain the next value @mac(n+1) of the MAC address of the non-AP station and the ERCM counter value CC(n+1) (step 420 of FIGS. 17*a*-17*d*).

In one or several embodiments, at the sending/the reception of the first beacon frame following the ERCM change Response (step 2020), a counter may be initialized at both the AP 110 and the non-AP station 120, as described above. In one or several embodiments, this counter is initialized to a value equal to CC(n+1). Alternatively, this counter may be initialized to a value equal to CC(n+1) multiplied by a scaling factor.

For example, this counter may be initialized at the sending/the reception of the first beacon frame following the sending/the reception of the ERCM Key delivery Response (step 840 of FIG. 8) or, if an ERCM Key delivery Confirm is exchanged, the sending/the reception of the ERCM Key delivery Confirm (step 850 of FIG. 8).

Then, each time a new beacon frame is sent/received (steps 2032, 2033), the counters are decremented by one unit at both the AP 110 and the non-AP station 120. When its counter reaches the value zero (at step 2033 in FIG. 20), the change of the MAC address may be performed, the next value @mac(n+2) of the MAC address of the non-AP station 120 and the next value of the ERCM counter CC(n+2) may be calculated, and new counters may be initialized at the AP 110 and the non-AP station 120 at the sending/the reception of the next beacon frame (new step 2031). All transmissions subsequent to the transmission of the beacon frame corresponding to the value of the counters equal to zero (step 2033) are done with the new MAC address.

In the embodiments represented in FIG. 20, the changing procedure is initiated by a non-AP station 120. As an alternative, the changing procedure may be initiated by the AP 110, which may send an ERCM change Request to one or more non-AP stations of the BSS (in this case, the arrows of steps 2010 and 2020 of FIG. 20 are reversed), or a beacon frame containing a field indicating that the MAC addresses of the non-AP stations have to be changes to all the non-AP stations of the BSS.

It has to be understood that the embodiments of FIG. 19 and FIG. 20 are not mutually exclusive and may be both implemented in a BSS. Indeed, an automatic change procedure as in FIG. 19 may be performed (each time a change is performed, new values of the MAC address and of the ERCM counter are calculated and the next change is performed at the time defined by the new ERCM counter value) by default, and each time a request for changing is received, as in FIG. 20, a new ERCM procedure is launched.

The second embodiments may be summarized through the following clauses which target, for illustrative purposes, an EUI, while they can be applied to any privacy parameter already mentioned.

Clause 1. A method for changing a value of an Extended Unique Identifier, EUI, of a non-access point, non-AP, station associated with an access point, AP, station, the non-AP station and the AP station sharing a function and a parameter whose value varies over time, the method comprising at the non-AP station or at the AP station:

determining a value representing a time at which the value of the EUI is to be changed by using the shared function with a set of inputs comprising a current value of the shared parameter; and changing, at the time represented by the determined value, a current value of the EUI of the non-AP station to a new value of the EUI.

Clause 2. The method of clause 1, further comprising:

determining the new value of the EUI using the shared function with the set of inputs.

Clause 3. The method of clause 2, wherein the determining of the value representing the time at which the value of the EUI is to be changed and the determining the new value of the EUI comprise:

obtaining a plurality of bits by applying the shared function to the set of inputs;

determining the new value of the EUI from a first set of bits among the plurality of bits; and determining the value representing the time at which the value of the EUI is to be changed from a second set of bits among the plurality of bits.

Clause 4. The method of clause 3, wherein the first set of bits and the second set of bits have no bit in common.

Clause 5. The method of any one of the preceding clauses, wherein the shared function is a pseudo-random function, PRF.

Clause 6. The method of any one of the preceding clauses, further comprising: obtaining a key shared with the other station;

wherein the set of inputs further comprise the shared key.

Clause 7. The method of clause 6, performed at the non-AP station, wherein the obtaining of the key shared with the AP station comprises:

receiving, from the AP station, a request for obtaining the shared key;

upon reception of the request for obtaining the shared key, generating the shared key;

sending the generated shared key to the AP station; and receiving a message indicating that the AP station has received the shared key;

wherein the value representing the time at which the value of the EUI is to be changed is determined upon the receiving of the message indicating that the AP station has received the shared key.

Clause 8. The method of clause 6, performed at the AP station, wherein the obtaining of the key shared with the non-AP station comprises:

sending, to the non-AP station, a request for obtaining the shared key; and in response to the request for obtaining the shared key, receiving the shared key from the non-AP station;

wherein the value representing the time at which the value of the EUI is to be changed is determined upon the receiving of the shared key.

Clause 9. The method of any one of clauses 1 to 6, further comprising changing a previous value of the EUI of the non-AP station to the current value of the EUI;

wherein the value representing the time at which the value of the EUI is to be changed to the new value of the EUI is determined upon the changing of the previous value of the EUI of the non-AP station to the current value of the EUI.

Clause 10. The method of any one of clauses 1 to 6, further comprising:

receiving a request for changing the value of the EUI;

wherein the value representing the time at which the value of the EUI is to be changed is determined upon the receiving of the request for changing the value of the EUI.

Clause 11. The method of any one of clauses 1 to 6, further comprising:

sending, to the other station, a request for changing the value of the EUI;

receiving a message indicating that the request for changing the value of the EUI has been received by the other station;

wherein the value representing the time at which the value of the EUI is to be changed is determined upon the receiving of the message indicating that the request for changing the value of the EUI has been received by the other station.

Clause 12. The method of any one of clauses 10 and 11, wherein the request for changing the value of the EUI is sent by the AP station to the non-AP station.

Clause 13. The method of any one of clauses 10 and 11, wherein the request for changing the value of the EUI is sent by the non-AP station to the AP station.

Clause 14. The method of any one of the preceding clauses, wherein a number of units of time at the end of which the value of the EUI is to be changed is a function of the determined value.

Clause 15. The method of clause 14, wherein the units of time are Target Beacon Transmission Times, TBTTs.

Clause 16. The method of clause 15, wherein the determined value is an integer value k;

wherein, following the determining of the value representing the time at which the value of the EUI is to be changed, a plurality of subsequent beacon frames are sent by the AP station or received by the non-AP station;

wherein the time at which the value of the EUI is to be changed corresponds to a time at which the [k+1]-th beacon frame among the plurality of subsequent beacon frames is sent by the AP station or received by the non-AP station.

Clause 17. The method of clause 15 in combination with clause 10 or 11, wherein the determined value is an integer value k;

wherein the request for changing the value of the EUI comprises a field whose value represents an integer scaling factor s;

wherein, following the determining of the value representing the time at which the value of the EUI is to be changed, a plurality of subsequent beacon frames are sent by the AP station or received by the non-AP station;

wherein the time at which the value of the EUI is to be changed corresponds to a time at which the [m+1]-th beacon frame among the plurality of subsequent beacon frames is sent by the AP station or received by the non-AP station, m being equal to k times s.

Clause 18. The method of any one of the preceding clauses, wherein the EUI of the non-AP station is a MAC address of the non-AP station.

Clause 19. The method of any one of the preceding clauses, wherein the current value of the shared parameter is a current value of the EUI.

Clause 20. The method of any one of the preceding clauses, further comprising:

receiving a request, called second request, for changing the value of the EUI of the non-AP station, the second request being received between the determining of the value representing the time at which the value of the EUI is to be changed and the time at which the value of the EUI is to be changed; and upon the receiving of the second request, determining a second value representing a second time at which the value of the EUI is to be changed by using the shared function with a second set of shared inputs;

wherein the changing of the current value of the EUI of the non-AP station to a new value of the EUI is performed at the second time represented by the determined second value.

Clause 21. The method of clause 20, further comprising:

upon the receiving of the second request, determining the new value of the EUI by using the shared function with the second set of shared inputs.

Clause 22. The method of any one of clauses 1 to 19, further comprising:

receiving a request, called second request, for changing the value of the EUI of the non-AP station, the second request being received between the determining of the value representing the time at which the value of the EUI is to be changed and the time at which the value of the EUI is to be changed, the second request including an indication that the EUI has to be changed at a subsequent unit of time;

wherein the changing of the current value of the EUI of the non-AP station to a new value of the EUI is performed upon the receiving by the non-AP station or the sending by the AP station of a beacon frame immediately following the receiving of the second request, the new value of the EUI being determined by using the shared function with a second set of shared inputs.

Figure 21:
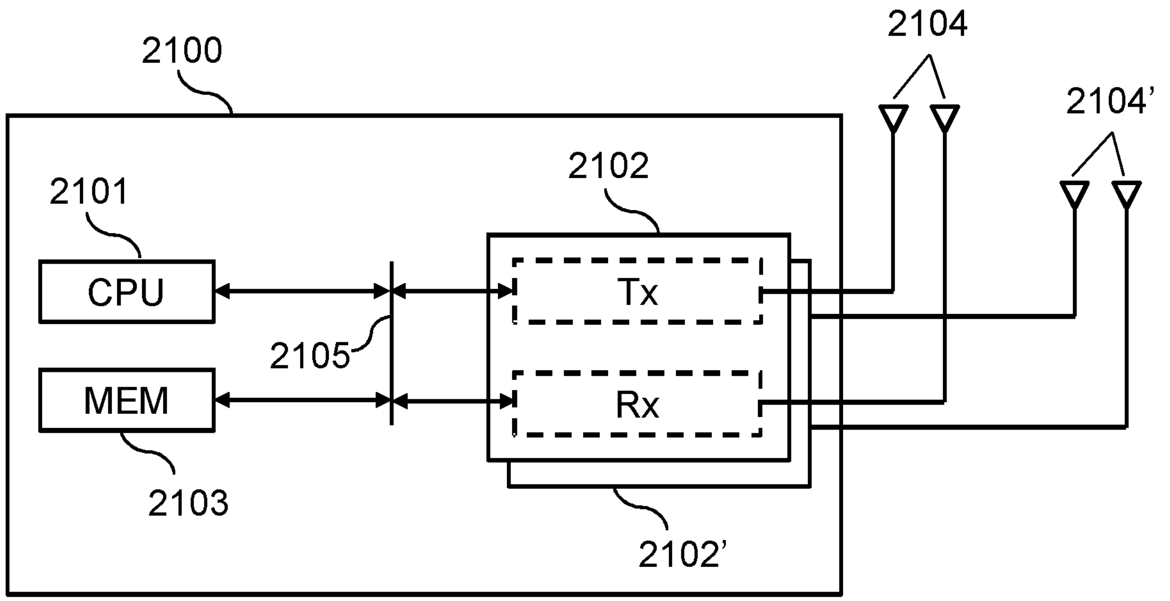
FIG. 21 illustrates an example of a communication device of a wireless network, configured to implement at least one embodiment of the present invention.

FIG. 21 schematically illustrates a communication device 2100, typically any of the stations of FIG. 1, of a wireless network, configured to implement at least one embodiment of the present invention. The communication device 2100 may preferably be a device such as a micro-computer, a workstation or a light portable device. The communication device 700 may comprise a communication bus 2113 to which may be connected:

a central processing unit 2101, such as a processor, denoted CPU;

a memory 2103, denoted MEM, for storing an executable code of methods or steps of the methods according to embodiments of the invention as well as the registers adapted to record variables and parameters necessary for implementing the methods; and at least two communication interfaces 2102 and 2102' connected to the wireless communication network, for example a communication network according to one of the IEEE 802.11 family of standards, via transmitting and receiving antennas 2104 and 2104', respectively.

Preferably the communication bus 2113 may provide communication and interoperability between the various elements included in the communication device 2100 or connected to it. The representation of the bus is not limiting and in particular the central processing unit is operable to communicate instructions to any element of the communication device 2100 directly or by means of another element of the communication device 2100.

The executable code may be stored in a memory that may either be read only, a hard disk or on a removable digital medium such as for example a disk. According to an optional variant, the executable code of the programs can be received by means of the communication network, via the interface 2102 or 2102', in order to be stored in the memory 2103 of the communication device 2100 before being executed.

In an embodiment, the device 2100 may be a programmable apparatus which uses software to implement embodiments of the invention. However, alternatively, embodiments of the present invention may be implemented, totally or in partially, in hardware (for example, in the form of an Application Specific Integrated Circuit or ASIC).

Embodiment(s) of the present invention can also be realized by a computer of a system or apparatus that reads out and executes computer executable instructions (e.g., one or more programs) recorded on a storage medium (which may also be referred to more fully as a “non-transitory computer-readable storage medium”) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), etc.), a flash memory device, a memory card, and the like.

Expressions such as “comprise”, “include”, “incorporate”, “contain”, “is” and “have” are to be construed in a non-exclusive manner when interpreting the description and its associated claims, namely construed to allow for other items or components which are not explicitly defined also to be present. Reference to the singular is also to be construed in be a reference to the plural and vice versa.

A person skilled in the art will readily appreciate that various parameters disclosed in the description may be modified and that various embodiments disclosed may be combined without departing from the scope of the invention.

As an example, the embodiments described above consider one or more privacy parameters to be changed. These privacy parameters to be changed may be predefined, e.g. as in the lists of FIGS. 15a and 15b, and known by the stations.

The invention claimed is:

1. A method for changing a value of at least one privacy parameter of a target station among an access point, AP, station managing a Basic Service Set, BSS, and a non-AP station of the BSS, the non-AP station and the AP station having a shared function to generate a new value of a privacy parameter, the method comprising at the non-AP station or at the AP station:

obtaining a key and a parameter having a value varying over time, that are shared with the other station among the non-AP station and the AP station;

calculating new values of first and second privacy parameters by using a single iteration of the shared function having the shared key and a current value of the shared parameter as inputs; and using the calculated new values as values of the first and second privacy parameters at a target time.

2. The method of claim 1, wherein the first and second privacy parameters includes parameters from:

one or more Extended Unique Identifiers, EUIs, of the target station, one or more media access control, MAC, addresses of the target station, a sequence number used by the target station to uniquely identify a new MAC Service Data Unit, MSDU, Aggregated-MSDU, A-MSDU, or MAC Management Protocol Data Unit, MMPDU, to be transmitted, a packet number used by the target station to uniquely identify a new frame to be transmitted, an association identifier, AID, of the target station to uniquely identify the target station within the BSS, a scrambler seed used by the target station to initialize a local scrambler scrambling transmit data and/or descrambling receive data, a beacon interval defining the time interval between two consecutive target beacon transmission times, TBTTs, a BSS color used as a numerical identifier of the BSS.

3. The method of claim 1, further comprising, at the station, communicating, with the other station, a request for changing the values of the first and second privacy parameters at the target time.

4. The method of claim 3, wherein the request for changing the values of the first and second privacy parameters is sent by the AP station to the non-AP station.

5. The method of claim 1, wherein the target station is the AP station.

6. The method of claim 5, wherein the shared key is the Groupwise Temporal Key, GTK, of the BSS or a derivate thereof.

7. The method of claim 3, wherein the request signals multiple targeted non-AP stations of the BSS that are declared as BSS Privacy Enhancement, BPE, Clients to the AP station, wherein a BPE Client is configured to change a value of a privacy parameter by using the shared function, and the request signals to each targeted BPE Client to change:

the value of at least one privacy parameter of the AP station, and the value of at least one privacy parameter of the targeted BPE Client.

8. The method of claim 3, wherein the request includes a policy field indicating whether the request also signals to each of one or more targeted stations different from the target station, to change the value of at least one privacy parameter of the targeted station.

9. The method of claim 8, wherein a non-AP station of the BSS that is configured to change a value of a privacy parameter by using the shared function declares itself as a BSS Privacy Enhancement, BPE, Client to the AP station, and the policy field takes a value from:

a first value signaling the request is only a request for changing the values of the first and second privacy parameters of the AP station, a second value signaling the request targets all BPE Clients of the BSS, and requests each targeted BPE Client to change the value of at least one privacy parameter of the targeted BPE Client, a third value signaling the request targets a subgroup of the BPE Clients of the BSS, and requests each targeted BPE Client to change the value of at least one privacy parameter of the targeted BPE Client.

10. The method of claim 9, wherein, in case the policy field takes the third value, the request further includes a BPE Clients group field signaling the subgroup of BPE Clients.

11. The method of claim 8, further comprising, at the AP station, when the request requests a targeted BPE Client to change the value of at least one privacy parameter of the targeted BPE Client, obtaining a second key and a second parameter having a value varying over time, that are shared with the targeted BPE Client;

calculating new values of the first and second privacy parameters of the targeted BPE Client by using a single iteration of the shared function having the shared second key and a current value of the shared second parameter as inputs;

using the calculated new values as values of the first and second privacy parameters of the targeted BPE Client at a second target time.

12. The method of claim 8, further comprising, at the non-AP station, determining from the request that the non-AP station belongs to the targeted BPE Clients, and in the affirmative:

obtaining a second key and a second parameter having a value varying over time, that are shared with the AP station;

calculating new values of the first and second privacy parameters of the non-AP station by using a single iteration of the shared function having the shared second key and a current value of the shared second parameter as inputs;

using the calculated new values as values of the first and second privacy parameters of the non-AP station at a second target time.

13. The method of claim 11, wherein the shared second key is the Pairwise Transient Key, PTK, of the targeted BPE Client or a derivate thereof.

14. The method of claim 1, wherein calculating the new values of the first and second privacy parameters includes:

obtaining a plurality of bits by applying the shared function to the inputs;

determining a new value of the first privacy parameter of the target station from a first subset of bits among the plurality of bits; and determining a new value of the second and distinct privacy parameter of the target station from a second subset of bits among the plurality of bits.

15. The method of claim 14, wherein the first subset of bits and the second subset of bits have no bit in common.

16. The method of claim 3, wherein the request for changing the values of the first and second privacy parameters is sent by the non-AP station to the AP station.

17. The method of claim 3, the request includes an indication relative to the target time at which the values of the first and second privacy parameters are to be changed.

18. The method of claim 17 performed at the non-AP station, wherein the obtaining of the key shared with the AP station comprises, at the non-AP station:

receiving, from the AP station, a request for obtaining the shared key;

upon reception of the request for obtaining the shared key, generating the shared key; and sending the generated shared key to the AP station.

19. The method of claim 18, wherein the shared key is generated pseudo-randomly.

20. The method of claim 17 performed at the AP station, wherein the obtaining of the key shared with the non-AP station comprises, at the AP station:

sending, to the non-AP station, a request for obtaining the shared key; and in response to the request for obtaining the shared key, receiving the shared key from the non-AP station.

21. The method of claim 1, wherein the shared function is a pseudo-random function, PRF.

22. The method of claim 1, wherein the current value of the shared parameter is a current value of an, Extended Unique Identifier, EUI, of the target station.

23. The method of claim 1, wherein the current value of the shared parameter is a current time value.

24. The method of claim 16, wherein the non-AP station or AP station stores a registry comprising the values of the first and second privacy parameters of the non-AP station, wherein using the new values as values of the first and second privacy parameters comprises: replacing the values of the first and second privacy parameters of the non-AP station in the registry by the calculated new values.

25. The method of claim 4, wherein the request for changing the values of the first and second privacy parameters is a beacon frame.

26. The method of claim 25, wherein the indication relative to the time at which the values of the first and second privacy parameters are to be changed is a counter included in the beacon frame, the counter indicating a number of Target Beacon Transmission Times, TBTTs.

27. The method of claim 26, wherein, after the request for changing the values of the first and second privacy parameters, a plurality of subsequent beacon frames are sent by the AP station and received by the non-AP station, each subsequent beacon frame including a respective value of the counter, the value of the counter being decremented by one for each subsequent beacon frame;

wherein the time at which the values of the first and second privacy parameters is to be changed is a time at which the beacon frame with a value of the counter equal to zero is sent from the AP station and received by the non-AP station.

28. The method of claim 17, wherein the request for changing the values of the first and second privacy parameters is sent by the non-AP station and received by the AP station.

29. The method of claim 17, wherein the indication relative to a time at which the values of the first and second privacy parameters are to be changed is included in the request for changing the values of the first and second privacy parameters.

30. The method of claim 29, wherein the indication relative to the time at which the values of the first and second privacy parameters are to be changed is a number k of Target Beacon Transmission Times, TBTTs, in which the values of the first and second privacy parameters are to be changed.

31. The method of claim 30, wherein the values of the first and second privacy parameters are changed when a k-th beacon frame since the communicating of the request is sent from the AP station or received by the non-AP station.

32. The method of claim 29, wherein the indication relative to a time at which the values of the first and second privacy parameters are to be changed is a time value.

33. The method of claim 32, wherein the values of the first and second privacy parameters are changed when a beacon frame corresponding to a first beacon frame after the time value is reached is sent from the AP station or received by the non-AP station.

34. The method of claim 17, wherein capabilities for implementing a procedure for changing the values of the first and second privacy parameters have been exchanged during association between the non-AP station and the AP station.

35. The method of claim 1, further comprising, at the non-AP station or at the AP station, determining a value representing the target time at which the values of the first and second privacy parameters are to be changed by using the shared function with inputs comprising the current value of the shared parameter.

36. The method of claim 35, wherein the determining of the value representing the target time at which the values of the first and second privacy parameters are to be changed and the calculation of the new values of the first and second privacy parameters comprise:

obtaining a plurality of bits by applying the shared function to the inputs;

determining the new value of the first privacy parameter from a first subset of bits among the plurality of bits; and determining the value representing the target time at which the values of the first and second privacy parameters are to be changed from a second subset of bits among the plurality of bits.

37. The method of claim 36, wherein the first subset of bits and the second subset of bits have no bit in common.

38. The method of claim 35, wherein determining the value representing the target time is responsive to receiving the request.

39. A wireless communication device comprising at least one microprocessor configured for carrying out the steps of the method of claim 1.

40. A non-transitory computer-readable medium storing a program which, when loaded into and executed by a microprocessor or computer system in a wireless device, causes the wireless device to perform the method according to claim 1.

* * * * *